United States Patent
Hashiya et al.

(10) Patent No.: US 10,877,215 B2
(45) Date of Patent: Dec. 29, 2020

(54) OPTICAL SCANNING DEVICE THAT INCLUDES WAVEGUIDES

(71) Applicant: Panasonic Intellectual Property Management Co., Ltd., Osaka (JP)

(72) Inventors: Akira Hashiya, Osaka (JP); Yasuhisa Inada, Osaka (JP); Taku Hirasawa, Kyoto (JP); Yoshikazu Yamaoka, Osaka (JP); Nobuaki Nagao, Gifu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 288 days.

(21) Appl. No.: 16/116,499

(22) Filed: Aug. 29, 2018

(65) Prior Publication Data
US 2018/0372951 A1   Dec. 27, 2018

Related U.S. Application Data

(63) Continuation of application No. PCT/JP2017/029704, filed on Aug. 21, 2017, which
(Continued)

(30) Foreign Application Priority Data

Sep. 29, 2016 (JP) ................. 2016-191317
Jan. 17, 2017 (JP) ................. 2017-005833
(Continued)

(51) Int. Cl.
*G02B 6/122* (2006.01)
*G02B 26/12* (2006.01)
(Continued)

(52) U.S. Cl.
CPC ............ *G02B 6/122* (2013.01); *G01S 7/4817* (2013.01); *G01S 17/42* (2013.01); *G01S 17/89* (2013.01);
(Continued)

(58) Field of Classification Search
USPC ....................................... 359/222.1
See application file for complete search history.

(56) References Cited

U.S. PATENT DOCUMENTS 6,028,978 A * 2/2000 Takeuchi ............... G02B 26/08
310/331
8,895,038 B2   3/2015 Anderson et al.
(Continued)

FOREIGN PATENT DOCUMENTS

JP   2005-227324   8/2005
JP   2013-016491   1/2013
(Continued)

OTHER PUBLICATIONS

Extended European Search Report dated Aug. 21, 2019 for the related European Patent Application No. 17855472.1.
(Continued)

*Primary Examiner* — Jennifer D. Carruth
(74) *Attorney, Agent, or Firm* — McDermott Will & Emery LLP

(57) ABSTRACT

An optical scanning device includes a waveguide array including a plurality of waveguides arranged in a first direction. Each waveguide includes: an optical waveguide layer that propagates light supplied to the waveguide in a second direction intersecting the first direction; a first mirror having a first reflecting surface intersecting a third direction; and a second mirror having a second reflecting surface that faces the first reflecting surface. The optical waveguide layer is located between the first and second mirrors and has a variable thickness and/or a variable refractive index for the light. The width of the first mirror and the width of the second mirror are each larger than the width of the optical waveguide layer. The first mirror has a higher light transmittance than the second mirror and allows part of the light
(Continued)

propagating through the optical waveguide layer to be emitted in the third direction.

25 Claims, 60 Drawing Sheets

Related U.S. Application Data is a continuation of application No. PCT/JP2017/000709, filed on Jan. 12, 2017.

(30) Foreign Application Priority Data

| Mar. 15, 2017 | (JP) | ................................. | 2017-050501 |
| Apr. 28, 2017 | (JP) | ................................. | 2017-090049 |

(51) Int. Cl.

| G01S 7/481 | (2006.01) |
| G02B 26/08 | (2006.01) |
| G01S 17/42 | (2006.01) |
| G01S 17/89 | (2020.01) |
| G02B 26/10 | (2006.01) |
| G02B 26/06 | (2006.01) |
| G02F 1/295 | (2006.01) |
| G01S 17/931 | (2020.01) |

(52) U.S. Cl.
CPC ............. *G02B 26/06* (2013.01); *G02B 26/08* (2013.01); *G02B 26/0875* (2013.01); *G02B 26/101* (2013.01); *G02B 26/121* (2013.01); *G02F 1/2955* (2013.01); *G01S 17/931* (2020.01)

(56) References Cited

U.S. PATENT DOCUMENTS

| 2007/0172186 | A1* | 7/2007 | Tsunoda ..................... H01S 5/14 |
| | | | 385/129 |
| 2013/0009177 | A1 | 1/2013 | Chang et al. |
| 2013/0235442 | A1* | 9/2013 | Seike ..................... G02B 26/02 |
| | | | 359/222.1 |
| 2014/0140653 | A1* | 5/2014 | Brown ............... G02B 27/0172 |
| | | | 385/10 |
| 2020/0225476 | A1* | 7/2020 | Urness ................. G02B 6/0023 |

FOREIGN PATENT DOCUMENTS

| WO | 2013/168266 | 11/2013 |
| WO | 2014/110017 | 7/2014 |

OTHER PUBLICATIONS

Toshikazu Shimada et al., "Compact Beam Deflector Based on Slow-Light Bragg Reflector Waveguide Monolithically Integrated with VCSEL," IEICE Electronics Express, vol. 10, No. 11, Nov. 8, 2013, pp. 1-7, XP55611630.

Masanori Nakahama et al., "On-Chip High-Resolution Beam Scanner Based on Bragg Reflector Slow-Light Waveguide Amplifier and Tunable Micro-Electro-Mechanical System Vertical Cavity Surface Emitting Laser," Japanese Journal of Applied Physics, Japan Society of Applied Physics, JP, vol. 51, No. 4.1, Apr. 1, 2012, pp. 040208-1-040208-3, XP001576425.

International Search Report of PCT application No. PCT/JP2017/000709 dated Apr. 11, 2017.

International Search Report of PCT application No. PCT/JP2017/029704 dated Nov. 21, 2017.

Xiaodong Gu et al., "Electro-Thermal Beam Steering Using Bragg Reflector Waveguide Amplifier", Japanese Journal of Applied Physics, vol. 51, 020206-1-020206-3, Feb. 2, 2012.

Kensuke Nakamura et al., "Slow-light Bragg reflector waveguide array for two-dimensional beam steering", Japanese Journal of Applied Physics, vol. 53, 038001-1-038001-3, Jan. 31, 2014.

Ayumi Fuchida et al., "Slow Light Total-Internal-Reflection Optical Switch with 90-degree Bend", CLEO/QELS 2008, JWA86, May 4, 2008.

Masanori Nakahama et al., "Lateral Integration of MEMS VCSEL and Slow Light Amplifier", 17th Microoptics Conference(MOC'11), C-5, Oct. 2011.

\* cited by examiner

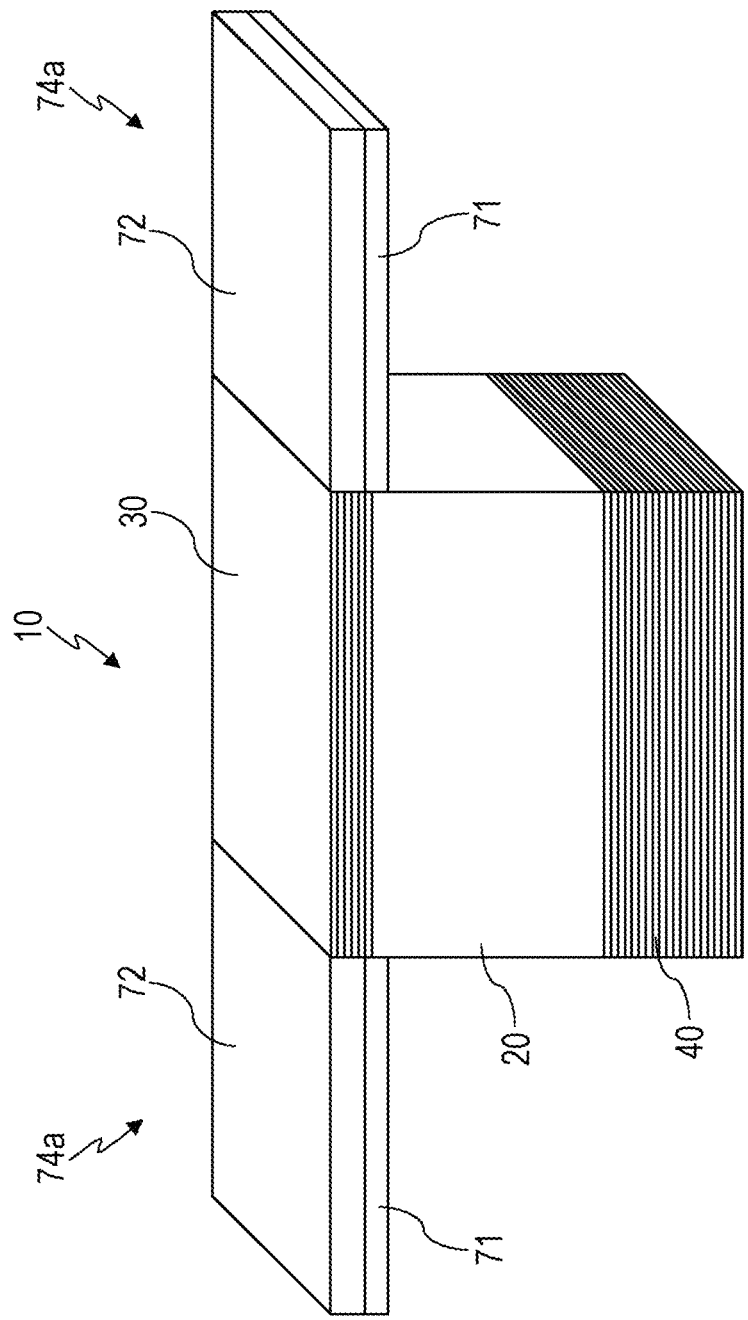

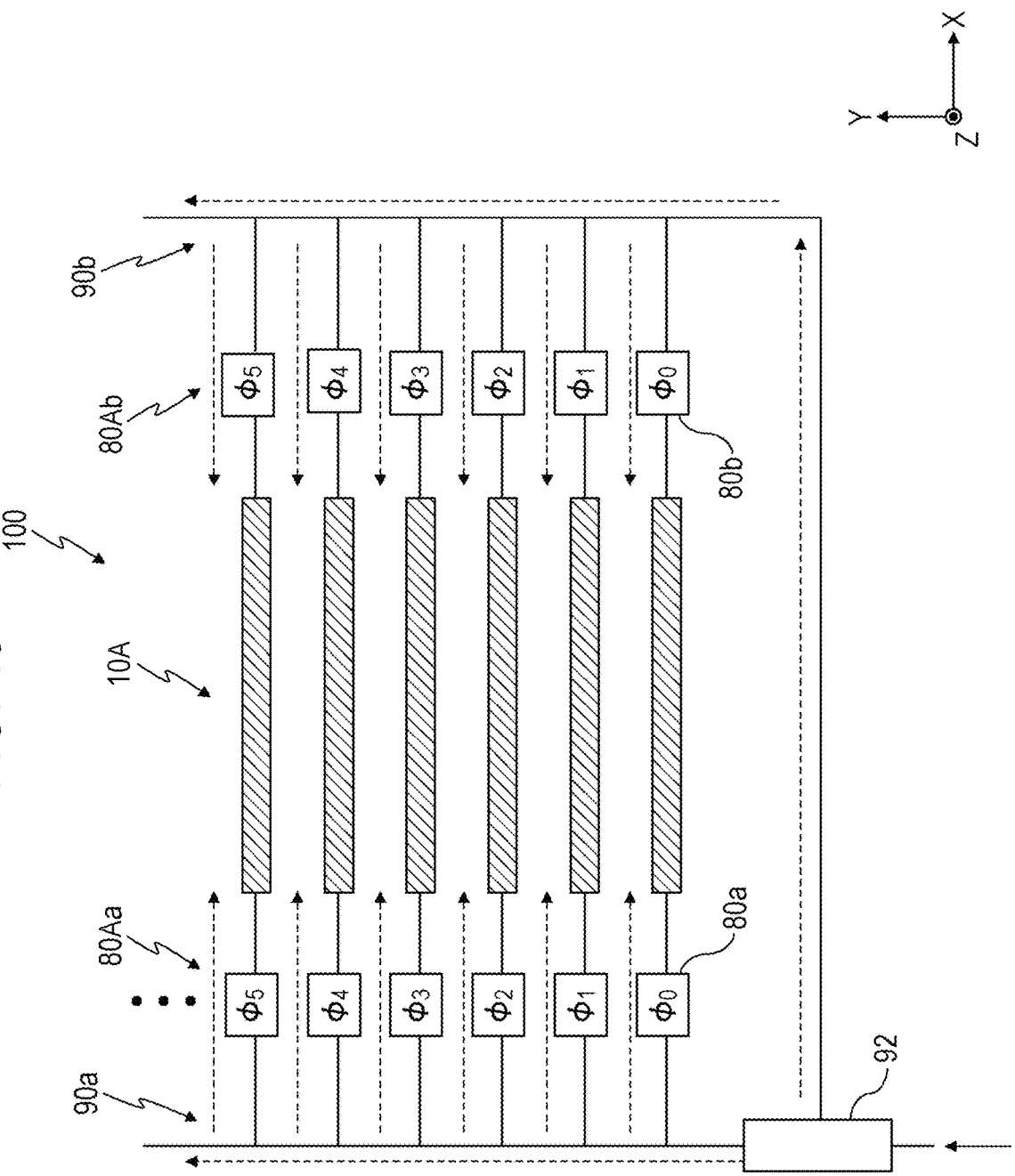

AIR n = 1

AIR n = 1

OPTICAL SCANNING DEVICE THAT INCLUDES WAVEGUIDES

BACKGROUND

1. Technical Field

The present disclosure relates to an optical scanning device that includes waveguides.

2. Description of the Related Art

Various devices capable of scanning a space with light have been proposed.

International Publication No. WO2013/168266 discloses a structure that can perform optical scanning using a driving unit for rotating a mirror.

Japanese Unexamined Patent Application Publication (Translation of PCT Application) No. 2016-508235 discloses an optical phased array including a plurality of nanophotonic antenna elements arranged in two dimensions. Each antenna element is optically coupled to a corresponding variable optical delay line (i.e., a phase shifter). In this optical phased array, a coherent light beam is guided to each antenna element through a corresponding waveguide, and the phase of the light beam is shifted by a corresponding phase shifter. In this manner, an amplitude distribution of a far-field radiation pattern can be changed.

Japanese Unexamined Patent Application Publication No. 2013-16591 discloses a light deflection element including: a waveguide including an optical waveguide layer through which light is guided and first distributed Bragg reflectors formed on the upper and lower surfaces of the optical waveguide layer; a light inlet for allowing light to enter the waveguide; and a light outlet formed on a surface of the waveguide to allow the light entering from the light inlet and guided through the waveguide to be emitted.

SUMMARY

One non-limiting and exemplary embodiment provides a novel optical scanning device having a relatively simple structure capable of optical scanning.

In one general aspect, the techniques disclosed here feature an optical scanning device including a waveguide array including a plurality of waveguides arranged in a first direction. Each of the plurality of waveguides includes: an optical waveguide layer that propagates light supplied to the waveguides in a second direction intersecting the first direction; a first mirror extending in the second direction and having a first reflecting surface that intersects a third direction; and a second mirror extending in the second direction and having a second reflecting surface facing the first reflecting surface of the first mirror. The third direction intersects a virtual plane parallel to the first and second directions. The optical waveguide layer is located between the first mirror and the second mirror and has a variable thickness and/or a variable refractive index for the light. The width of the first mirror in the first direction and the width of the second mirror in the first direction are each larger than the width of the optical waveguide layer in the first direction. The first mirror has a higher light transmittance than the second mirror and allows part of the light propagating through the optical waveguide layer to pass through and be emitted in the third direction. The refractive index of the optical waveguide layer and/or the thickness of the optical waveguide layer is changed to change the third direction that is an emission direction of the part of the light.

According to an aspect of the present disclosure, one-dimensional optical scanning or two-dimensional optical scanning can be achieved using a relatively simple structure.

It should be noted that general or specific embodiments of the present disclosure may be implemented as a device, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 40 is an illustration showing an example of an actuator in which the support members shown in FIG. 38A are disposed on both sides of a mirror;

FIG. 48 is an illustration showing a structural example in which two phase shifter arrays are disposed on respective sides of a waveguide array;

DETAILED DESCRIPTION

Figure 1:
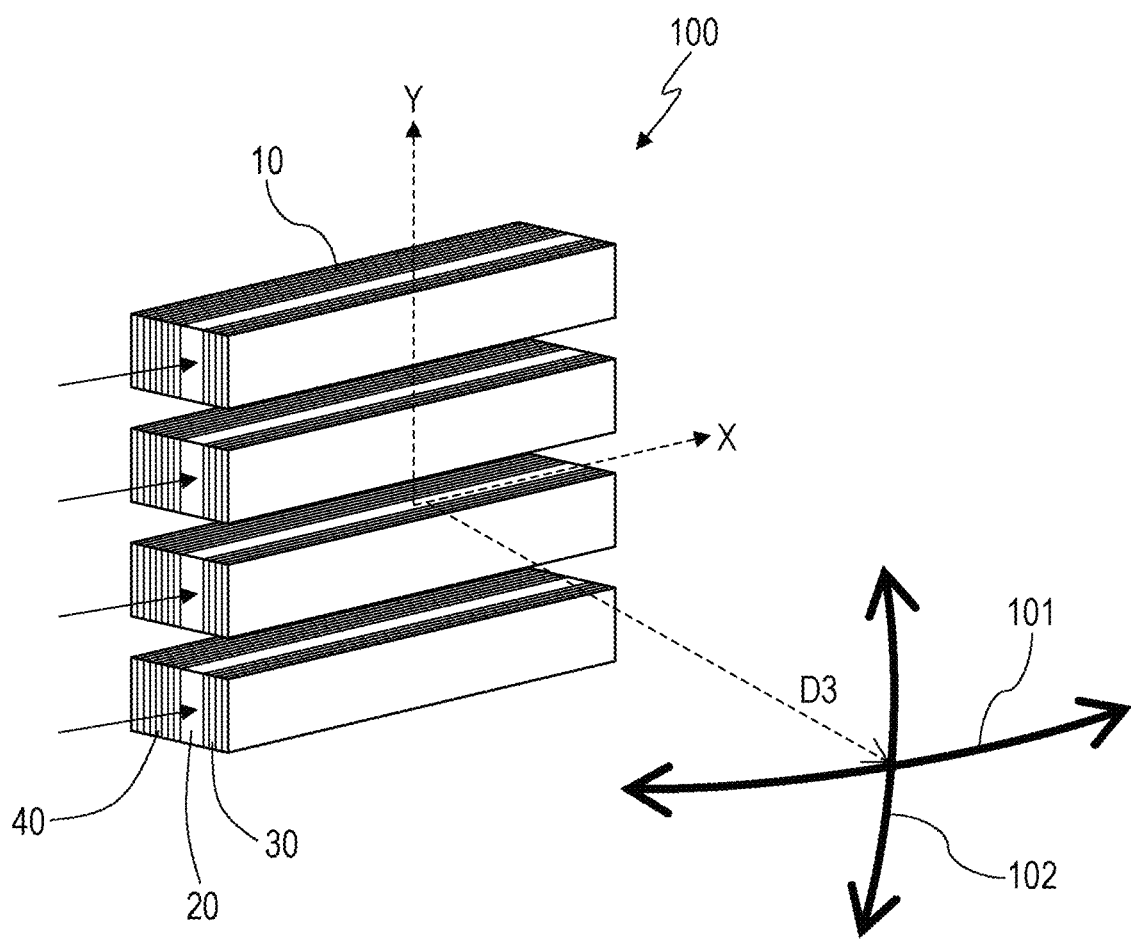
FIG. 1 is a perspective view schematically showing the structure of an optical scanning device in an exemplary embodiment of the present disclosure.

Before embodiments of the present disclosure are described, findings underlying the present disclosure will be described.

The present inventors have found that a problem with conventional optical scanning devices is that it is difficult to optically scan a space without increasing the complexity of the structures of the devices.

For example, in the technique disclosed in International Publication No. WO2013/168266, the driving unit for rotating the mirror is necessary. Therefore, the device structure is complicated. A problem with this device is that the device is not robust against vibration.

In the optical phased array described in Japanese Unexamined Patent Application Publication (Translation of PCT Application) No. 2016-508235, light must be split and introduced into a plurality of row waveguides and a plurality of column waveguides to guide the split light beams to the plurality of antenna elements arranged in two dimensions. Therefore, wiring lines for the waveguides for guiding the light beams are very complicated. Moreover, the range of two-dimensional scanning cannot be increased. To change the amplitude distribution of the emitted light two dimensionally in a far field, the phase shifters must be connected to the plurality of antenna elements arranged in two dimensions, and wiring lines for phase control must be attached to the phase shifters. The phases of the light beams entering the plurality of two-dimensionally arranged antenna elements can thereby be changed by different amounts. Therefore, the structure of the elements is very complicated.

In the structure in Japanese Unexamined Patent Application Publication No. 2013-16591, by changing the wavelength of light entering the light deflection element, a large area can be scanned one-dimensionally with the emitted light. However, a mechanism for changing the wavelength of the light entering the light deflection element is necessary. When such a mechanism is installed in the light source such as a laser, a problem arises in that the structure of the light source becomes complicated.

The present inventors have focused attention on the problems in the conventional techniques and have conducted studies to solve these problems. The present inventors have found that the above problems can be solved by using a waveguide element including a pair of opposed mirrors and an optical waveguide layer sandwiched between these mirrors. One of the pair of mirrors of the waveguide element has a higher light transmittance than the other and allows part of light propagating through the optical waveguide layer to be emitted to the outside. The direction of the emitted light (or its emission angle) can be changed by adjusting the refractive index and/or thickness of the optical waveguide layer, as described later. More specifically, by changing the refractive index and/or the thickness, a component of the wave vector of the emitted light can be changed. The component is along a direction intersecting the lengthwise direction of the optical waveguide layer. One-dimensional scanning is thereby achieved.

When an array of a plurality of waveguide elements is used, two-dimensional scanning can be achieved. More specifically, light beams with appropriate phase differences are supplied to the plurality of waveguide elements, and the phase differences are controlled to change a direction in which light beams emitted from the plurality of waveguide elements are reinforced. By changing the phase differences, a component of the wave vector of the emitted light is changed. The component is along a direction intersecting the lengthwise direction of the optical waveguide layer. Two-dimensional scanning can thereby be achieved. When two-dimensional scanning is performed, it is unnecessary to change the refractive indexes or thicknesses, or both, of the plurality of optical waveguide layers by different amounts. Specifically, two-dimensional scanning can be performed by supplying light beams with appropriate phase differences to the plurality of optical waveguide layers and changing the refractive indexes or thicknesses, or both, of the plurality of optical waveguide layers by the same amount in a synchronous manner. As described above, in the above embodiment of the present disclosure, two-dimensional optical scanning can be achieved using the relatively simple structure.

The above-described basic principle is applicable not only to the application in which light is emitted but also to an application in which a light signal is received. By changing at least one of the refractive index and thickness (i.e., the refractive index and/or the thickness) of an optical waveguide layer, a light-receivable direction can be changed one-dimensionally. Moreover, the light-receivable direction can be changed two-dimensionally by changing phase differences between light beams using a plurality of phase shifters connected to a plurality of waveguide elements arranged in one direction.

An optical scanning device and a photoreceiver device in embodiments of the present disclosure can be used for, for example, antennas of a LiDAR (Light Detection and Ranging) system. The LiDAR system uses electromagnetic waves (visible light, infrared light, or ultraviolet light) having shorter wavelengths than radio waves such as millimeter waves used in a radar system and can therefore detect a distance distribution of an object with high resolution. Such a LiDAR system is mounted on a mobile unit such as an automobile, a UAV (Unmanned Aerial Vehicle, a so-called drone), or an AGV (Automated Guided Vehicle) and used as one of crash avoidance techniques.

<Structural Example of Optical Scanning Device>

The structure of an optical scanning device for two-dimensional scanning will be described as an example.

FIG. 1 is a perspective view schematically showing the structure of an optical scanning device 100 in an exemplary embodiment of the present disclosure. The optical scanning device 100 includes a waveguide array including a plurality of waveguide elements 10 regularly arranged in a first direction (the Y direction in FIG. 1). Each of the plurality of waveguide elements 10 has a shape elongated in a second direction (the X direction in FIG. 1) that intersects the first direction. Each of the plurality of waveguide elements 10 propagates light in the second direction and allows the light to be emitted in a third direction D3 that intersects a plane formed by the first and second directions. Specifically, the plane formed by the first and second directions is a virtual plane parallel to the first and second directions. In the present embodiment, the first direction (the Y direction) and the second direction (the X direction) are orthogonal to each other but may not be orthogonal to each other. In the present embodiment, the plurality of waveguide elements 10 are arranged in the Y direction at regular intervals but are not necessarily arranged at regular intervals.

The orientation of each of structures shown in the drawings of the present disclosure is set in consideration of the ease of understanding of description, and the orientation of a structure when an embodiment of the present disclosure is actually implemented is not limited thereto. The shape and size of part or all of any of the structures shown in the drawings do not limit the actual shape and size.

Each of the plurality of waveguide elements 10 includes a first mirror 30 and a second mirror 40 (hereinafter may be referred to simply as mirrors) that face each other and further includes an optical waveguide layer 20 located between the mirrors 30 and 40. Each of the mirrors 30 and 40 has a reflecting surface that intersects the third direction D3 and is located at an interface with the optical waveguide layer 20. Each of the mirrors 30 and 40 and the optical waveguide layer 20 has a shape elongated in the second direction (the X direction).

As described later, the first mirrors 30 of the plurality of waveguide elements 10 may be a plurality of portions of an integrally formed third mirror. The second mirrors 40 of the plurality of waveguide elements 10 may be a plurality of portions of an integrally formed fourth mirror. The optical waveguide layers 20 of the plurality of waveguide elements 10 may be a plurality of portions of an integrally formed optical waveguide layer. A plurality of waveguides can be formed when at least one of the following conditions is met: (1) Each of the first mirrors 30 is formed separately from the other first mirrors 30. (2) Each of the second mirrors 40 is formed separately from the other second mirrors 40. (3) Each of the optical waveguide layers 20 is formed separately from the other optical waveguide layers. The phrase "each of the first mirrors is formed separately from the other first mirrors" means not only that physical spaces are provided between the first mirrors but also that a material having a different refractive index is disposed between the first mirrors to separate them from each other.

The reflecting surface of each first mirror 30 and the reflecting surface of a corresponding second mirror 40 are approximately parallel to each other and face each other. Among the two mirrors 30 and 40, at least the first mirror 30 has the capability of allowing part of light propagating in the optical waveguide layer 20 to pass through. In other words, the first mirror 30 has a higher transmittance of the above light than the second mirror 40. Therefore, part of the light propagating in the optical waveguide layer 20 is emitted to the outside through the first mirror 30. Each of the above-described mirrors 30 and 40 may be, for example, a multilayer film mirror formed from a multilayer film (may be referred to as a "multilayer reflective film") made of a dielectric material.

By controlling the phases of light beams inputted to the waveguide elements 10 and changing the refractive indexes or thicknesses, or both, of the optical waveguide layers 20 of the waveguide elements 10 in a synchronous manner (simultaneously), two-dimensional optical scanning can be achieved.

To implement the above two-dimensional scanning, the present inventors have analyzed the details of the operating principle of the waveguide elements 10. Based on the results obtained, the inventors have succeeded in implementing two-dimensional optical scanning by driving the plurality of waveguide elements 10 in a synchronous manner.

As shown in FIG. 1, when light is inputted to each waveguide element 10, the light is emitted from the emission surface of the waveguide element 10. The emission surface is located opposite to the reflecting surface of the first mirror 30. The direction D3 of the emitted light depends on the refractive index and thickness of the optical waveguide layer and the wavelength of the light. In the present embodiment, the refractive indexes or thicknesses, or both, of the optical waveguide layers are controlled in a synchronous manner such that light beams are emitted from the waveguide elements 10 in approximately the same direction. In this manner, the X direction component of the wave vector of the light emitted from the plurality of waveguide elements 10 can be changed. In other words, the direction D3 of the emitted light can be changed in a direction 101 shown in FIG. 1.

Since the light beams emitted from the plurality of waveguide elements 10 are directed in the same direction, the emitted light beams interfere with each other. By controlling the phases of the light beams emitted from the waveguide elements 10, the direction in which the light beams are reinforced by interference can be changed. For example, when a plurality of waveguide elements 10 having the same size are arranged at regular intervals in the Y direction, light beams having different phases shifted by a given amount are inputted to the plurality of waveguide elements 10. By changing the phase differences, the Y direction component of the wave vector of the emitted light can be changed. In other words, by changing the phase differences between the light beams introduced into the plurality of waveguide elements 10, the direction D3 in which the emitted light beams are reinforced by interference can be changed in a direction 102 shown in FIG. 1. Two-dimensional optical scanning can thereby be achieved.

The operating principle of the optical scanning device 100 will next be described in more detail.

<Operating Principle of Waveguide Element>

Figure 2:
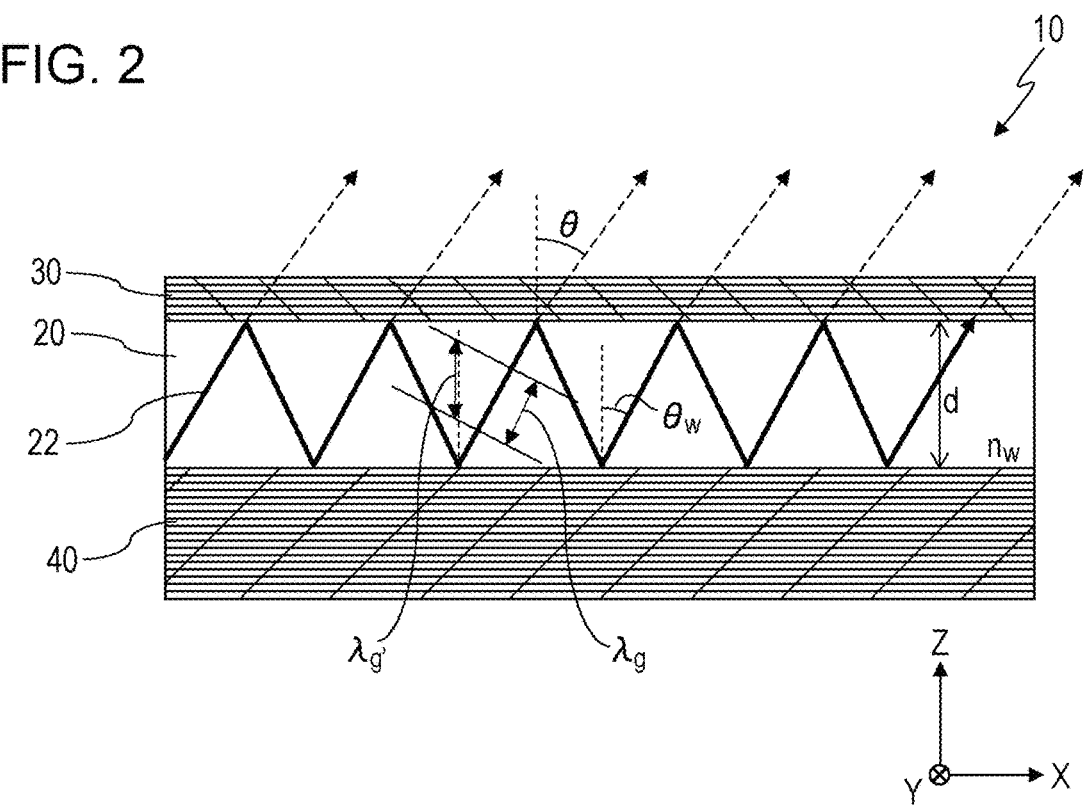
FIG. 2 is an illustration schematically showing an example of a cross-sectional structure of one waveguide element and light propagating therethrough.

FIG. 2 is an illustration schematically showing an example of a cross-sectional structure of one waveguide element 10 and light propagating therethrough. In FIG. 2, a direction perpendicular to the X and Y directions shown in FIG. 1 is referred to as the Z direction, and a cross section of the waveguide element 10 parallel to the XZ plane is schematically shown. In the waveguide element 10, a pair of mirrors 30 and 40 are disposed so as to sandwich an optical waveguide layer 20 therebetween. Light 20 introduced from one X direction end of the optical waveguide layer 20 propagates through the optical waveguide layer 20 while repeatedly reflected from the first mirror 30 disposed on the upper surface of the optical waveguide layer 20 (the upper surface in FIG. 2) and the second mirror 40 disposed on the lower surface (the lower surface in FIG. 2). The light transmittance of the first mirror 30 is higher than the light transmittance of the second mirror 40. Therefore, part of the light can be outputted mainly from the first mirror 30.

In an ordinary waveguide such as an optical fiber, light propagates through the waveguide while undergoing total reflection repeatedly. However, in the waveguide element 10 in the present embodiment, light propagates while repeatedly reflected from the mirrors 30 and 40 disposed on the upper and lower surfaces, respectively, of the optical waveguide layer 20. Therefore, there is no constraint on the propagation angle of the light (the incident angle at the interface between the optical waveguide layer 20 and the mirror 30 or 40), and light incident on the mirror 30 or 40 at an angle closer to the vertical is allowed to propagate. Specifically, light incident on the interface at an angle smaller than the critical angle of total reflection (i.e., an angle closer to the vertical) can be propagated. Therefore, the propagation velocity (group velocity) of light in its propagation direction is much lower that the velocity of light in free space. Thus, the waveguide element 10 has such characteristics that the propagation conditions of light are largely changed according to changes in the wavelength of the light, the thickness of the optical waveguide layer 20, and the refractive index of the optical waveguide layer 20.

The propagation of light through the waveguide element 10 will be described in more detail. Let the refractive index of the optical waveguide layer 20 be $n_w$, and the thickness of the optical waveguide layer 20 be d. The thickness d of the optical waveguide layer 20 is the size of the optical waveguide layer 20 in the direction normal to the reflecting surface of the mirror 30 or 40. In consideration of light interference conditions, the propagation angle $\theta_w$ of light with a wavelength $\lambda$ satisfies formula (1) below.

$$2dn_w \cos \theta_w = m\lambda \qquad (1)$$

Here, m is the mode order. Formula (1) corresponds to a condition for allowing the light to form a standing wave in the optical waveguide layer 20. When the wavelength $\lambda_g$ in the optical waveguide layer 20 is $\lambda/n_w$, the wavelength $\lambda_g'$ in the thickness direction of the optical waveguide layer 20 is considered to be $\lambda/(n_w \cos\theta_w)$. When the thickness d of the optical waveguide layer 20 is equal to an integer multiple of one half of the wavelength $\lambda_g'$ in the thickness direction of the optical waveguide layer 20, i.e., $\lambda/(2n_w \cos\theta_w)$, a standing wave is formed. Formula (1) is obtained from this condition. m in formula (1) represents the number of loops (anti-nodes) of the standing wave.

When the mirrors 30 and 40 are multilayer film mirrors, light penetrates into the mirrors at the time of reflection. Therefore, strictly speaking, a term corresponding to the penetration path length of the light must be added to the left-hand side of formula (1). However, since the influences of the refractive index $n_w$ and thickness d of the optical waveguide layer 20 are much larger than the influence of the light penetrating into the mirrors, the fundamental behavior of the light can be explained by formula (1).

The emission angle θ when the light propagating through the optical waveguide layer 20 is emitted to the outside (typically the air) through the first mirror 30 can be denoted by formula (2) below according to the Snell's law.

$$\sin\theta = n_w \sin\theta_w \quad (2)$$

Formula (2) is obtained from the condition that, on the light emission surface, the wavelength $\lambda/\sin\theta$ of the light in a surface direction on the air side is equal to the wavelength $\lambda/(n_w \sin\theta_w)$ of the light in the propagation direction on the waveguide element 10 side.

From formulas (1) and (2), the emission angle θ can be denoted by formula (3) below.

$$\sin\theta = \sqrt{n_w^2 - \left(\frac{m\lambda}{2d}\right)^2} \quad (3)$$

As can be seen from formula (3), by changing the wavelength λ of the light, the refractive index $n_w$ of the optical waveguide layer 20, or the thickness d of the optical waveguide layer 20, the emission direction of the light can be changed.

For example, when $n_w=2$, d=387 nm, λ=1,550 nm, and m=1, the emission angle is 0°. When the refractive index $n_w$ is changed from the above state to 2.2, the emission angle is changed to about 66°. When the thickness d is changed to 420 nm while the refractive index is unchanged, the emission angle is changed to about 51°. When the wavelength λ is changed to 1,500 nm while the refractive index and the thickness are unchanged, the emission angle is changed to about 30°. As described above, the emission direction of the light can be largely changed by changing the wavelength λ of the light, the refractive index $n_w$ of the optical waveguide layer 20, or the thickness d of the optical waveguide layer 20.

To control the emission direction of the light by utilizing the above principle, it is contemplated to provide a wavelength changing mechanism that changes the wavelength of the light propagating through the optical waveguide layer 20. However, when the wavelength changing mechanism is installed in a light source such as a laser, the structure of the light source becomes complicated.

In the optical scanning device 100 in the present embodiment, the emission direction of light is controlled by controlling one or both of the refractive index $n_w$ and thickness d of the optical waveguide layer 20. In the present embodiment, the wavelength λ of the light is unchanged during operation and held constant. No particular limitation is imposed on the wavelength λ. For example, the wavelength λ may be within the wavelength range of 400 nm to 1,100 nm (the visible to infrared range) in which high detection sensitivity can be obtained by using one of a general photo detector and a general image sensor that detect light through light absorption by silicon (Si). In another example, the wavelength λ may be within the near-infrared range of 1,260 nm to 1,625 nm in which transmission loss in an optical fiber or a Si waveguide is relatively small. However, the above wavelength ranges are merely examples. The wavelength range of the light used is not limited to the visible or infrared wavelength range and may be, for example, an ultraviolet wavelength range. In the present embodiment, the wavelength is not controlled. However, in addition to the control of the refractive index and/or the thickness, the wavelength may be changed and controlled.

The present inventors have examined by optical analysis whether light can be actually emitted in a specific direction as described above. The optical analysis was performed by computation using DiffractMOD available from Cybernet Systems Co., Ltd. This is a simulation based on rigorous coupled-wave analysis (RCWA), and the effects of wave optics can be correctly computed.

Figure 3:
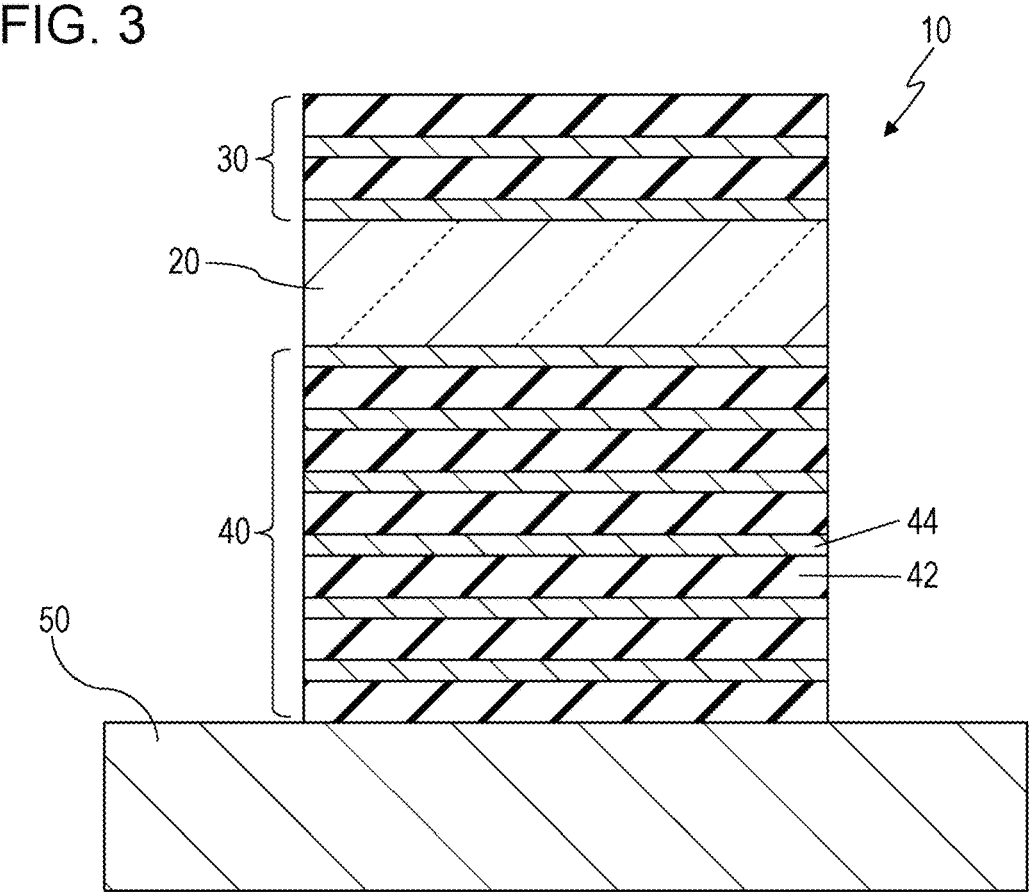
FIG. 3 is an illustration schematically showing a computational model used for a simulation.

FIG. 3 is an illustration schematically showing a computational model used for the simulation. In this computational model, a second mirror 40, an optical waveguide layer 20, and a first mirror 30 are stacked in this order on a substrate 50. Each of the first mirror 30 and the second mirror 40 is a multilayer film mirror including a dielectric multilayer film. The second mirror 40 has a structure in which six low-refractive index layers 42 having a lower refractive index and six high-refractive index layers 44 having a higher refractive index (a total of twelve layers) are alternately stacked. The first mirror 30 has a structure in which two low-refractive index layers 42 and two high-refractive index layers 44 (a total of four layers) are alternately stacked. The optical waveguide layer 20 is disposed between the mirrors 30 and 40. A medium other than the waveguide element 10 and the substrate 50 is air.

The optical response to incident light was examined using the above model while the incident angle of the light was changed. This corresponds to examination of the degree of coupling of the incident light from air into the optical waveguide layer 20. Under the condition that the incident light is coupled into the optical waveguide layer 20, the reverse process occurs in which the light propagating through the optical waveguide layer 20 is emitted to the outside. Therefore, the determination of the incident angle when the incident light is coupled into the optical waveguide layer 20 corresponds to the determination of the emission angle when the light propagating through the optical waveguide layer 20 is emitted to the outside. When the incident light is coupled into the optical waveguide layer 20, light loss occurs in the optical waveguide layer 20 due to absorption and scattering of the light. Specifically, under the condition that a large loss occurs, the incident light is strongly coupled into the optical waveguide layer 20. When there is no light loss due to absorption, etc., the sum of the light transmittance and reflectance is 1. However, when there is a loss, the sum of the transmittance and reflectance is less than 1. In this computation, to take the influence of light absorption into consideration, an imaginary part was added to the refractive index of the optical waveguide layer 20, and a value obtained by subtracting the sum of the transmittance and reflectance from 1 was used as the magnitude of the loss.

In this simulation, the substrate 50 is Si, the low-refractive index layers 42 are $SiO_2$ (thickness: 267 nm), and the high-refractive index layers 44 are Si (thickness: 108 nm). The magnitude of loss was computed while the incident angle of light with a wavelength $\lambda=1.55$ μm was changed.

Figure 4A:
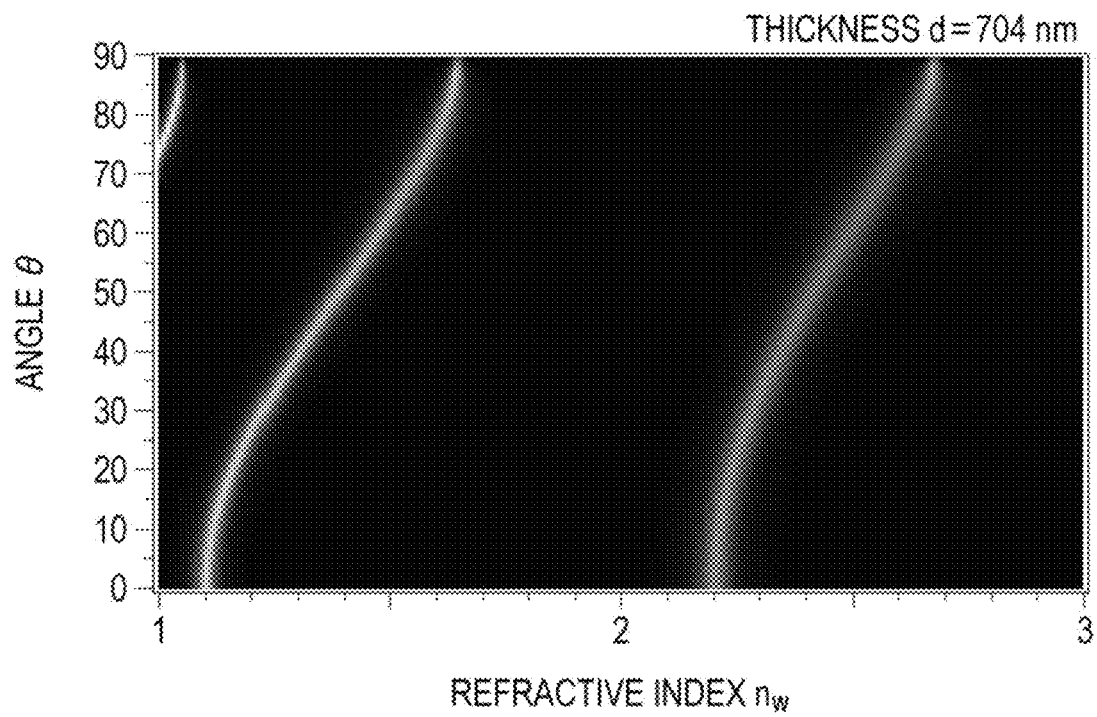
FIG. 4A shows the results of computations of the relation between the refractive index $n_w$ of an optical waveguide layer and the emission angle $\theta$ of light with a mode order of m=1 when the thickness d of the optical waveguide layer is 704 nm.

FIG. 4A shows the results of the computations of the relation between the refractive index $n_w$ of the optical waveguide layer 20 and the emission angle θ of light with a mode order of m=1 when the thickness d of the optical waveguide layer 20 is 704 nm. White lines indicate that the loss is large. As shown in FIG. 4A, the emission angle θ of the light with a mode order of m=1 is 0° near $n_w=2.2$. One example of a material having a refractive index $n_w$ of around 2.2 is lithium niobate.

Figure 4B:
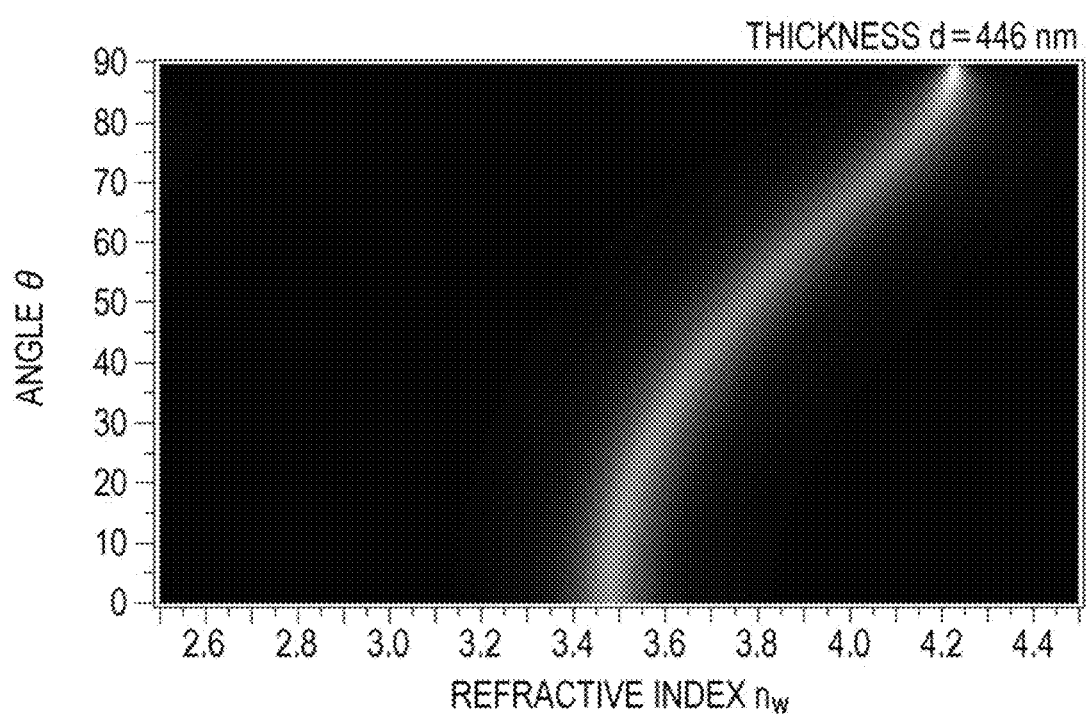
FIG. 4B shows the results of computations of the relation between the refractive index $n_w$ of the optical waveguide layer and the emission angle $\theta$ of light with a mode order of m=1 when the thickness d of the optical waveguide layer is 446 nm.

FIG. 4B shows the results of the computations of the relation between the refractive index $n_w$ of the optical waveguide layer 20 and the emission angle θ of light with a mode order of m=1 when the thickness d of the optical waveguide layer 20 is 446 nm. As shown in FIG. 4B, the emission angle θ of the light with a mode order of m=1 is 0° near $n_w=3.45$. One example of a material having a refractive index $n_w$ of around 3.45 is silicon (Si).

As described above, the waveguide element 10 can be designed such that, when the optical waveguide layer 20 has a specific refractive index $n_w$, the emission angle θ of light with a specific mode order (e.g., m=1) is set to be 0° by adjusting the thickness d of the optical waveguide layer 20.

As can be seen from FIGS. 4A and 4B, the emission angle θ is largely changed according to the change in the refractive index. As described later, the refractive index can be changed by various methods such as carrier injection, an electro-optical effect, and a thermo-optical effect. However, the change in the refractive index by such a method is not so large, i.e., about 0.1. Therefore, it has been considered that such a small change in refractive index does not cause a large change in the emission angle. However, as can be seen from FIGS. 4A and 4B, near the refractive index at which the emission angle θ is 0°, when the refractive index increases by 0.1, the emission angle θ is changed from 0° to about 30°. As described above, in the waveguide element 10 in the present embodiment, even a small change in the refractive index can cause the emission angle to be changed largely.

Similarly, as can be seen from comparison between FIGS. 4A and 4B, the emission angle θ changes largely according to the change in the thickness d of the optical waveguide layer 20. As described later, the thickness d can be changed using, for example, an actuator connected to at least one of the two mirrors. Even when the change in the refractive index is small, the emission angle can be largely changed.

As described above, by changing the refractive index $n_w$ of the optical waveguide layer 20 and/or its thickness d, the direction of the light emitted from the waveguide element 10 can be changed. To achieve this, the optical scanning device 100 in the present embodiment includes a first adjusting element that changes at least one of the refractive index and thickness of the optical waveguide layer 20 of each of the waveguide elements 10. A structural example of the first adjusting elements will be described later.

As described above, the use of the waveguide element 10 allows the emission direction of light to be changed largely by changing at least one of the refractive index $n_w$ and thickness d of the optical waveguide layer 20. In this manner, the emission angle of the light emitted from the mirror 30 can be changed in a direction along the waveguide element 10. To achieve the above-described one-dimensional scanning, it is unnecessary to use an array of waveguide elements 10, and it is only necessary to use at least one waveguide element 10.

Figure 5:
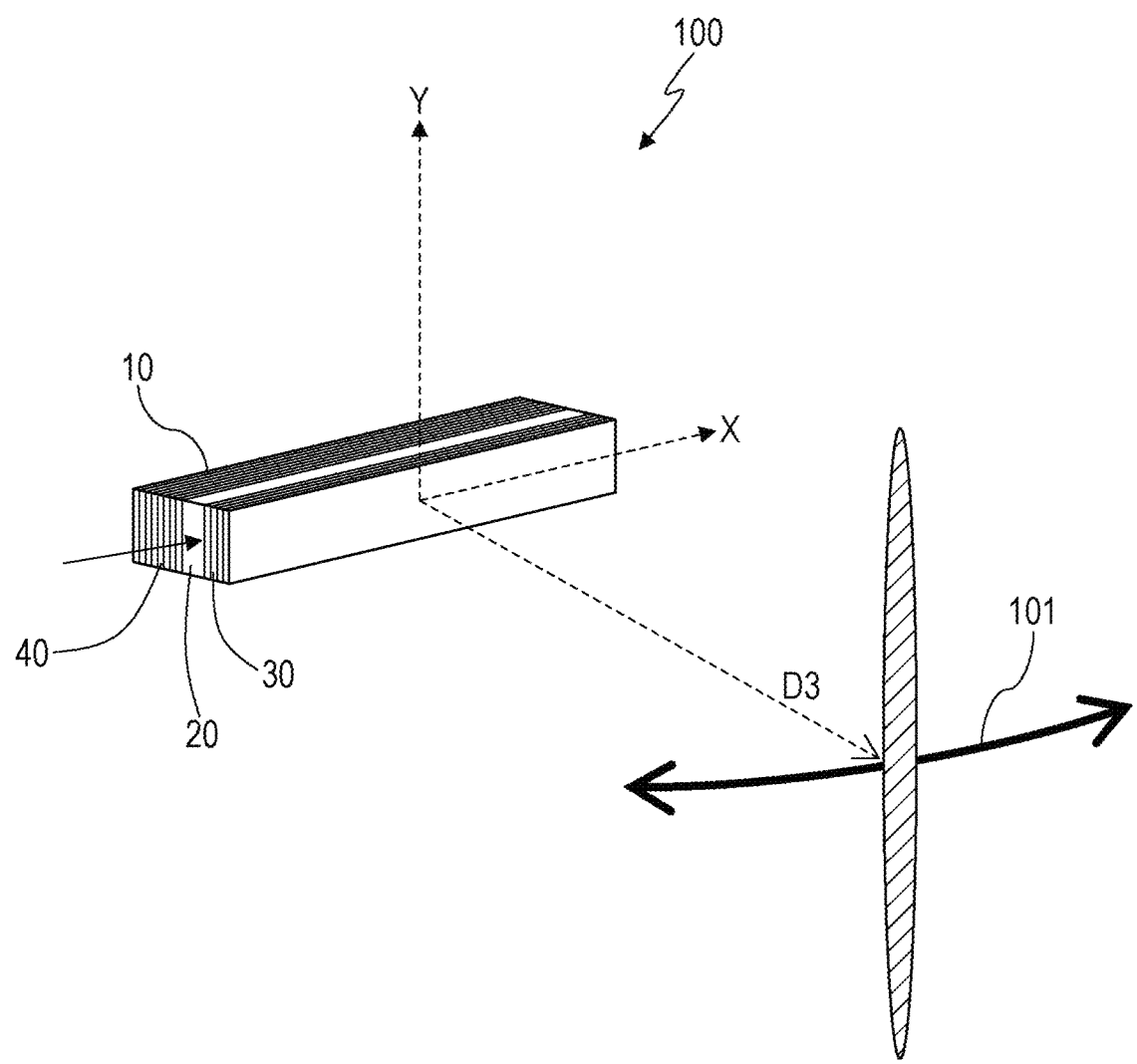
FIG. 5 is an illustration schematically showing an example of an optical scanning device that can implement one-dimensional scanning using a single waveguide element.

FIG. 5 is an illustration schematically showing an example of the optical scanning device 100 that can implement one-dimensional scanning using a single waveguide element 10. In this example, a beam spot extending in the Y direction is formed. By changing the refractive index of the optical waveguide layer 20, the beam spot can be moved in the X direction. One-dimensional scanning can thereby be achieved. Since the beam spot extends in the Y direction, a relatively large area extending two-dimensionally can be scanned by uniaxial scanning. The structure shown in FIG. 5 may be employed in applications in which two-dimensional scanning is unnecessary.

To implement two-dimensional scanning, the waveguide array in which the plurality of waveguide elements 10 are arranged is used, as shown in FIG. 1. When the phases of light beams propagating through the plurality of waveguide elements 10 satisfy a specific condition, the light beams are emitted in a specific direction. When the condition for the phases is changed, the emission direction of the light beams is changed also in the arrangement direction of the waveguide array. Specifically, the use of the waveguide array allows two-dimensional scanning to be implemented. An example of a specific structure for implementing the two-dimensional scanning will be described later.

As described above, when at least one waveguide element 10 is used, the emission direction of light can be changed by changing at least one of the refractive index and thickness of the optical waveguide layer 20 of the waveguide element 10. However, there is a room for improvement in the structure for efficiently introducing light into the waveguide element 10. Unlike a general waveguide that uses total reflection of light (hereinafter may be referred to as a "total reflection waveguide"), the waveguide element 10 in the present embodiment in the present disclosure has the waveguide structure in which the optical waveguide layer is sandwiched between the pair of mirrors (e.g., multilayer reflective films) (this structure may be hereinafter referred to as a "reflective waveguide"). Coupling of light into such a reflective waveguide has not been studied sufficiently. The present inventors have devised a novel structure for efficiently introducing light into the optical waveguide layer 20.

Figure 6A:
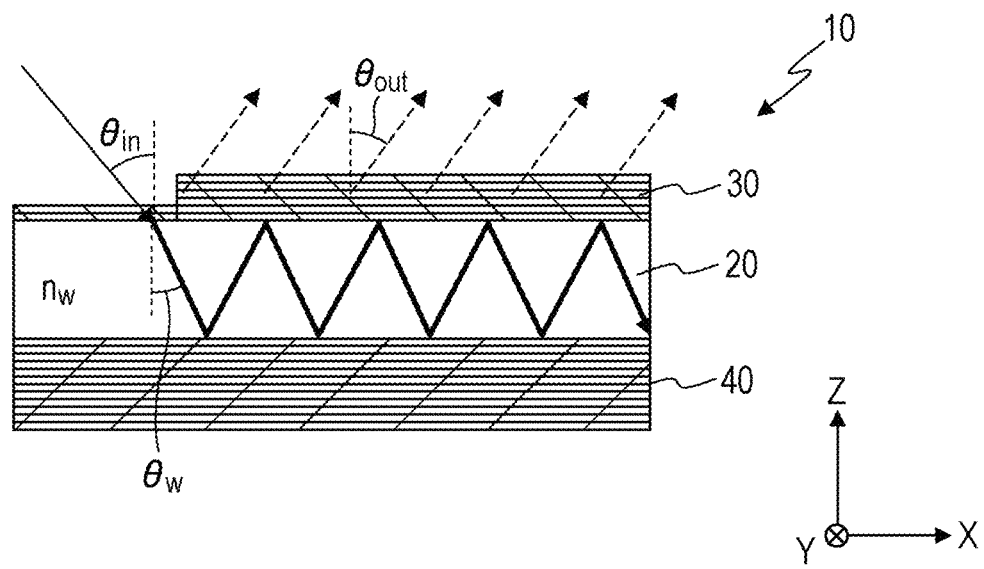
FIG. 6A is a cross-sectional view schematically showing an example (comparative example) of a structure in which light is inputted to the waveguide element.

FIG. 6A is a cross-sectional view schematically showing an example (comparative example) of a structure in which light is indirectly inputted into the optical waveguide layer 20 through air and the mirror 30. In this comparative example, the propagating light is indirectly introduced from the outside through air and the mirror 30 into the optical waveguide layer 20 of the waveguide element 10, which is a reflective waveguide. To introduce the light into the optical waveguide layer 20, the reflection angle $\theta_w$ of the guided light inside the optical waveguide layer 20 must satisfy the Snell's law ($n_{in} \sin \theta_{in} = n_w \sin \theta_w$). Here, $n_{in}$ is the refractive index of the external medium, $\theta_{in}$ is the incident angle of the propagating light, and $n_w$ is the refractive index of the optical waveguide layer 20. By adjusting the incident angle $\theta_{in}$ in consideration of the above condition, the coupling efficiency of the light can be maximized. In this example, the number of films in the multilayer reflective film is smaller in a portion of the first mirror 30 than in the other portion. The light is inputted from this portion, and the coupling efficiency can thereby be increased. However, in the above structure, the incident angle $\theta_{in}$ of the light on the optical waveguide layer 20 must be changed according to the change in the propagation constant of the optical waveguide layer 20 (the change in $\theta_{wav}$).

Figure 6B:
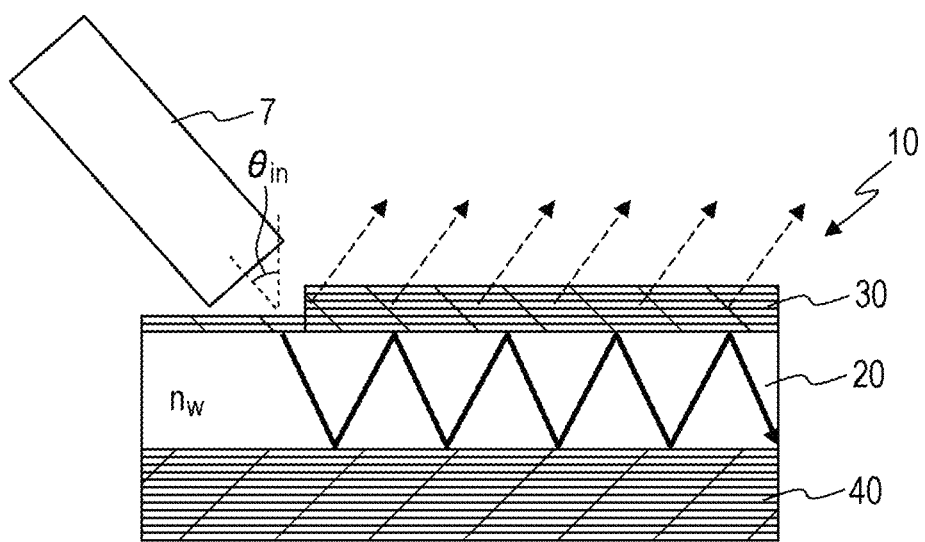
FIG. 6B is a cross-sectional view schematically showing an example (comparative example) of a structure in which light is inputted to the waveguide element through an optical fiber inclined at an angle $\theta_{in}$ with respect to the direction normal to a mirror.

One method to maintain the state in which the light can be always coupled into the waveguide even when the propagation constant of the optical waveguide layer 20 is changed is to cause a diverging beam to be incident on the portion of the multilayer reflective film that includes a reduced number of films. In one example of such a method, an optical fiber 7 inclined at an angle $\theta_{in}$ with respect to the direction normal to the mirror 30 is used to cause light to enter the waveguide element 10 from the outside indirectly through air and the mirror 30, as shown in FIG. 6B. The coupling efficiency in this case will be examined. For the sake of simplicity, the light is assumed to be a ray of light. The numerical aperture (NA) of an ordinary single mode fiber is about 0.14. This corresponds to an angle of about ±8 degrees. The range of the incident angle of the light coupled into the waveguide is comparable to the divergence angle of the light emitted from the waveguide. The divergence angle $\theta_{div}$ of the emitted light is represented by formula (4) below.

$$\theta_{div} \approx \frac{\lambda}{L \cos \theta_{out}} \quad (4)$$

Figure 7:
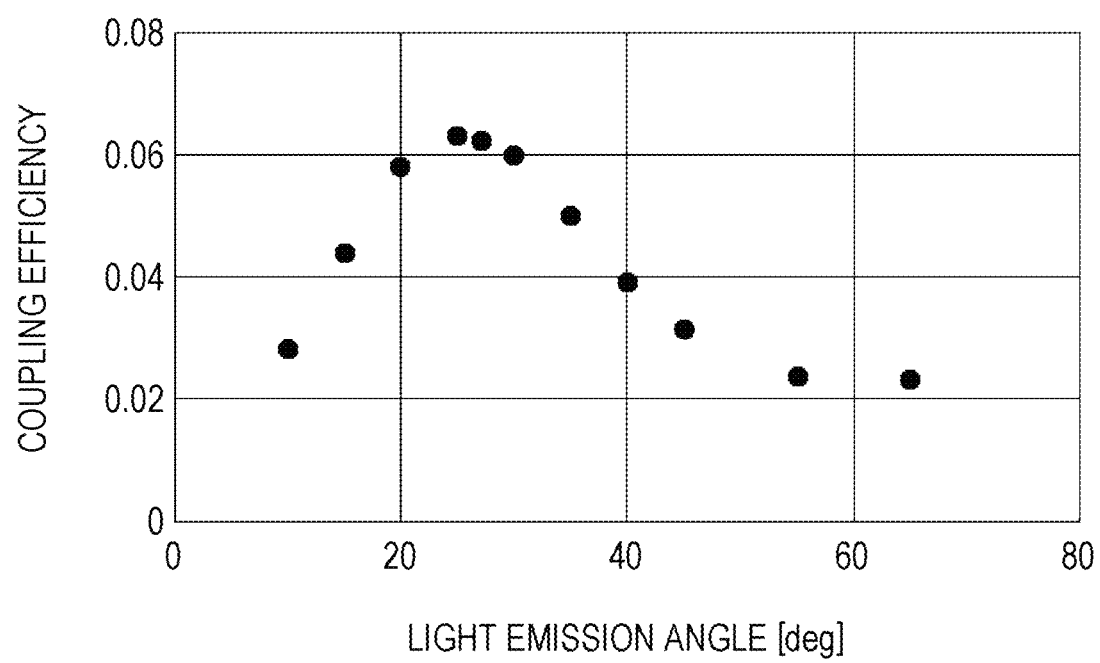
FIG. 7 is a graph showing changes in coupling efficiency when the incident angle $\theta_{in}$ of light was fixed and the refractive index $n_w$ of a waveguide was changed to change the emergent angle $\theta_{out}$ of the light.

Here, L is a propagation length, $\lambda$ is the wavelength of the light, and $\theta_{out}$ is the emergent angle of the light. When L is 10 μm or more, $\theta_{div}$ is at most 1 degree or less. Therefore, the coupling efficiency of the light from the optical fiber 7 is $1/16 \times 100 \approx 6.3\%$ or less. FIG. 7 shows the results of computations of changes in the coupling efficiency when the refractive index $n_w$ of the waveguide was changed to change the emergent angle $\theta_{out}$ of the light while the incident angle $\theta_{in}$ of the light was fixed. The coupling efficiency is the ratio of the energy of the guided light to the energy of the incident light. The results shown in FIG. 7 were obtained by computing the coupling efficiency using an incident angle $\theta_{in}$ of 30°, a waveguide thickness of 1.125 μm, and a wavelength of 1.55 μm. In the above computations, the refractive index $n_w$ was changed within the range of 1.44 to 1.78 to change the emergent angle $\theta_{out}$ within the range of 10° to 65°. As show in FIG. 7, in this structure, the coupling efficiency is at most less than 7%. When the emergent angle $\theta_{out}$ is changed by 20° or more from the emergent angle that gives the maximum coupling efficiency, the coupling efficiency is reduced to one-half or less of the maximum coupling efficiency.

As described above, when the propagation constant is changed by changing, for example, the refractive index of the waveguide in order to perform optical scanning, the coupling efficiency is further reduced. To maintain the coupling efficiency, it is also necessary to change the incident angle $\theta_{in}$ of the light according to the change in the propagation constant. However, introduction of a mechanism for changing the incident angle $\theta_{in}$ of the light is not desirable because the device structure becomes complicated. The present inventors have found that the light incident angle can be fixed when a region including a waveguide whose refractive index and thickness are maintained constant is provided upstream of a region including a waveguide whose refractive index or thickness is to be changed.

Figure 70:
FIG. 70 is an illustration showing a schematic structure of a total reflection waveguide.
Figure 71:
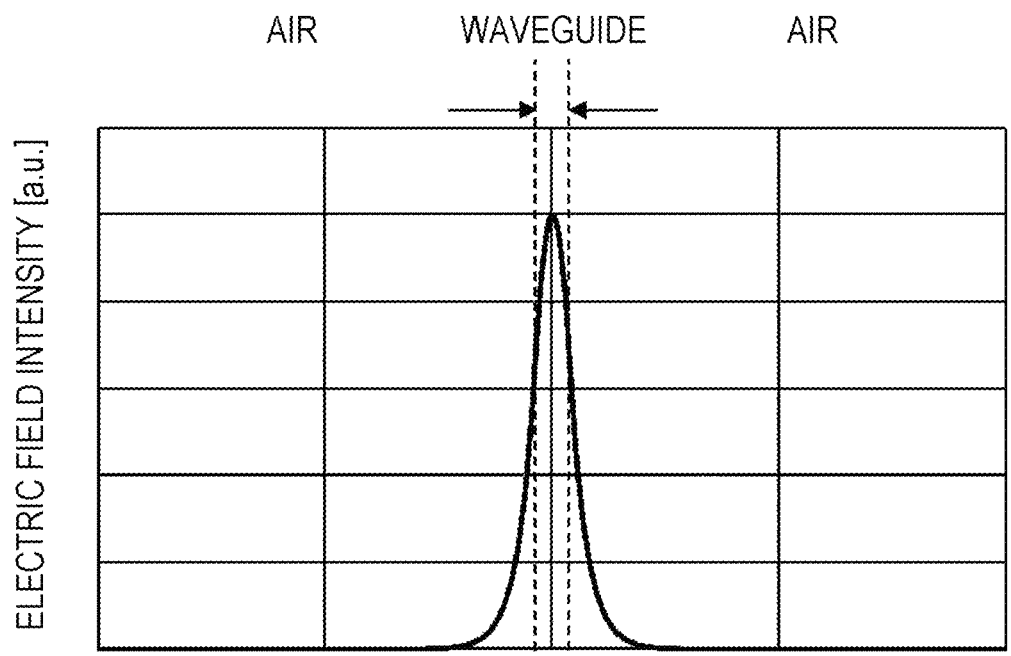
FIG. 71 is a graph showing an electric field intensity distribution in the total reflection waveguide.
Figure 72:
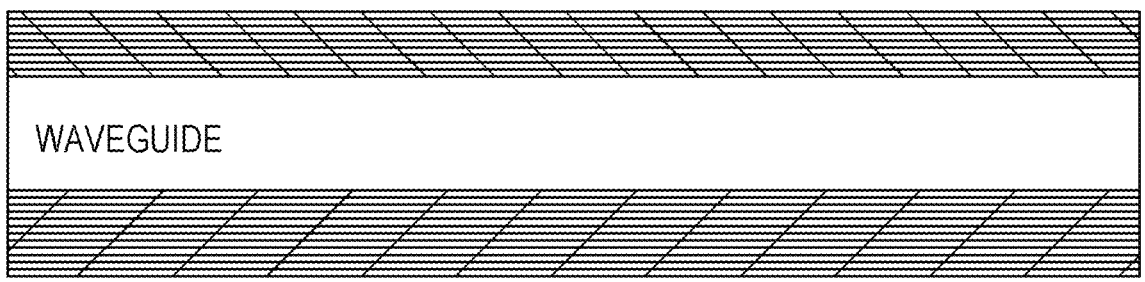
FIG. 72 is an illustration showing a schematic structure of a slow light waveguide.
Figure 73:
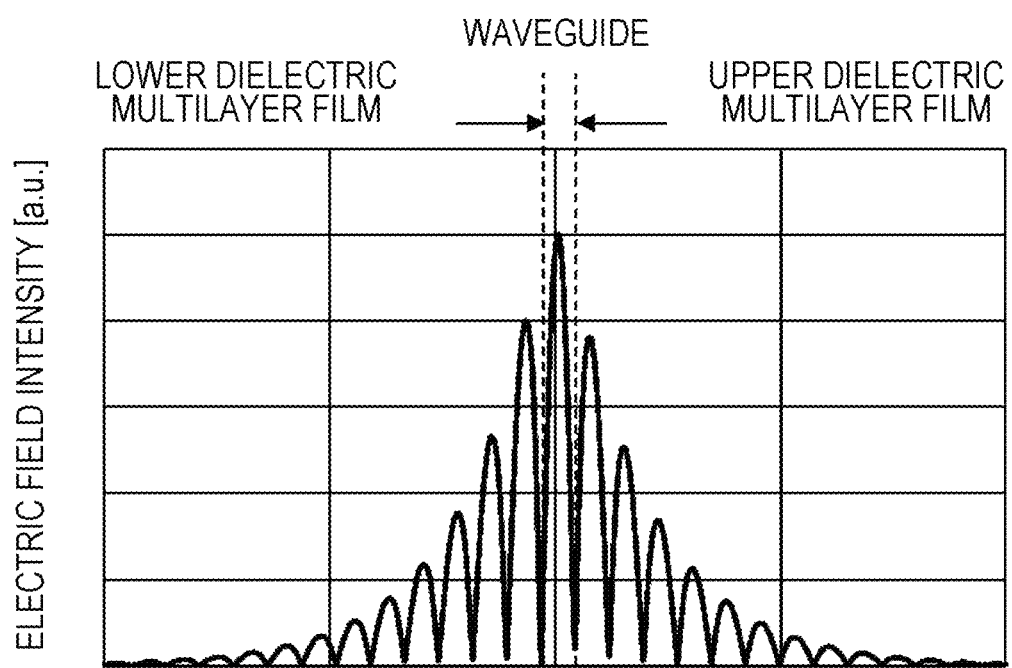
FIG. 73 is a graph showing an electric field intensity distribution in the slow light waveguide.

There are two important factors for coupling of guided light between two different waveguides. One of them is the propagation constant of the propagating light, and the other one is the electric field intensity distribution of each mode. The closer the propagation constant and the electric field intensity distribution in one of the two waveguides are to those in the other, the higher the coupling efficiency. The propagation constant $\beta$ of light propagating through a waveguide is represented by $\beta = k \cdot \sin \theta_w = (2\pi n_w \sin \theta_w)/\lambda$, when the light is treated in a geometrical optics manner for simplicity. Here, k is the wave number, $\theta_w$ is the angle of the guided light, and $n_w$ is the refractive index of the waveguide layer. In a total reflection waveguide, the guided light is confined in the waveguide layer by utilizing total reflection, so that the total reflection condition $n_w \sin \theta_w > 1$ is satisfied. However, in a slow light waveguide, light is confined in the waveguide by using multilayer reflective films present above and below the waveguide, and part of the guided light is emitted through the multilayer reflective films, so that $n_w \sin \theta_w < 1$. The propagation constant in the total reflection waveguide cannot be the same as the propagation constant in the slow light waveguide from which part of the guided light is emitted. The electric field intensity distribution in a total reflection waveguide shown in FIG. 70 has a peak within the waveguide as shown in FIG. 71, and the electric field intensity decreases monotonically outside the waveguide. In a slow light waveguide shown in FIG. 72, the electric field intensity distribution is as shown in FIG. 73. The electric field intensity distribution has a peak within the waveguide, as in the above case. However, the guided light is reflected in the dielectric multilayer films due to interference. Therefore, as shown in FIG. 73, the electric field intensity penetrates deep into the dielectric multilayer films and varies in a vibrating manner. As described above, the propagation constant of the guided light and the electric field intensity distribution in the total reflection waveguide differ largely from those in the slow light waveguide. Therefore, it has not been contemplated to connect a total reflection waveguide directly to a slow light waveguide. The present inventors have found that a total reflection waveguide can be connected directly to an optical waveguide layer having a variable refractive index and/or a variable thickness.

The present inventors have also found that, by disposing these two types of waveguides on a common substrate, an optical scanning device can be produced easily. Specifically, the two types of waveguides may be disposed on a single integrally formed substrate. A general waveguide is produced on a substrate using a semiconductor process. The structure of the waveguide is generally formed on the substrate using, for example, a combination of deposition by vacuum evaporation, sputtering, etc. and fine patterning by lithography, etching, etc. Examples of the material of the substrate include Si, $SiO_2$, GaAs, and GaN.

A reflective waveguide can be produced using a similar semiconductor process. In the reflective waveguide, one of a pair of mirrors sandwiching an optical waveguide layer allows light to pass through, and the light is thereby emitted. In most cases, the mirrors are formed on a glass substrate available at low cost. A substrate made of Si, $SiO_2$, GaAs, GaN, etc. may be used instead of the glass substrate.

Figure 8:
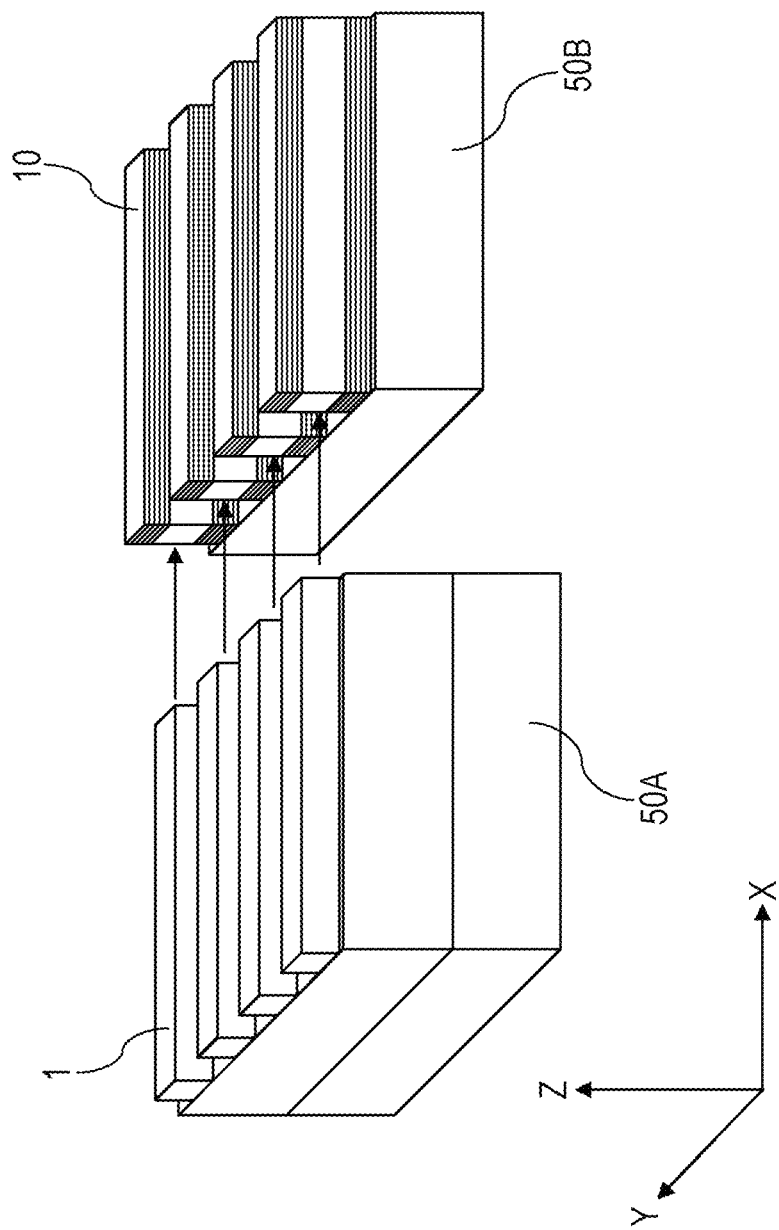
FIG. 8 is an illustration schematically showing connections between a plurality of first waveguides formed on a substrate and a plurality of second waveguides formed on another substrate.

By connecting a reflective waveguide to another waveguide, light can be introduced into the reflective waveguide. FIG. 8 is an illustration schematically showing connections between a plurality of first waveguides 1 produced on a substrate 50A and a plurality of second waveguides 10 produced on another substrate 50B. The two substrates 50A and 50B are disposed parallel to each other in the XY plane. The plurality of first waveguides 1 and the plurality of second waveguides 10 extend in the X direction and are arranged in the Y direction. The first waveguides 1 are, for example, general waveguides that use total reflection of light. The second waveguides 10 are reflective waveguides.

The first waveguides 1 and the second waveguides 10 disposed on the different substrates 50A and 50B, respectively, are aligned and connected with each other, and this allows light to be introduced from the first waveguides 1 into the second waveguides 10.

To introduce light from the first waveguides 1 into the second waveguides 10 efficiently, it is desired that the waveguides are aligned with very high precision on the order of 10 nm. Even when the waveguides are aligned with high precision, if the thermal expansion coefficients of the two substrates 50A and 50B differ from each other, the alignment may be changed due to a change in temperature. For example, the thermal expansion coefficients of Si, $SiO_2$, GaAs, and GaN are about 4, 0.5, 6, and 5 ($\times 10^{-6}$/K), respectively, and the thermal expansion coefficient of BK7, which is often used for a glass substrate, is 9 ($\times 10^{-6}$/K). Even when any two of these materials are used for the above substrates, the difference in thermal expansion coefficient is $1 \times 10^{-6}$/K or more. For example, when the size of the substrates 50A and 50B in the arrangement direction of the plurality of first waveguides 1 and the plurality of second waveguides 10 (in the Y direction in FIG. 8) is 1 mm, a temperature change of 1° C. causes the alignment between the two substrates 50A and 50B to be changed by 1 nm. A temperature change of several tens of degrees Celsius causes the alignment between the two substrates 50A and 50B to be largely changed by several tens to several hundreds of nanometers. Therefore, light cannot be efficiently introduced from the first waveguides 1 into the second waveguides 10.

The present inventors have found that the above problem can be solved by disposing the first waveguides and the second waveguides on the same substrate. When these waveguides are disposed on the common substrate, the first waveguides and the second waveguides can be easily aligned with each other. Moreover, a change in the alignment between the first waveguides and the second waveguides due to thermal expansion can be prevented. Therefore, light can be efficiently introduced from the first waveguides into the second waveguides.

An optical scanning device in one embodiment of the present disclosure includes a first waveguide, a second waveguide connected to the first waveguide, and a substrate that supports the first and second waveguides. The second waveguide includes a first mirror having a multilayer reflective film, a second mirror having a multilayer reflective film facing the multilayer reflective film of the first mirror, and an optical waveguide layer that is located between the first mirror and the second mirror and propagates light inputted to the first waveguide and transmitted through the first waveguide. The first mirror has a higher light transmittance than the second mirror and allows part of the light propagating through the optical waveguide layer to be emitted to the outside of the optical waveguide layer. The optical scanning device further includes an adjusting element that changes at least one of the refractive index and thickness of the optical waveguide layer to thereby change the direction of the emitted light.

In the present embodiment, the "second waveguide" corresponds to the "waveguide element" in the preceding embodiment. In the present embodiment of the present disclosure, the first waveguide whose refractive index and thickness are maintained constant is disposed upstream of the second waveguide, and light is inputted to the first waveguide. The first waveguide propagates the inputted light, and the light is inputted to the second waveguide from its end surface. An end surface of the first waveguide may be connected directly to the end surface of the second waveguide, or, for example, a gap may be provided between these end surfaces. In the present specification, the phrase "the first waveguide is connected to the second waveguide" means that the first waveguide and the second waveguide are positioned such that light can be transferred between them. The form of "connection between the first waveguide and the second waveguide" includes not only the form in which the first waveguide is connected directly to the second waveguide (i.e., they are in contact with each other) but also the form in which they are disposed through a gap sufficiently shorter than the wavelength of the propagating light. In the present disclosure, the phrase "A is connected directly to B" means that a portion of A and a portion of B are in contact with each other such that light can be transferred between A and B.

In the above structure, since the first waveguide is disposed upstream of the second waveguide (waveguide element), a reduction in coupling efficiency due to scanning (i.e., loss of energy) can be suppressed even when the incident angle of light incident on the first waveguide is held constant.

In the above structure, since the first and second waveguides are disposed on the same substrate, the first and second waveguides are easily aligned with each other. Moreover, a change in the alignment between the first and second waveguides due to thermal expansion can be suppressed. Therefore, light can be efficiently introduced from the first waveguide into the second waveguide.

A third waveguide may be disposed upstream of the first waveguide. The third waveguide is connected to the first waveguide and allows light transmitted through the third waveguide to be inputted to the first waveguide. In one embodiment, the third waveguide may be a total reflection waveguide, and the second waveguide may be a reflective waveguide. The substrate that supports the first and second waveguides may further support the third waveguide.

Figure 9:
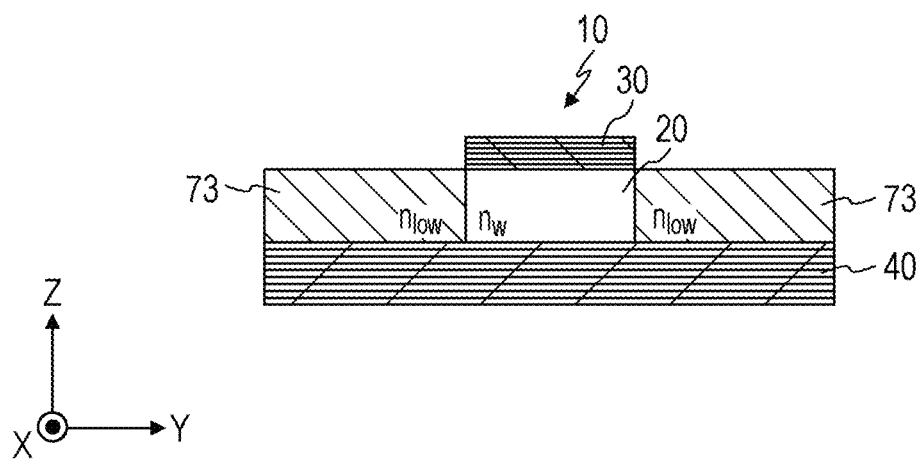
FIG. 9 is a cross-sectional view of a waveguide element in the YZ plane, schematically showing a structural example in which spacers are disposed on both sides of an optical waveguide layer located between a first mirror and a second mirror.

FIG. 9 is a cross-sectional view of a waveguide element 10 in the YZ plane, schematically showing a structural example in which spacers 73 are disposed on both sides of an optical waveguide layer 20 located between a first mirror 30 and a second mirror 40. The refractive index $n_{low}$ of the spacers 73 is lower than the refractive index $n_w$ of the optical waveguide layer ($n_{low} < n_w$). The spacers 73 may be, for example, air. The spacers 73 may be, for example, $TiO_2$, $Ta_2O_5$, SiN, AlN, $SiO_2$, etc., so long as the spacers 73 have a lower refractive index than the optical waveguide layer.

Figure 10:
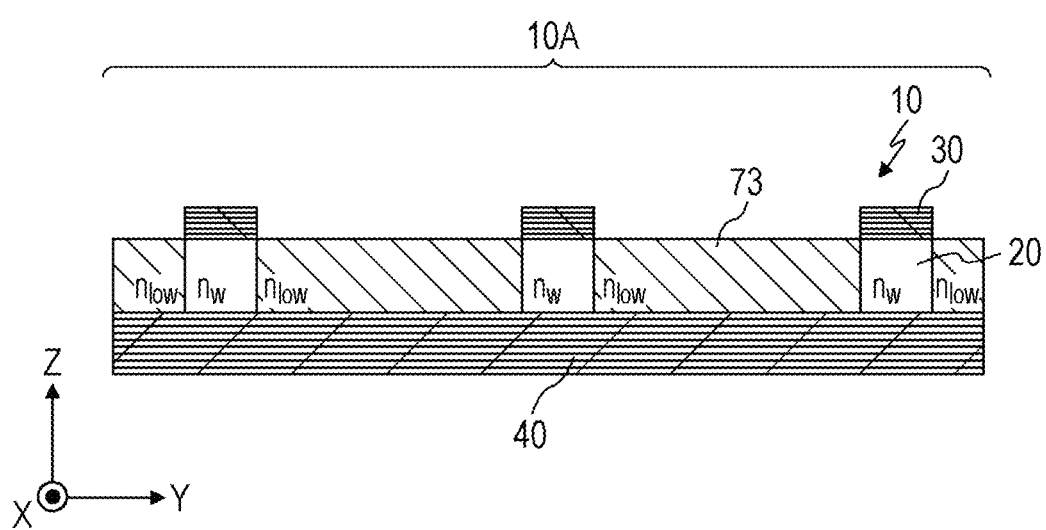
FIG. 10 is a cross-sectional view of an optical scanning device in the YZ plane, schematically showing a structural example of a waveguide array prepared by arranging a plurality of the waveguide elements in FIG. 9 in the Y direction.

FIG. 10 is a cross-sectional view of an optical scanning device in the YZ plane, schematically showing a structural example of a waveguide array 10A in which the waveguide elements 10 in FIG. 9 are arranged in the Y direction. In the structural example in FIG. 10, the width of the first mirrors 30 in the Y direction is the same as the width of the optical waveguide layers 20. The leak of guided light from regions in which no first mirror 30 is present is reduced if the width of the first mirror 30 is longer than the width of the optical waveguide layers 20. In an array of a plurality of waveguide elements 10 including a plurality of reflective waveguides, leakage of guided light can be prevented when at least one of the width of first mirrors 30 and the width of second mirrors 40 is larger than the width of optical waveguide layers 20. However, such an idea has not been employed previously.

To improve light scanning performance, it is desirable to reduce the width of each of the waveguide elements 10 of the waveguide array 10A. However, in this case, the guided light leakage problem becomes more prominent.

The reason for the leakage of guided light will be described.

Figure 11:
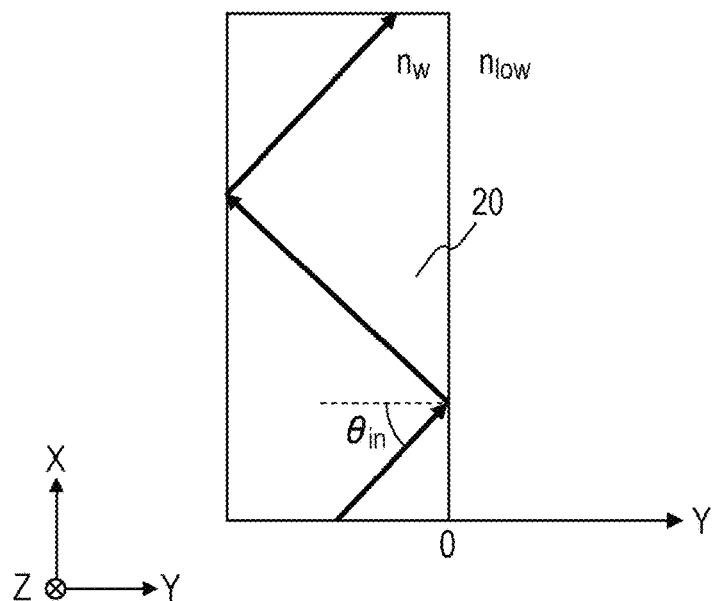
FIG. 11 is an illustration schematically showing propagation of guided light in the X direction within an optical waveguide layer.

FIG. 11 is an illustration schematically showing propagation of guided light in the X direction within an optical waveguide layer 20. Since $n_w > n_{low}$, the guided light is confined by total reflection in the ±Y directions and propagates in the X direction. However, in practice, evanescent light leaks out from the Y direction edge surfaces of the optical waveguide layer 20. As shown in FIG. 2, the guided light propagates in the X direction at an angle smaller than the total reflection angle $\theta_{in}$ while reflected by the first and second mirrors 30 and 40 in the ±Z directions. In this case, in the regions with no first mirror 30 shown in FIG. 10, the evanescent light is not reflected and leaks to the outside. This unintended light loss may cause the amount of light used for optical scanning to be reduced.

The present inventors have found that the above problem can be solved by setting at least one of the width of the first mirrors 30 in the arrangement direction of the plurality of waveguide elements 10 and the width of the second mirrors 40 to be larger than the width of the optical waveguide layers 20. This can reduce the unintended light loss described above. Therefore, a reduction in the amount of light used for optical scanning is prevented.

The present disclosure encompasses devices described in the following items.

[Item 1] An optical scanning device including:

a waveguide array including a plurality of waveguide elements that are arranged in a first direction and that propagate light in a second direction intersecting the first direction, the waveguide array being configured to emit light from the plurality of waveguide elements in a third direction intersecting a plane formed by the first and second directions; and a first adjusting element that changes the third direction in which the light is emitted from the plurality of waveguide elements, wherein each of the plurality of waveguide elements includes a first mirror extending in the second direction and having a reflecting surface that intersects the third direction, a second mirror extending in the second direction and having a reflecting surface that faces the reflecting surface of the first mirror, and an optical waveguide layer that is located between the first mirror and the second mirror and that propagates a light beam in the second direction, wherein, in each of the plurality of waveguide elements, at least one of the width of the first mirror in the first direction and the width of the second mirror in the first direction is larger than the width of the optical waveguide layer in the first direction, and the first mirror has a higher light transmittance than the second mirror and allows part of the light beam propagating through the optical waveguide layer to be emitted to the outside of the optical waveguide layer, and wherein the first adjusting element changes at least one of the refractive index and thickness of the optical waveguide layer of each of the waveguide elements to thereby change the third direction in which the light is emitted from the plurality of waveguide elements.

[Item 2] The optical scanning device according to item 1, wherein, in each of the plurality of waveguide elements, at least one of the first and second mirrors has a protruding portion that protrudes in the first direction from an edge surface of the optical waveguide layer, and $y_1 \geq 7 y_d$ holds, where $y_1$ is the size of the protruding portion in the first direction, and $y_d$ is the distance in the first direction between the edge surface of the optical waveguide layer and a position at which the light intensity of evanescent light from the optical waveguide layer is 1/e of the light intensity of the evanescent light from the optical waveguide layer at the edge surface of the optical waveguide layer, where e is the base of natural logarithm.

[Item 3] The optical scanning device according to item 1, wherein, in each of the plurality of waveguide elements, at least one of the first and second mirrors has a portion protruding in the first direction from an edge surface of the optical waveguide layer, and wherein $y_1 \geq 11 y_d$ holds, where $y_1$ is the size of the protruding portion in the first direction, and $y_d$ is the distance in the first direction between the edge surface of the optical waveguide layer and a position at which the light intensity of evanescent light from the optical waveguide layer is 1/e of the light intensity of the evanescent light from the optical waveguide layer at the edge surface of the optical waveguide layer, where e is the base of natural logarithm.

[Item 4] The optical scanning device according to item 1, wherein at least one of the first and second mirrors of each of the waveguide elements is part of one integrated mirror.

[Item 5] The optical scanning device according to item 1, wherein the first mirror of each of the waveguide elements is part of one integrated mirror, and wherein the second mirror of each of the waveguide elements is part of another integrated mirror.

[Item 6] The optical scanning device according to any of items 1 to 5, wherein a region between the optical waveguide layers of each two adjacent waveguides of the plurality of waveguides contains a material having a lower refractive index than the optical waveguide layers.

[Item 7] The optical scanning device according to any of items 1 to 6, wherein the optical waveguide layer of each of the waveguide elements contains a material whose refractive index for the light beam propagating through the optical waveguide layer is changed when a voltage is applied, and wherein the first adjusting element includes a pair of electrodes sandwiching one or more optical waveguide layers of the waveguide elements and changes the refractive index of each of the one or more optical waveguide layers by applying a voltage to the pair of electrodes.

[Item 8] The optical scanning device according to item 7, wherein the optical waveguide layer of each of the waveguide elements contains an electrooptical material, and wherein the first adjusting element changes the refractive index of the electrooptical material by applying a voltage to the pair of electrodes.

[Item 9] The optical scanning device according to item 7, wherein the optical waveguide layer of each of the waveguide elements contains a liquid crystal material, and wherein the first adjusting element changes the refractive index anisotropy of the liquid crystal material by applying a voltage to the pair of electrodes to thereby change the refractive index of the one or more optical waveguide layer.

[Item 10] The optical scanning device according to item 8, wherein a region between the optical waveguide layers of each two adjacent waveguides of the plurality of waveguides contains $SiO_2$, $TiO_2$, $Ta_2O_5$, SiN, AlN, or air.

[Item 11] The optical scanning device according to item 9, wherein the region between the optical waveguide layers of each two adjacent waveguides of the plurality of waveguides contains $SiO_2$ or air.

[Item 12] The optical scanning device according to any of items 1 to 11, wherein, when a second direction component of the wave vector of the light emitted in the third direction is denoted as an X component and a first direction component of the wave vector is denoted as a Y component, the first adjusting element changes at least one of the refractive index and thickness of the optical waveguide layer of each of the waveguide elements to thereby change the X component of the wave vector, and the Y component of the wave vector is changed when the difference in phase between light beams to be supplied to each two adjacent waveguide elements of the plurality of waveguide elements is changed.

[Item 13] The optical scanning device according to any of items 1 to 12, wherein the first direction is orthogonal to the second direction.

[Item 14] The optical scanning device according to any of items 1 to 13, wherein the plurality of waveguide elements are arranged in the first direction at regular intervals.

[Item 15] The optical scanning device according to any of items 1 to 14, wherein, in each of the plurality of waveguide elements, at least one of the first and second mirrors includes a dielectric multilayer film.

[Item 16] The optical scanning device according to any of items 1 to 15, further including:

a plurality of phase shifters connected to the respective waveguide elements, each of the plurality of phase shifters including a waveguide that is connected to the optical waveguide layer of a corresponding one of the plurality of waveguide elements directly or through another waveguide; and a second adjusting element that changes phase differences between light beams propagating from the plurality of phase shifters to the plurality of waveguide elements to thereby change the third direction in which the light is emitted from the plurality of waveguide elements.

[Item 17] The optical scanning device according to item 16, wherein the waveguide of each of the phase shifters contains a material whose refractive index is changed when a voltage is applied or temperature is changed, and wherein the second adjusting element changes the refractive index of the waveguide of each of the phase shifters by applying a voltage to the waveguide or changing the temperature of the waveguide to thereby change the phase differences between the light beams propagating from the plurality of phase shifters to the plurality of waveguide elements.

[Item 18] A photoreceiver device including:

a waveguide array including a plurality of waveguide elements that are arranged in a first direction and propagate light in a second direction intersecting the first direction, the waveguide array being configured to allow light entering the plurality of waveguide elements in a third direction intersecting both the first and second directions to propagate in the second direction; and a first adjusting element that adjusts a light-receivable direction, wherein each of the plurality of waveguide elements includes:

a first mirror extending in the second direction and having a reflecting surface that intersects the third direction;

a second mirror extending in the second direction and having a reflecting surface that faces the reflecting surface of the first mirror; and an optical waveguide layer that is located between the first mirror and the second mirror and propagates light in the second direction, wherein, in each of the plurality of waveguide elements, at least one of the width of the first mirror in the first direction and the width of the second mirror in the first direction is larger than the width of the optical waveguide layer in the first direction, and wherein the first adjusting element changes at least one of the refractive index and thickness of the optical waveguide layer of each of the waveguide elements to thereby change the light-receivable direction.

[Item 19] The photoreceiver device according to item 18, further including:

a plurality of phase shifters connected to the respective waveguide elements, each of the plurality of phase shifters including a waveguide that is connected to the optical waveguide layer of a corresponding one of the plurality of waveguide elements directly or through another waveguide; and a second adjusting element that changes phase differences between light beams passing through the plurality of phase shifters and outputted from the plurality of waveguide elements to thereby change the light-receivable direction.

[Item 20] A LiDAR system including:

the optical scanning device according to any of items 1 to 17;

a photodetector that detects light emitted from the optical scanning device and reflected from a target; and a signal processing circuit that generates distance distribution data based on an output from the photodetector.

In the present disclosure, the "light" means electromagnetic waves including not only visible light (wavelength: about 400 nm to about 700 nm) but also ultraviolet rays (wavelength: about 10 nm to about 400 nm) and infrared rays (wavelength: about 700 nm to about 1 mm). In the present specification, the ultraviolet rays may be referred to as "ultraviolet light," and the infrared rays may be referred to as "infrared light."

In the present disclosure, the "scanning" with light means that the direction of the light is changed. The "one-dimensional scanning" means that the direction of the light is linearly changed in a direction intersecting the direction of the light. The "two-dimensional scanning" means that the direction of the light is changed two-dimensionally along a plane intersecting the direction of the light.

Embodiments of the present disclosure will next be described more specifically. However, unnecessarily detailed description may be omitted. For example, detailed description of well-known matters and redundant description of substantially the same structures may be omitted. This is to avoid unnecessary redundancy in the following description and to facilitate understanding by those skilled in the art. The present inventors provide the accompanying drawings and the following description to allow those skilled in the art to fully understand the present disclosure. The accompanying drawings and the following description are not intended to limit the subject matter defined in the claims. In the following description, the same or similar components are denoted by the same reference numerals.

EMBODIMENTS

Figure 12:
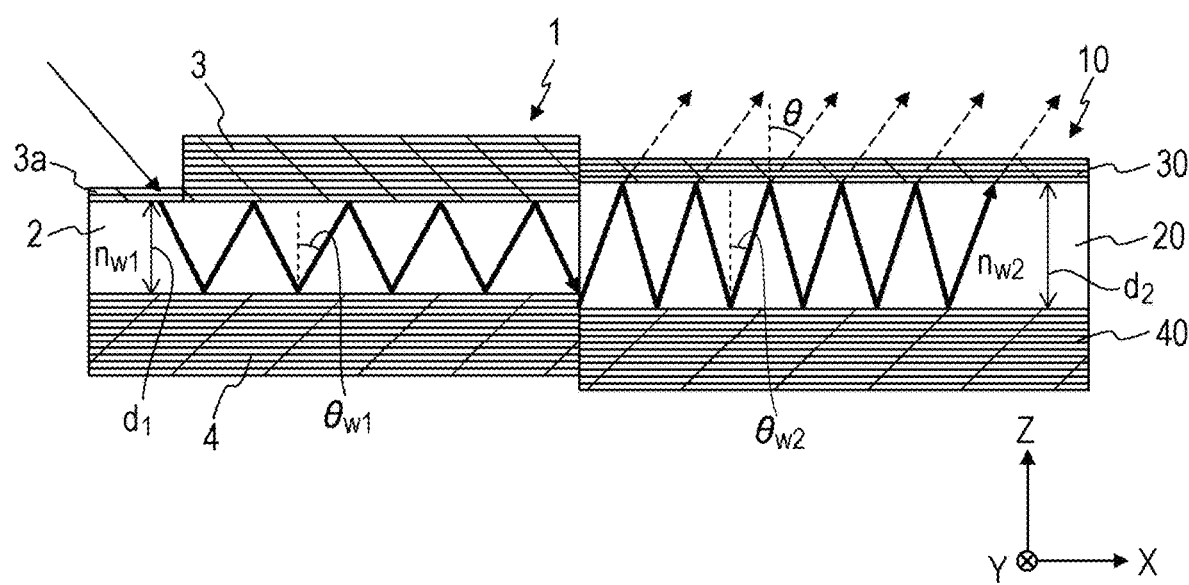
FIG. 12 is a cross-sectional view schematically showing part of the structure of an optical scanning device in an exemplary embodiment of the present disclosure.

FIG. 12 is a cross-sectional view schematically showing part of the structure of an optical scanning device in an exemplary embodiment of the present disclosure. The optical scanning device includes a first waveguide 1 and a second waveguide (also referred to as waveguide element) 10 connected to the first waveguide. The second waveguide 10 includes a first mirror 30 including a multilayer reflective film, a second mirror 40 including a multilayer reflective film facing the multilayer reflective film of the first mirror 30, and an optical waveguide layer 20 located between the first mirror 30 and the second mirror 40. The optical waveguide layer 20 propagates light inputted into the first waveguide 1 and transmitted through the first waveguide 1. The optical waveguide layer 20 propagates the light in the same direction as the guiding direction of the first waveguide 1. The first mirror 30 has a higher light transmittance than the second mirror 40 and allows part of the light propagating through the optical waveguide layer 20 to be emitted to the outside of the optical waveguide layer 20. Although not shown in FIG. 12, the optical scanning device 100 further includes an adjusting element that changes at least one of the refractive index and thickness of the optical waveguide layer 20. The optical waveguide layer 20 contains a material whose refractive index for the light propagating through the optical waveguide layer 20 is changed when, for example, a voltage is applied. The adjusting element changes the refractive index of the optical waveguide layer 20 by applying a voltage to the optical waveguide layer 20 to thereby change the direction of the light emitted from the second waveguide 10.

The first waveguide 1 includes two opposed multilayer reflective films 3 and 4 and an optical waveguide layer 2 sandwiched between the two multilayer reflective films 3 and 4. To transmit the light guided by the first waveguide 1 with no loss, it is desirable that the multilayer reflective films 3 and 4 in the first waveguide 1 have higher reflectance (lower transmittance) than the light-emitting-side multilayer reflective film (the first mirror 30) of the second waveguide 10. Therefore, desirably, the thicknesses of the multilayer reflective films 3 and 4 are larger than the thickness of the first mirror 30. The refractive index of the first waveguide 1, i.e., the refractive index of the optical waveguide layer 2 of the first waveguide 1, is unchanged or is changed by an amount different from the amount of change in the refractive index of the optical waveguide layer 20. The thickness of the optical waveguide layer 2 is unchanged or is changed by an amount different from the amount of change in the thickness of the optical waveguide layer 20. The first waveguide 1 is connected directly to the optical waveguide layer 20 of the second waveguide 10. For example, an end surface of the optical waveguide layer 2 of the first waveguide 1 is connected to an end surface of the optical waveguide layer 20 of the second waveguide 10. The multilayer reflective film 3 in this example has a portion 3a having a smaller thickness (i.e., lower reflectance) than its adjacent portion. Light is inputted from the portion 3a (referred to also as a "light inputting portion 3a"). By inputting the light from the low-reflectance region, the light can be efficiently introduced into the optical waveguide layer 2. The optical waveguide layer 2 propagates the light entering the light inputting portion 3a, and the light is inputted to the end surface of the optical waveguide layer 20 of the second waveguide 10. In this manner, the light propagates from the optical waveguide layer 2 to the optical waveguide layer 20 and can be emitted through the mirror 30.

In the second waveguide 10, the reflectance of the multilayer reflective film of the first mirror 30 is lower than the reflectance of the multilayer reflective film of the second mirror 40 because it is necessary to emit light through the first mirror 30. The first waveguide 1 is designed such that the reflectance of the multilayer reflective films 3 and 4 is comparable to the reflectance of the second mirror 40 in order to prevent light emission.

With the above-described structure, the optical scanning device can efficiently emit light from the second waveguide 10, as described later.

Figure 13:
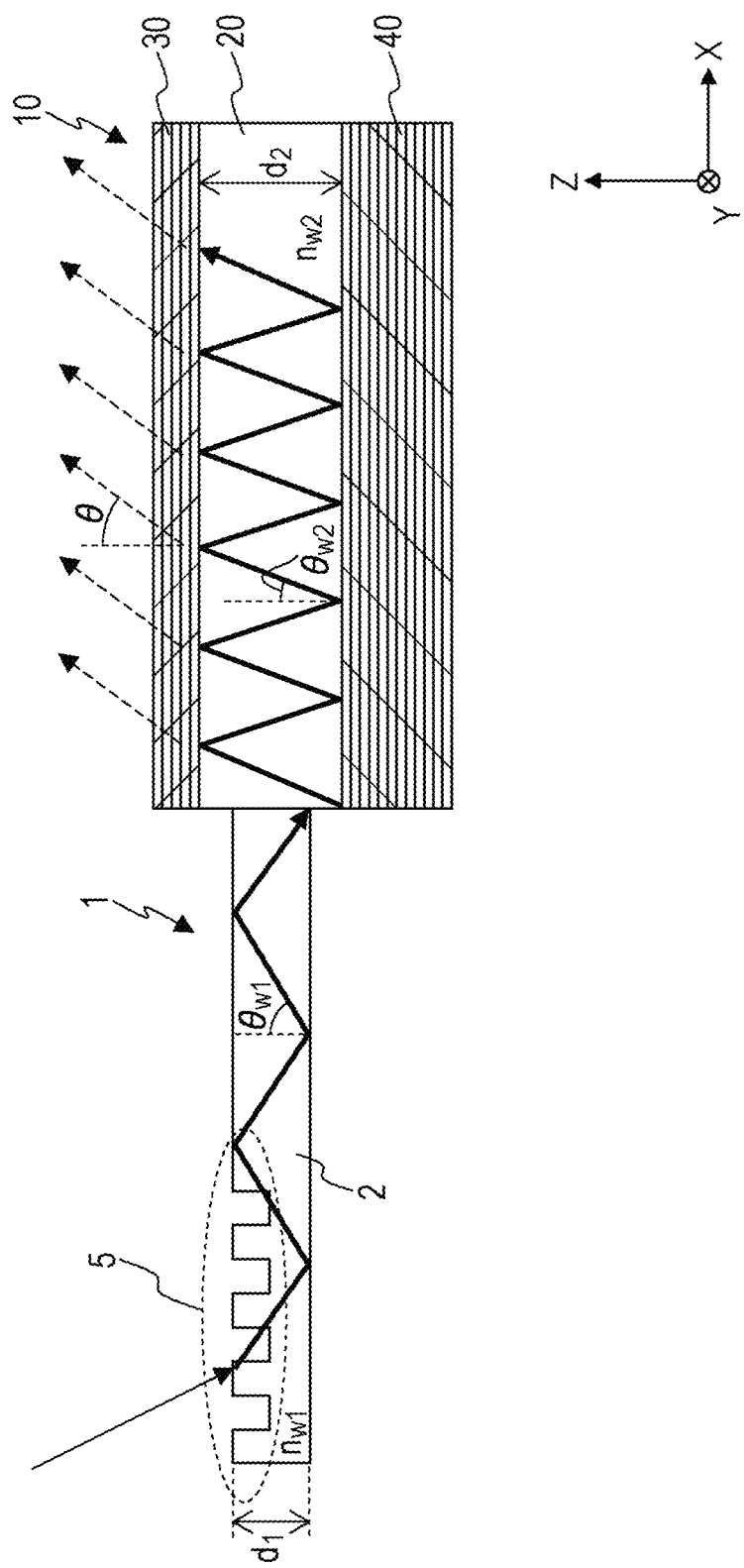
FIG. 13 is a cross-sectional view schematically showing another example of the structure of the optical scanning device.

FIG. 13 is a cross-sectional view schematically showing another example of the structure of the optical scanning device. In this example, the first waveguide 1 includes no multilayer reflective films 3 and 4. The first waveguide 1 propagates light by total reflection. The first waveguide 1 has a grating 5 on part of its surface. Light is inputted through the grating 5. In this example, the portion in which the grating 5 is disposed serves as a light inputting portion. By providing the grating 5, the light can be easily introduced into the first waveguide 1. When no multilayer reflective films 3 and 4 are provided as in this example, the first waveguide 1 is designed such that the angle $\theta_{w1}$ of the guided light satisfies the total reflection condition. Also in this case, the refractive index of the first waveguide 1 is unchanged or is changed by an amount different from the amount of change in the refractive index of the optical waveguide layer 20. The thickness of the first waveguide 1, i.e., the thickness of the optical waveguide layer 2, is unchanged or is changed by an amount different from the amount of change in the thickness of the optical waveguide layer 20. The first waveguide 1 is connected directly to the optical waveguide layer 20 of the second waveguide 10. The optical waveguide layer 20 propagates the light in the same direction as the guiding direction of the first waveguide 1.

Figure 14:
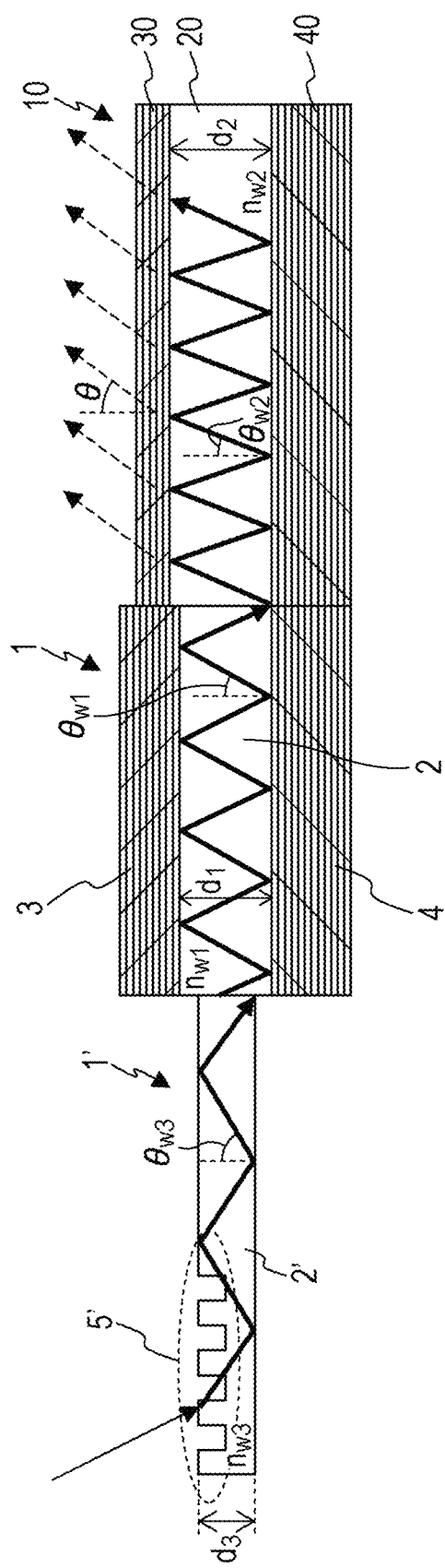
FIG. 14 is a cross-sectional view schematically showing yet another example of the structure of the optical scanning device.

FIG. 14 is a cross-sectional view schematically showing yet another example of the structure of the optical scanning device. The optical scanning device in this example further includes a third waveguide 1' connected to the first waveguide 1. The first waveguide 1 is a reflective waveguide and includes two opposed multilayer reflective films 3 and 4 and an optical waveguide layer 2 disposed therebetween. The third waveguide 1' is a total reflection waveguide that propagates light by total reflection. The refractive index of the third waveguide 1' is unchanged or is changed by an amount different from the amount of change in the refractive index of the optical waveguide layer 20. The thickness of the third waveguide 1', i.e., the thickness of an optical waveguide layer 2', is unchanged or is changed by an amount different from the amount of change in the thickness of the optical waveguide layer 20. The third waveguide 1' is connected directly to the optical waveguide layer 2 of the first waveguide 1. The optical waveguide layer 20 propagates light in the same direction as the guiding direction of the third waveguide 1'. The third waveguide 1' has a grating 5' on part of its surface, as does the first waveguide 1 in the example in FIG. 13. Light from a light source is inputted to the third waveguide 1' through the grating 5'. In this example, the portion in which the grating 5' is disposed serves as a light inputting portion. The refractive index or thickness of the optical waveguide layer 20 of the second waveguide 10 is modulated by an unillustrated adjusting element (modulating element). No modulating function is provided for the first waveguide 1. To prevent light emission from the first waveguide 1, the reflectance of the reflecting mirrors (the multilayer reflective films 3 and 4) of the first waveguide 1 is set to be higher than the reflectance of the first mirror 30 of the second waveguide 10. The reflectance of the first mirror 30 of the second waveguide 10 is set to be lower than the reflectance of the second mirror 40. With this structure, the light inputted into the third waveguide 1' propagates through the third waveguide 1' and the first waveguide 1 and is inputted into the second waveguide 10. The inputted light is emitted to the outside through the first mirror 30 while propagating through the optical waveguide layer 20 of the second waveguide 10.

Figure 15:
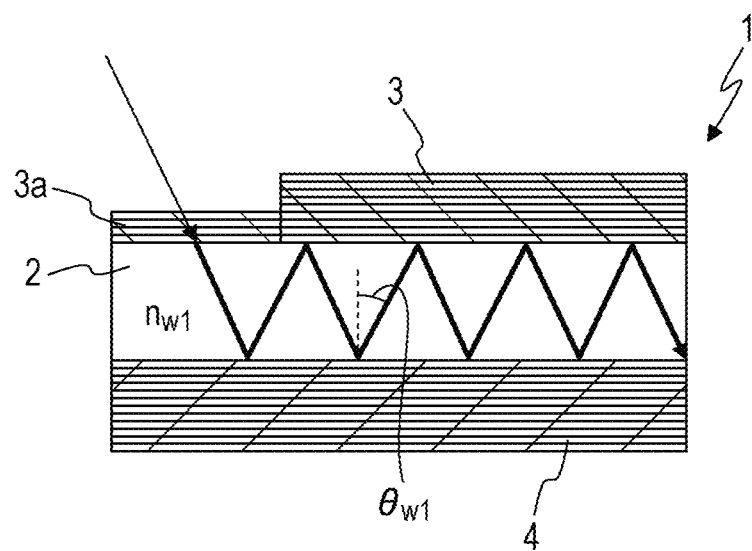
FIG. 15 shows an example in which light enters an optical waveguide layer sandwiched between two multilayer reflective films, as in the example shown in FIG. 12.
Figure 16A:
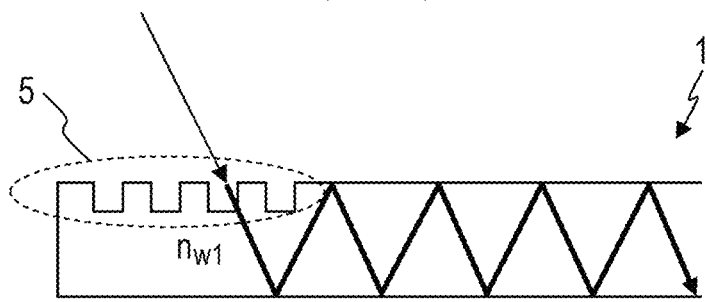
FIG. 16A shows an example in which light is introduced into a first waveguide through a grating disposed on a surface of the first waveguide, as in the example shown in FIG. 13.
Figure 16B:
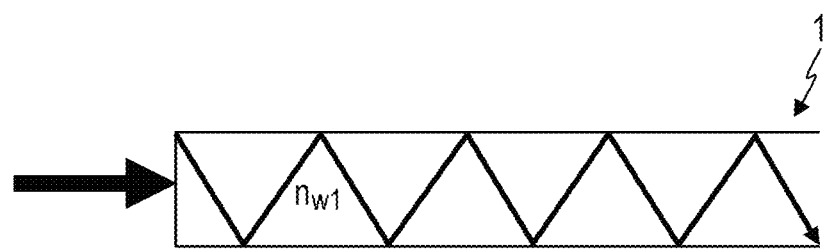
FIG. 16B shows an example in which light is inputted from an end surface of the first waveguide.
Figure 16C:
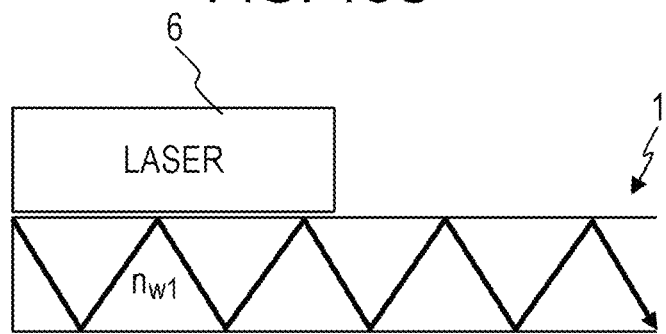
FIG. 16C shows an example in which light is inputted from a laser light source disposed on the surface of the first waveguide through the surface.

FIGS. 15 and 16A to 16C are illustrations showing examples of a method for inputting light into the first waveguide 1 in a structure configured such that the light is inputted to the first waveguide 1. FIG. 15 shows an example in which light enters an optical waveguide layer 2 sandwiched between two multilayer reflective films, as in the example shown in FIG. 12. As shown in FIG. 15, by causing the light to be incident on a small-thickness portion (i.e., low-reflectance portion) 3a of a multilayer reflective film, the light can be efficiently introduced into the optical waveguide layer 2. FIG. 16A shows an example in which light is introduced into a first waveguide 1 through a grating 5 formed on a surface of the first waveguide 1, as in the example shown in FIG. 13. FIG. 16B shows an example in which light is inputted from an end surface of a first waveguide 1. FIG. 16C shows an example in which light is inputted from a laser light source 6 disposed on a surface of a first waveguide 1 through this surface. The structure shown in FIG. 16C is disclosed in, for example, M. Lamponi et al., "Low-Threshold Heterogeneously Integrated InP/SOI Lasers With a Double Adiabatic Taper Coupler," IEEE PHOTONICS TECHNOLOGY LETTERS, VOL. 24, NO. 1, Jan. 1, 2012, pp 76-78. The entire disclosure of this document is incorporated herein. With any of the above structures, light can be efficiently introduced into the waveguide 1.

The light inputting methods shown in FIGS. 15 to 16C are applicable also to the structure using the third waveguide 1' shown in FIG. 14. In the example shown in FIG. 14, the grating 5' is provided on part of a surface of the third waveguide 1', but the grating 5' may not be provided. For example, the light inputting method shown in FIG. 16B or 16C may be applied to the third waveguide 1'. When the light inputting method shown in FIG. 16B is applied to the third waveguide 1', the third waveguide 1' propagates the light entering from an end surface of the third waveguide 1', and the propagating light is inputted to an end surface of the first waveguide 1. When the light inputting method shown in FIG. 16C is applied to the third waveguide 1', light is inputted from the laser light source disposed on a surface of the third waveguide 1' through this surface. The third waveguide 1' propagates the inputted light, and this light is inputted to the end surface of the first waveguide 1. The third waveguide 1' is not necessarily a total reflection waveguide and may be the reflective waveguide shown in FIG. 15.

As shown in FIGS. 12 and 13, the refractive index of the optical waveguide layer 2 of the first waveguide 1 is denoted by $n_{w1}$, and the refractive index of the optical waveguide layer 20 of the second waveguide 10 is denoted by $n_{w2}$. The emergent angle of light from the second waveguide 10 is denoted by $\theta$. The reflection angle of the guided light in the first waveguide 1 is denoted by $\theta_{w1}$, and the reflection angle of the guided light in the second waveguide 10 is denoted by $\theta_{w2}$. As shown in FIG. 14, the refractive index of the optical waveguide layer 2' of the third waveguide 1' is denoted by $n_{w3}$, and the reflection angle of the guided light in the third waveguide 1' is denoted by $\theta_{w3}$. In the present embodiment, to allow light to be extracted from the second waveguide 10 to the outside (an air layer having a refractive index of 1), $n_{w2} \sin \theta_{w2} = \sin \theta < 1$ holds.

<Principle of Coupling of Guided Light>

Referring next to FIGS. 12 and 13, the principle of coupling of the guided light between waveguides 1 and 10 will be described. For the sake of simplicity, the light propagating through the waveguides 1 and 10 is approximately assumed to be a ray of light. It is assumed that light undergoes total reflection at the interfaces between the optical waveguide layer 20 and the upper and lower multilayer reflective films of the waveguide 10 and at the interfaces between the optical waveguide layer 2 and the upper and lower multilayer reflective films of the waveguide 1 (or the interfaces between the optical waveguide layer 2 and the external medium). The thickness of the optical waveguide layer 2 of the first waveguide 1 is denoted by $d_1$, and the thickness of the optical waveguide layer 20 of the second waveguide 10 is denoted by $d_2$. Then, conditions that allow propagating light to be present in the waveguides 1 and 10 are represented by the following formulas (5) and (6), respectively.

$$2d_1 n_{w1} \cos \theta_{w1} = m\lambda \quad (5)$$

$$2d_2 n_{w2} \cos \theta_{w2} = m\lambda \quad (6)$$

Here, $\lambda$ is the wavelength of the light, and m is an integer of 1 or more.

In consideration of the Snell's law at the interface between the waveguides 1 and 10, formula (7) holds.

$$n_{w1} \sin(90°-\theta_{w1}) = n_{w2} \sin(90°-\theta_{w2}) \quad (7)$$

By modifying formula (7), formula (8) below is obtained.

$$n_{w1} \cos \theta_{w1} = n_{w2} \cos \theta_{w2} \quad (8)$$

Suppose that formulas (5) and (8) hold. Then formula (6) holds even when $n_{w2}$ changes, provided that $d_1$ is equal to $d_2$. Specifically, even when the refractive index of the optical waveguide layer 20 is changed, light can propagate from the optical waveguide layer 2 to the optical waveguide layer 20 efficiently.

To derive the above formulas, the light is assumed to be a ray of light for simplicity. In practice, since the thicknesses $d_1$ and $d_2$ are comparative to the wavelength $\lambda$ (at most 10 times the wavelength), the guided light has wave characteristics. Therefore, strictly speaking, it is necessary that the effective refractive indexes of the optical waveguide layers 2 and 20, instead of the refractive indexes of their materials, must be used as the above refractive indexes $n_{w1}$ and $n_{w2}$. Even when the thickness $d_1$ of the optical waveguide layer 2 is not the same as the thickness $d_2$ of the optical waveguide layer 20 or, strictly speaking, when formula (8) does not hold, light can be guided from the optical waveguide layer 2 to the optical waveguide layer 20. This is because the light is transmitted from the optical waveguide layer 2 to the optical waveguide layer 20 in a near field. Specifically, when the electric field distribution in the optical waveguide layer 2 overlaps the electric field distribution in the optical waveguide layer 20, light is transmitted from the optical waveguide layer 2 to the optical waveguide layer 20.

The above discussion holds also for the guided light between the third waveguide 1' and the first waveguide 1 in the example shown in FIG. 14.

<Results of Computations>

To examine the effects of the present embodiment, the present inventors computed the coupling efficiency of light under various conditions. FIMMWAVE available from Photon Design was used for the computations.

First, the coupling efficiency in a structure in which both the waveguides 1 and 10 were sandwiched between multilayer reflective films as shown in FIG. 12 was computed. In the following computations, the mode order of light propagating from the waveguide 1 to the waveguide 10 is m=2. When the mode order of light in the waveguide 1 is the same as the mode order of light in the waveguide 10, the light is coupled by the same principle. Therefore, the mode order of the light is not limited to m=2.

Figure 17:
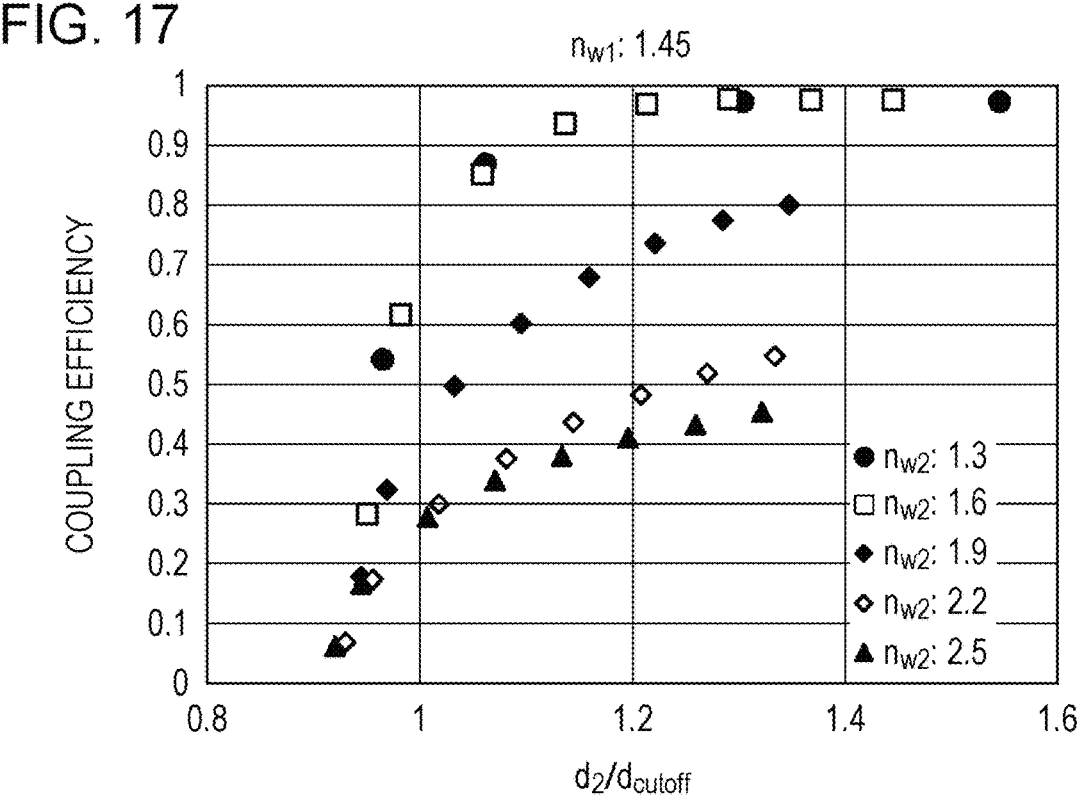
FIG. 17 shows the $d_2$ dependence of the coupling efficiency of guided light from a waveguide to a waveguide when $n_{w1}$ is 1.45, $d_1$ is 1.27 μm, and the wavelength λ is 1.55 μm.

FIG. 17 shows the $d_2$ dependence of the coupling efficiency of guided light from the waveguide 1 to the waveguide 10 when $n_{w1}$ is 1.45, $d_1$ is 1.27 µm, and the wavelength λ is 1.55 µm. The horizontal axis represents a value obtained by dividing $d_2$ by a cutoff thickness $d_{cutoff}$ (=mλ/(2$n_{w2}$)) when the guided light is assumed to be a ray of light. The vertical axis represents the coupling efficiency normalized by setting the value of a peak to 1. The computations were performed from a lower limit value at which a cutoff condition indicating that no guided light is allowed to be present is satisfied to an upper limit value at which light is emitted to the outside. The computations were performed when $n_{w2}$ was 1.3, 1.6, 1.9, 2.2, and 2.5. The center of the first waveguide 1 in its thickness direction matches the center of the second waveguide 10 in its thickness direction. As can be seen from the results in FIG. 17, the larger $d_2/d_{cutoff}$, the higher the coupling efficiency. As $d_2/d_{cutoff}$ decreases, the mode is not allowed to be present, and the coupling efficiency decreases.

Figure 18:
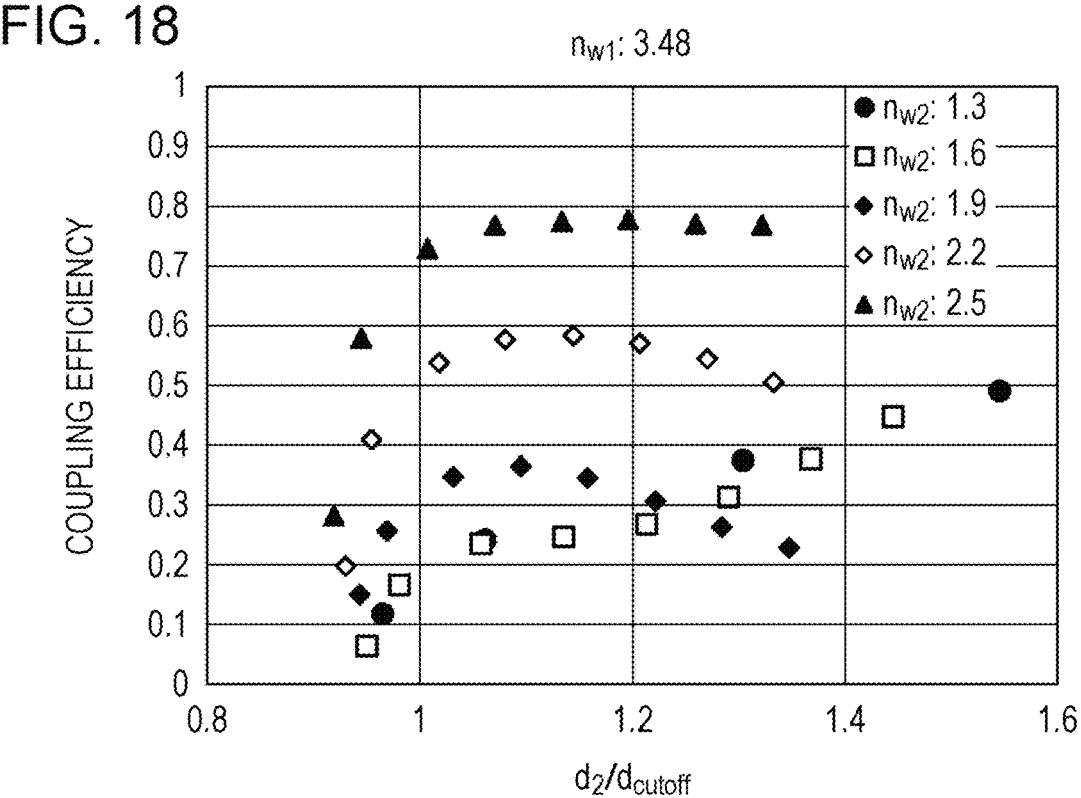
FIG. 18 shows the results of computations performed using the same method as in FIG. 17 except that $n_{w1}$ was changed to 3.48 and $d_1$ was changed to 0.5 μm.

FIG. 18 shows the results of computations performed using the same method except that $n_{w1}$ was changed to 3.48 and $d_1$ was changed to 0.5 µm. Also in this case, the mode order of the light propagating from the waveguide 1 to the waveguide 10 was m=2. However, as described above, the mode order of the light is not limited to m=2. As can be seen from FIG. 18, the larger $d_2/d_{cutoff}$, the higher the coupling efficiency. As $d_2/d_{cutoff}$ decreases, the mode is not allowed to be present, and the coupling efficiency decreases.

The reason that the mode is present (i.e., the guided light is coupled) even when $d_2/d_{cutoff}$ is smaller than 1 in FIGS. 17 and 18 is that the effective thickness of the optical waveguide layer 2 is larger than $d_2$ because of penetration of the light when it is reflected from the multilayer reflective films. The upper limit of $d_2$ is a value at which light is no longer emitted to the outside. This value is determined by assuming that the guided light is a ray of light and undergoes total reflection at the interfaces between each waveguide and the upper and lower multilayer reflective films thereof. Specifically, the upper limit is the value of $d_2$ when the reflection angle of the guided light is equal to the total reflection angle with respect to the air. In this case, the following formula (9) holds.

$$n_{w2} \sin \theta_{w2} = 1 \quad (9)$$

From formulas (6) and (9) and $d_{cutoff}$=mλ/(2$n_{w2}$), the following formula (10) holds.

$$d_2/d_{cutoff} = n_{w2}/\sqrt{(n_{w2}^2-1)} \quad (10)$$

Because of the penetration of the guided light when it is reflected from the multilayer reflective films, the effective refractive index for the guided light becomes lower than $n_{w2}$. Therefore, the upper limit of $d_2$ is larger than that in formula (6).

Desirably, the coupling efficiency in the structure in the present embodiment is higher than that in the structure shown in FIG. 6B. For example, on the condition that the coupling efficiency is 7% or more, which is higher than the peak value shown in FIG. 7, the following relations $$0.95 \times d_{cutoff} < d_2 < 1.5 \times d_{cutoff}$$

$$(0.95 \times m\lambda/(2n_{w2}) < d_2 < 1.5 \times m\lambda/(2n_{w2}))$$

are obtained from the results in FIGS. 17 and 18.

Figure 19:
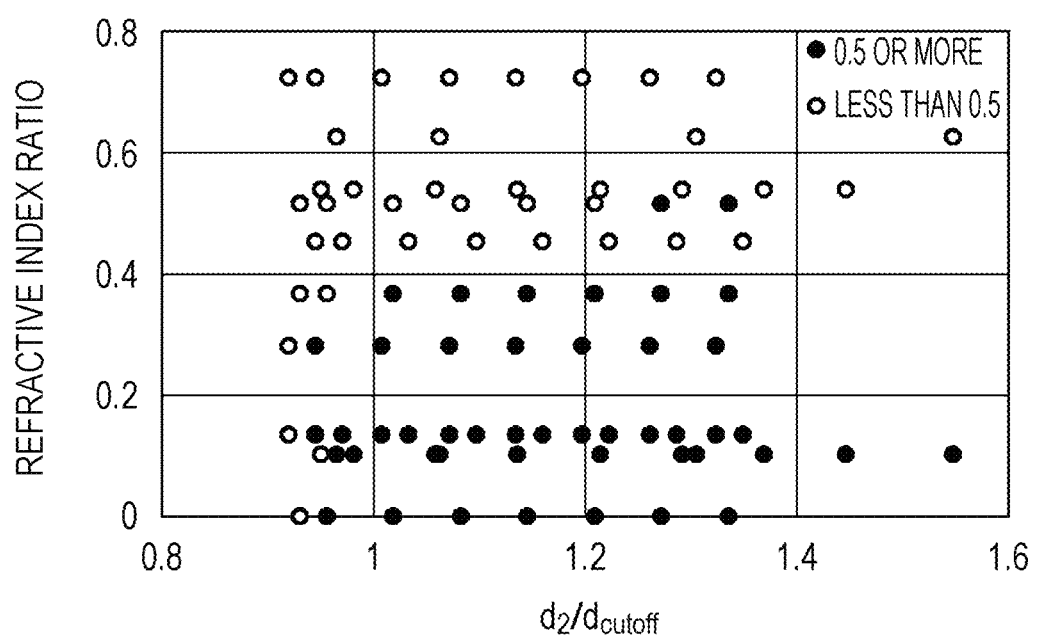
FIG. 19 is a graph showing the above results classified by whether the coupling efficiency is 0.5 or more or less than 0.5, with the horizontal axis representing $d_2/d_{cutoff}$ and the vertical axis representing the refractive index ratio ($|n_{w1} - n_{w2}|/n_{w1}$)

FIG. 19 is a graph showing the above results classified by whether the coupling efficiency is 0.5 or more or less than 0.5, with the horizontal axis representing $d_2/d_{cutoff}$ and the vertical axis representing the refractive index ratio (|$n_{w1}$−$n_{w2}$|/$n_{w1}$). On the condition that the coupling efficiency is 0.5 (i.e., 50%) or more, it is necessary that the refractive index ratio be less than 0.4 and that $0.95 \times d_{cutoff} < d_2 < 1.5 \times d_{cutoff}$.

In the present embodiment, the refractive index $n_{w1}$ of the first waveguide 1 is larger than the refractive index $n_{w2}$ of the second waveguide 10 ($n_{w1}$>$n_{w2}$). However, the present disclosure is not limited to this structure, and $n_{w1} \leq n_{w2}$ may hold.

Figure 20:
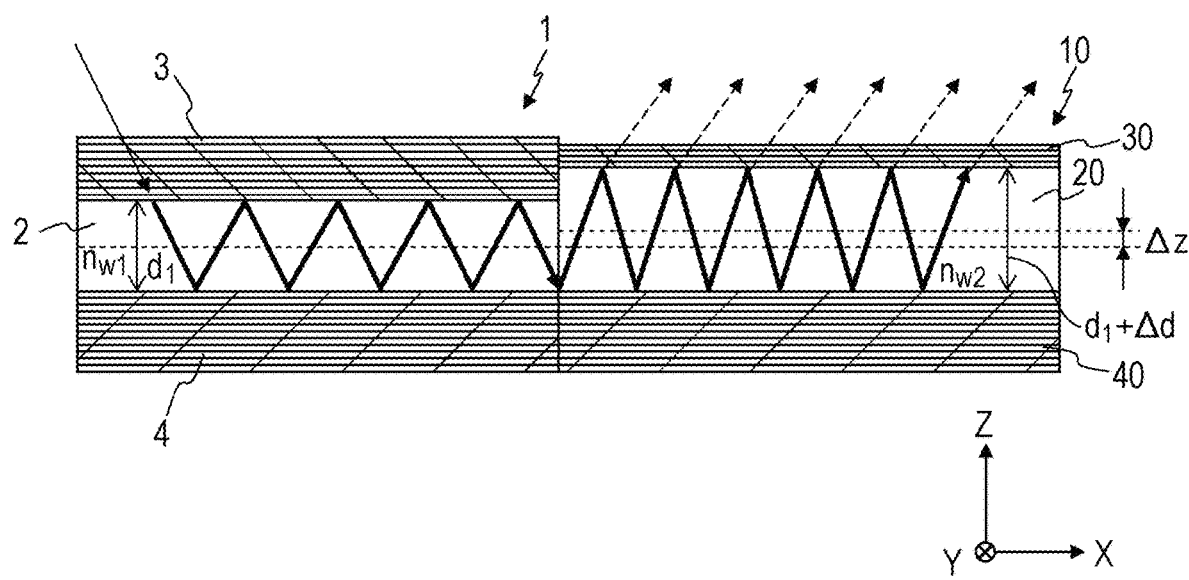
FIG. 20 is an illustration showing a structure in which the center, with respect to the direction of thickness, of an optical waveguide layer of a first waveguide is offset by Δz from the center, with respect to the direction of thickness, of an optical waveguide layer of a second waveguide.

FIG. 20 is an illustration showing a structure in which the center, with respect to the direction of thickness, of the optical waveguide layer 2 of the first waveguide 1 is offset by Δz from the center, with respect to the direction of thickness, of the optical waveguide layer 20 of the second waveguide 10. When the center line, with respect to the thickness direction, of the optical waveguide layer 20 of the second waveguide 10 is located on the light emitting side (the first mirror 30 side) of the center line, with respect to the thickness direction, of the optical waveguide layer 2 of the first waveguide 1 as shown in FIG. 20, the sign of Δz is positive. Let Δd be the difference (the absolute difference) between the thickness $d_1$ of the optical waveguide layer 2 of the first waveguide 1 and the thickness $d_2$ of the optical waveguide layer 20 of the second waveguide 10. When Δz=Δd/2, the Z direction position of a lower portion (the side opposite to the light emitting side) of the optical waveguide layer 2 of the waveguide 1 matches the Z direction position of a lower portion of the optical waveguide layer 20 of the waveguide 10.

Figure 21:
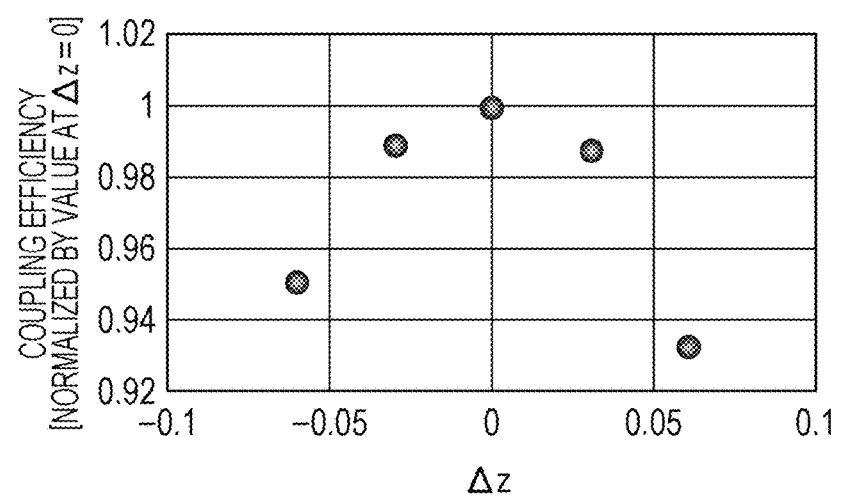
FIG. 21 is a graph showing the Δz dependence of the coupling efficiency of light from a first waveguide to a second waveguide.

FIG. 21 is a graph showing the Δz dependence of the coupling efficiency of light from the first waveguide 1 to the second waveguide 10. The results in FIG. 21 were obtained by computing the coupling efficiency by setting $n_{w1}$ to 2.2, the wavelength λ to 1.55 µm, $n_{w2}$ to 2.2, and Δd to 0.12 µm at different values of Δz. The coupling efficiency normalized by a value at Δz=0 is shown in FIG. 21. When the center lines of the optical waveguide layers 2 and 20 with respect to their thickness direction are offset in the Z direction, the coupling efficiency is lower than that when Δz is zero (0). However, even when −Δd/2<Δz<Δd/2, the coupling efficiency is 90% or more of that at Δz=0 and can be maintained at a relatively high level.

Figure 22A:
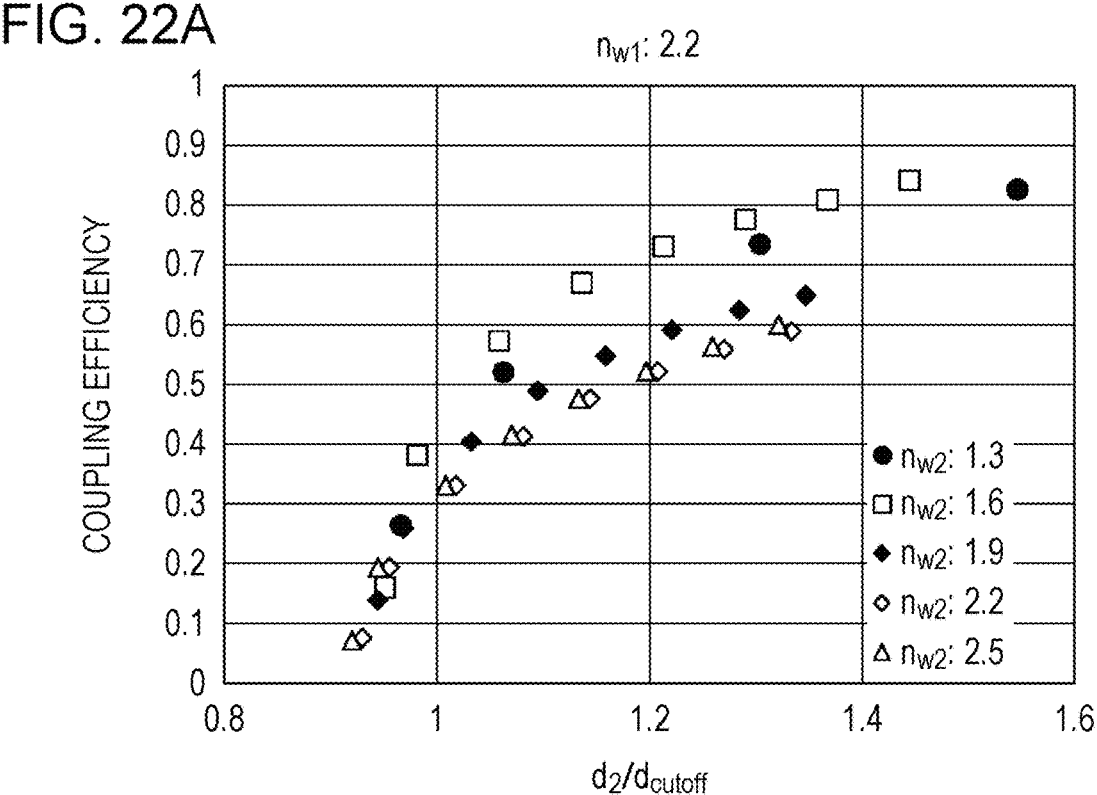
FIG. 22A shows the $d_2$ dependence of the coupling efficiency when $n_{w1}$ is 2.2, $d_1$ is 0.7 μm, and the wavelength λ is 1.55 μm.
Figure 22B:
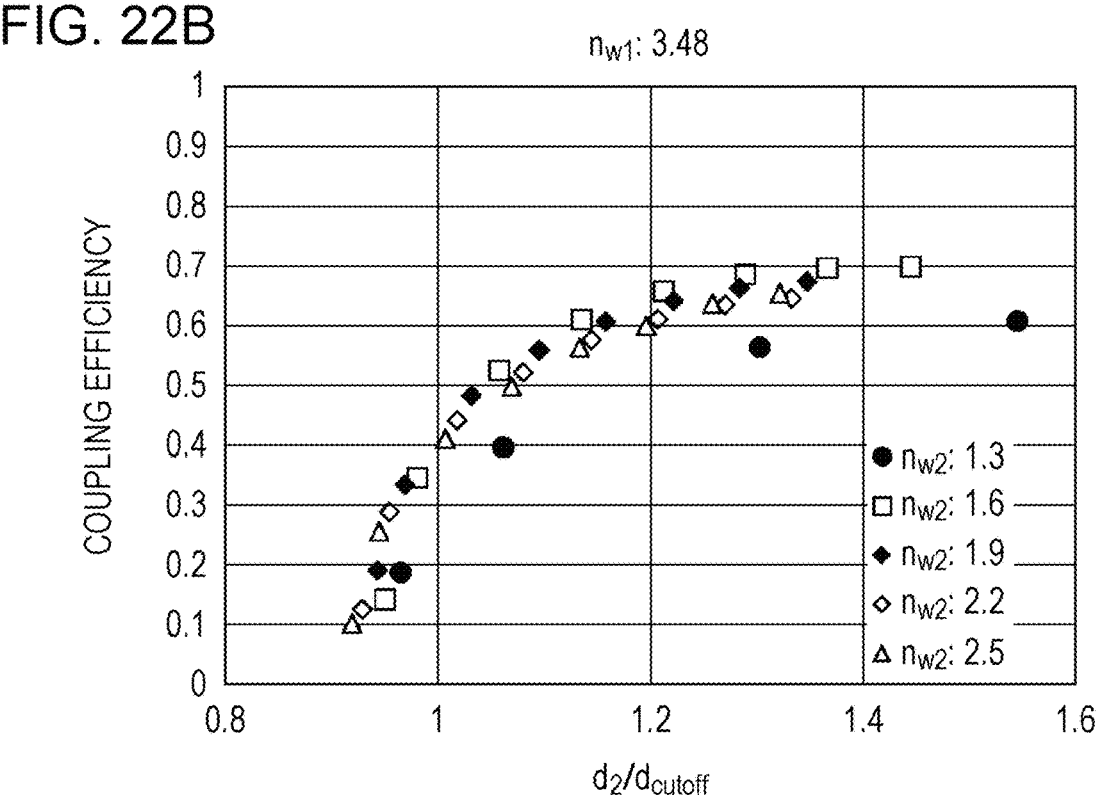
FIG. 22B shows the $d_2$ dependence of the coupling efficiency when $n_{w1}$ is 3.48, $d_1$ is 0.46 μm, and the wavelength λ is 1.55 μm.

In the example shown in FIG. 13, the first waveguide 1 guides light by total reflection. Also in this structure, the same basic principle can be used, and the guided light beams propagating through the waveguides 1 and 10 can be coupled to each other. The $d_2$ dependence of the coupling efficiency of the guided light from the first waveguide 1 to the second waveguide 10 in the structure shown in FIG. 13 was also determined by computations. FIG. 22A shows the $d_2$ dependence of the coupling efficiency when $n_{w1}$ is 2.2, $d_1$ is 0.7 µm, and the wavelength λ is 1.55 µm. FIG. 22B shows the $d_2$ dependence of the coupling efficiency when $n_{w1}$ is 3.48, $d_1$ is 0.46 µm, and the wavelength λ is 1.55 µm. On the condition that the coupling efficiency is 7% or more as in the above-described example, the following relations $$0.95 \times d_{cutoff} < d_2 < 1.5 \times d_{cutoff}$$

$$(i.e., 0.95 \times m\lambda/(2n_{w2}) < d_2 < 1.5 \times m\lambda/(2n_{w2}))$$

are obtained.

On the condition that the coupling efficiency is 50% or more, the following conditions $1.2 \times d_{cutoff} < d_2 < 1.5 \times d_{cutoff}$ (i.e., $1.2 \times m\lambda/(2n_{w2}) < d_2 < 1.5 \times m\lambda/(2n_{w2})$) is obtained.

Also in the structure in FIG. 13, $n_{w1} > n_{w2}$ may hold, or $n_{w1} \leq n_{w2}$ may hold.

Figure 23A:
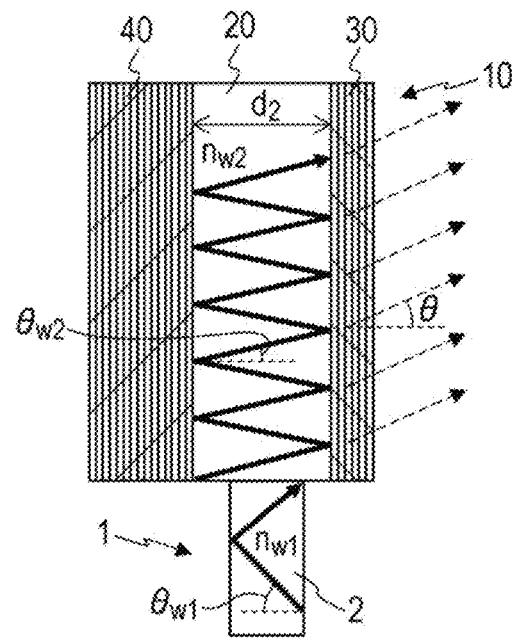
FIG. 23A is an illustration showing a computational model used to compute propagation of light with a different mode order.
Figure 23B:
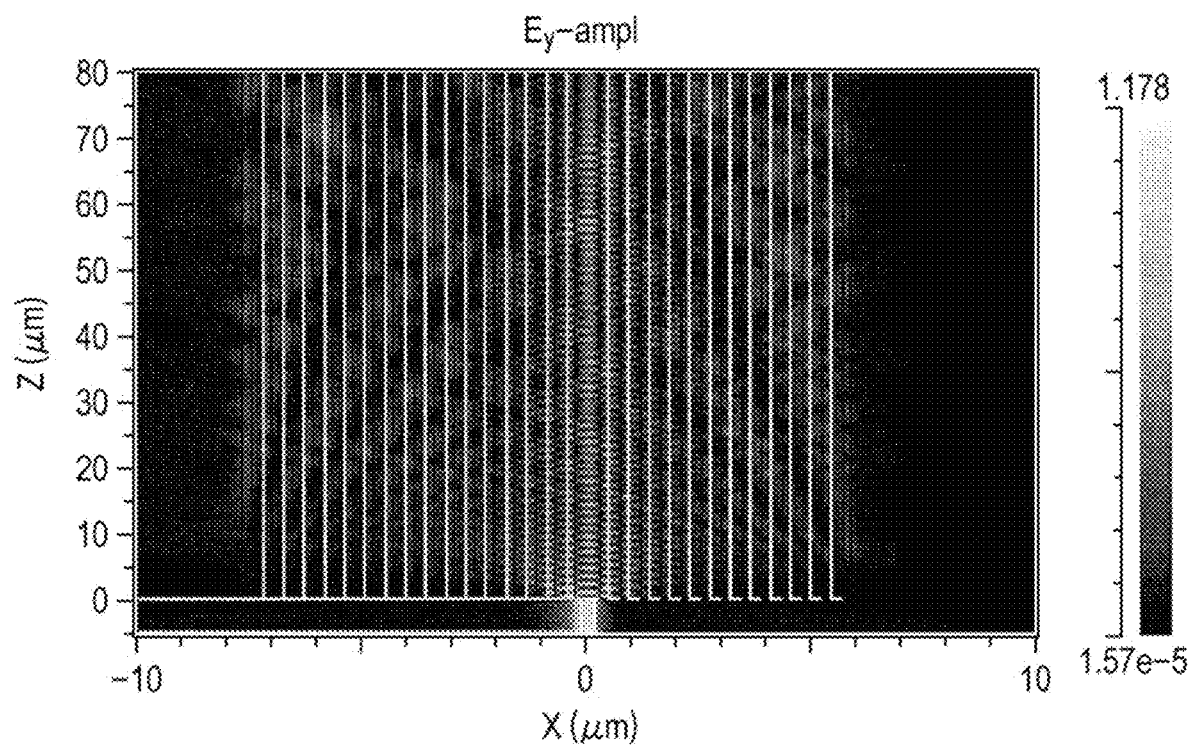
FIG. 23B is an illustration showing the results of computations of propagation of the light with the different mode order.

As described above, the mode order of light propagating from the waveguide 1 to the waveguide 10 is not limited to m=2. For example, when a model shown in FIG. 23A was used for the computations under the conditions of $n_{w1}=1.883$, $d_1=0.3$ µm, $n_{w2}=1.6$, and $d_2=0.55$ µm, light was coupled into the waveguide as shown in FIG. 23B.

Next, a structure in which a gap is present between the first waveguide 1 and the second waveguide 10 will be studied.

Figure 24A:
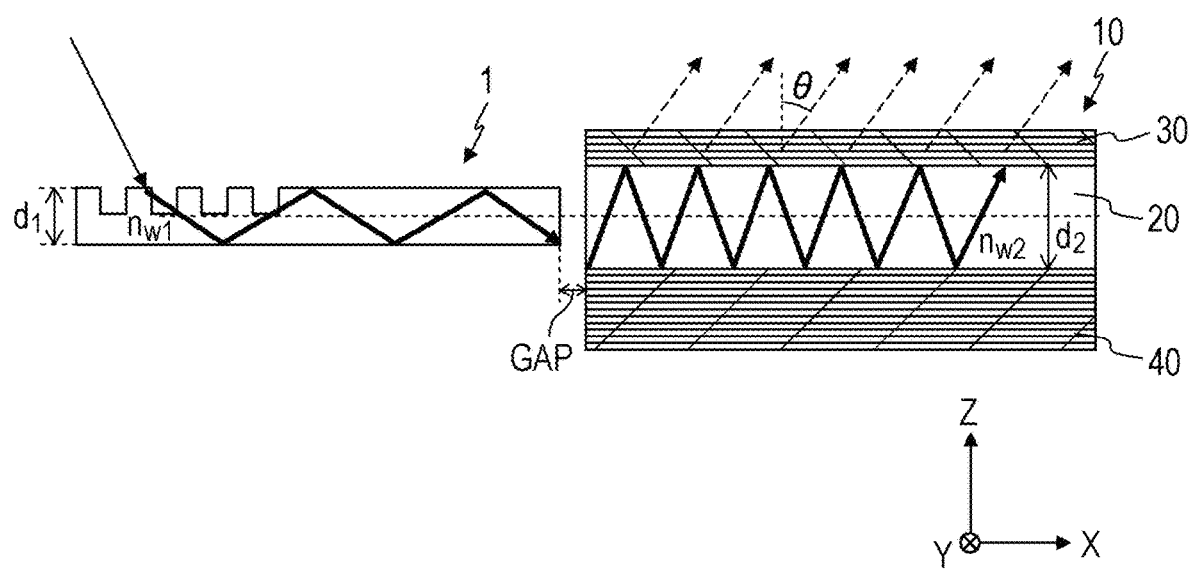
FIG. 24A is a cross-sectional view showing an optical scanning device in another embodiment.

FIG. 24A is a cross-sectional view showing a modification of the present embodiment. In this example, the optical waveguide layer 20 of the second waveguide 10 is connected to the first waveguide 1 through a gap (e.g., an air gap). Even when the gap is present between the first waveguide 1 and the second waveguide 10 as described above, the light is coupled in the near field of the waveguide mode. Therefore, when the width of the gap (the width in the X direction) is sufficiently smaller than the wavelength λ, the guided light is coupled between the waveguides 1 and 10. This differs from the coupling of the light propagating in free space to the waveguide mode in FIG. 6A or 6B.

Figure 24B:
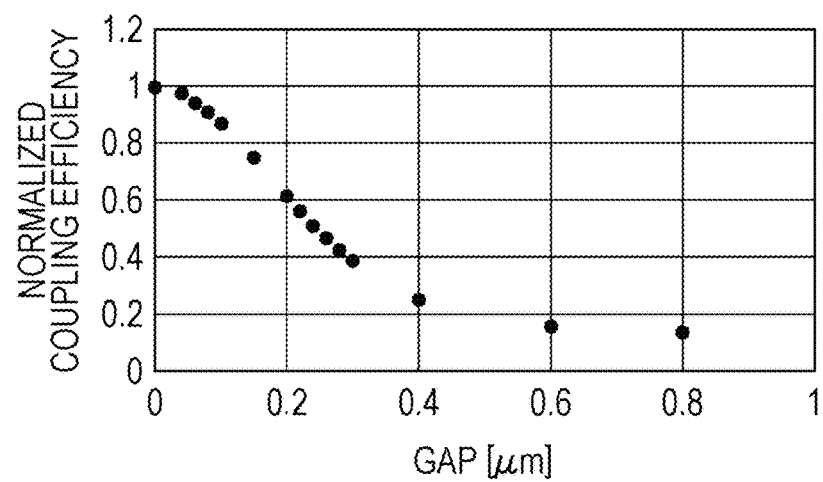
FIG. 24B is a graph showing the results of computations of the gap width dependence of the coupling efficiency.

FIG. 24B is a graph showing the results of computations of the gap width dependence of the coupling efficiency. The coupling efficiency normalized by a value when the gap is 0 µm is shown in FIG. 24B. In the computations, $n_{w1}$ is 3.48, $n_{w2}$ is 1.5. $d_1$ is 0.9 µm, and $d_2$ is 1.1 µm. The refractive index of the gap is 1, and the wavelength λ is 1.55 µm. As can be seen from FIG. 24B, the normalized coupling efficiency is 50% or more when the gap is 0.24 µm or less. In consideration of the case where the gap is a medium other than air and the case where the wavelength λ differs from 1.55 µm, when the optical length of the gap (the product of the refractive index of the gap and the gap width) is equal to or less than λ/6.5, the normalized coupling efficiency is 50% or more. The optical length of the gap does not depend on the parameters of the waveguides 1 and 10.

Also when light is inputted to the first waveguide 1 from the third waveguide 1' as in the example shown in FIG. 14, a gap may be present between an end surface of the third waveguide 1' and an end surface of the first waveguide 1. As described above, the optical length of the gap (the product of the refractive index of the gap and the gap width) is set to be, for example, λ/6.5 or less.

Next, a description will be given of a structure for implementing two-dimensional optical scanning using a plurality of pairs of the first and second waveguides 1 and 10 in the present embodiment (these are referred to as "waveguide units" in the present specification). An optical scanning device that can implement two-dimensional scanning includes: a plurality of waveguide units arranged in a first direction; and an adjusting element (e.g., a combination of an actuator and a control circuit) that controls the waveguide units. The adjusting element changes at least one of the refractive index and thickness of the optical waveguide layer 20 of the second waveguide 10 of each of the waveguide units. In this manner, the direction of light emitted from the second waveguides 10 can be changed. When light beams with appropriately controlled phase differences are inputted to the second waveguides 10 of the plurality of waveguide units, two-dimensional optical scanning can be performed as described with reference to FIG. 1. An embodiment for implementing two-dimensional scanning will next be described in more detail.

<Operating Principle of Two-Dimensional Scanning>

In a waveguide array in which a plurality of waveguide elements (second waveguides) 10 are arranged in one direction, interference of light beams emitted from the waveguide elements 10 causes the emission direction of the light to change. By controlling the phases of the light beams to be supplied to the waveguide elements 10, the emission direction of the light can be changed. The principle of this will next be described.

Figure 25A:
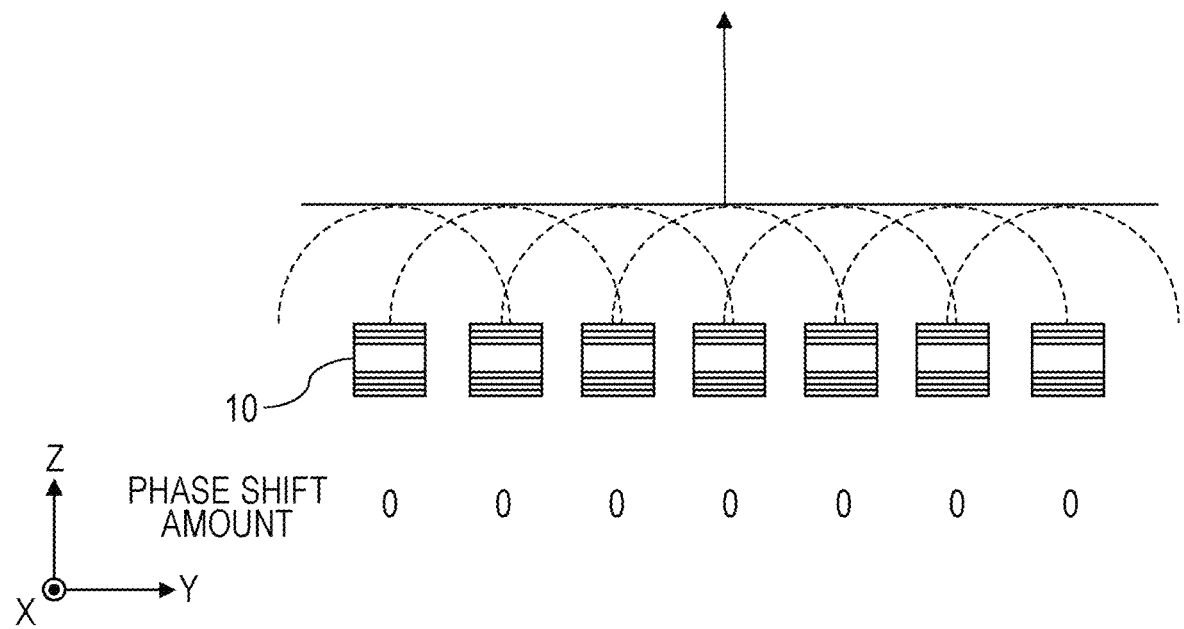
FIG. 25A is an illustration showing a cross section of a waveguide array that emits light in a direction perpendicular to the emission surface of the waveguide array.

FIG. 25A is an illustration showing a cross section of the waveguide array that emits light in a direction perpendicular to the emission surface of the waveguide array. In FIG. 25A, phase shift amounts of the light beams propagating through the waveguide elements 10 are shown. The phase shift amounts are values with respect to the phase of a light beam propagating through the leftmost waveguide element 10. The waveguide array in the present embodiment includes the plurality of waveguide elements 10 arranged at regular intervals. In FIG. 25A, broken line arcs represent wave fronts of the light beams emitted from the waveguide elements 10. A straight line represents a wave front formed as a result of interference of the light beams. An arrow represents the direction of the light emitted from the waveguide array (i.e., the direction of the wave vector). In the example in FIG. 25A, the phases of the light beams propagating through the optical waveguide layers 20 of the waveguide elements 10 are the same. In this case, light is emitted in a direction (the Z direction) perpendicular to the arrangement direction (the Y direction) of the waveguide elements 10 and to the extending direction (the X direction) of the optical waveguide layers 20.

Figure 25B:
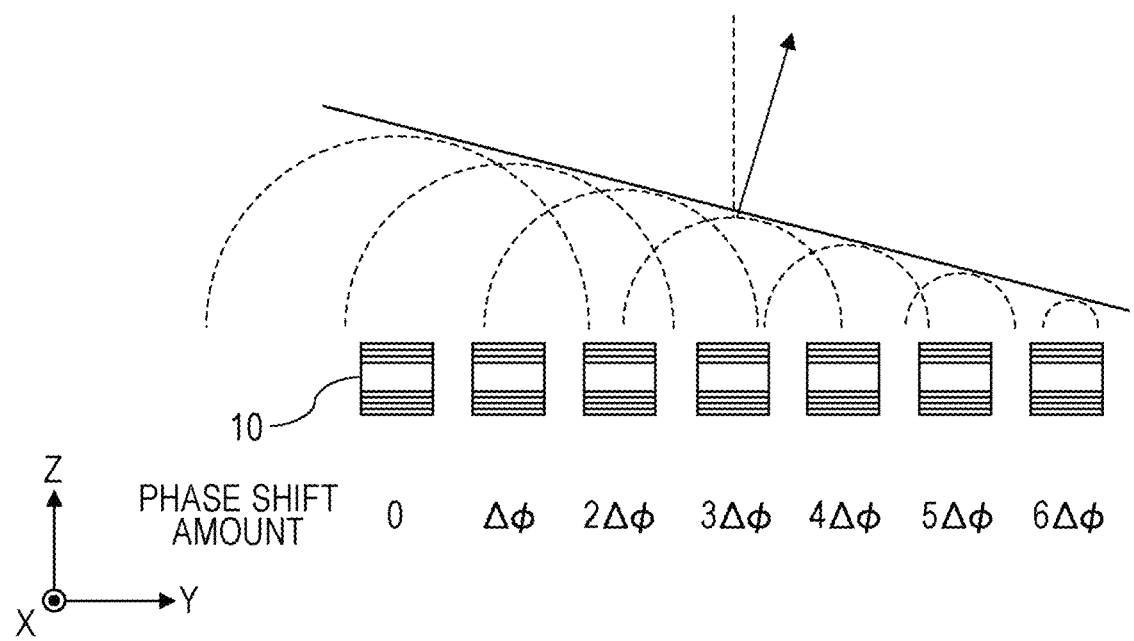
FIG. 25B is an illustration showing a cross section of a waveguide array that emits light in a direction different from the direction perpendicular to the emission surface of the waveguide array.

FIG. 25B is an illustration showing a cross section of the waveguide array that emits light in a direction different from the direction perpendicular to the emission surface of the waveguide array. In the example in FIG. 25B, the phases of the light beams propagating through the optical waveguide layers 20 of the plurality of waveguide elements 10 differ from each other in the arrangement direction by a constant amount (Δϕ). In this case, light is emitted in a direction different from the Z direction. By changing Δϕ, the Y direction component of the wave vector of the light can be changed.

The direction of the light emitted from the waveguide array to the outside (air in this case) can be quantitatively discussed as follows.

Figure 26:
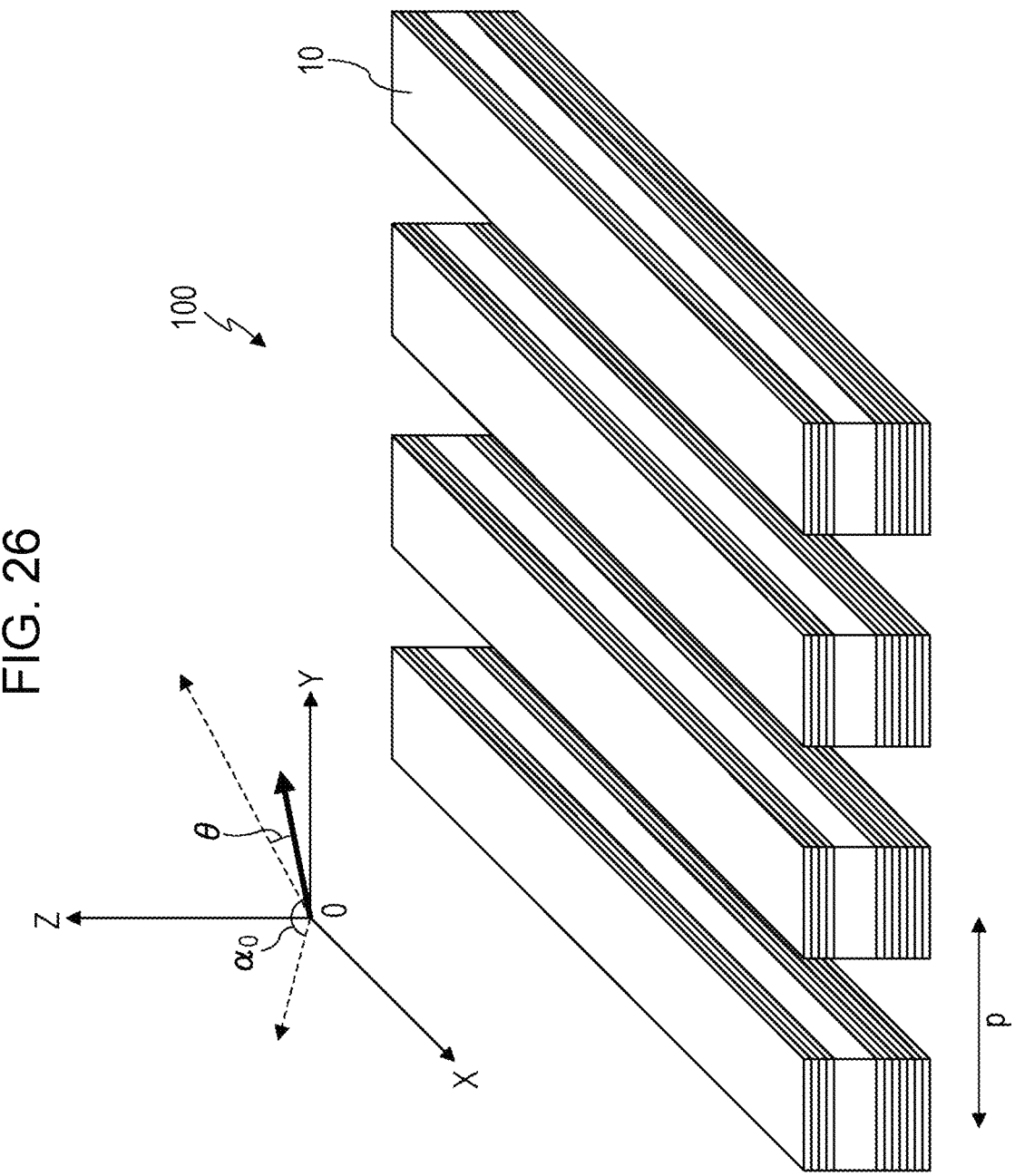
FIG. 26 is a perspective view schematically showing a waveguide array in a three-dimensional space.

FIG. 26 is a perspective view schematically showing the waveguide array in a three-dimensional space. In the three-dimensional space defined by mutually orthogonal X, Y, and Z directions, a boundary surface between the waveguide array and a region to which light is emitted to air is set to be $Z=z_0$. The boundary surface contains the emission surfaces of the plurality of waveguide elements 10. In a region in which $Z<z_0$ holds, the plurality of waveguide elements 10 are arranged in the Y direction at regular intervals and extend in the X direction. In a region in which $Z>z_0$ holds, the electric-field vector E(x, y, z) of light emitted to air is represented by formula (11) below.

$$E(x,y,z)=E_0 \exp[-j(k_x x+k_y y+k_z z)] \qquad (11)$$

Here, $E_0$ is the amplitude vector of the electric field. $k_x$, $k_y$, and $k_z$ are the wave numbers in the X, Y, and Z directions, respectively, and j is the imaginary unit. In this case, the direction of the light emitted to air is parallel to a wave vector ($k_x$, $k_y$, $k_z$) indicated by a thick arrow in FIG. 26. The magnitude of the wave vector is represented by formula (12) below.

$$\sqrt{k_x^2 + k_y^2 + k_z^2} = \frac{2\pi}{\lambda} \quad (12)$$

Wave vector components $k_x$ and $k_y$ parallel to the boundary surface agree with the wave numbers of light in the X and Y directions, respectively, in the waveguide array. This corresponds to the condition in which the wavelengths, in the plane directions, of the light on the air side at the boundary surface agree with the wavelengths, in the plane directions, of the light on the waveguide array side, as in the Snell's law in formula (2).

$k_x$ is equal to the wave number of the light propagating through the optical waveguide layer 20 of a waveguide element 10 extending in the X direction. In the waveguide element 10 shown in FIG. 2 above, $k_x$ is represented by formula (13) below using formulas (2) and (3).

$$k_x = \frac{2\pi}{\lambda} n_w \sin\theta_w = \frac{2\pi}{\lambda}\sqrt{n_w^2 - \left(\frac{m\lambda}{2d}\right)^2} \quad (13)$$

$k_y$ is derived from the phase difference between light beams in two adjacent waveguide elements 10. The centers of N waveguide elements 10 arranged in the Y direction at regular intervals are denoted by $y_q$ (q=0, 1, 2, ..., N−1), and the distance (center-to-center distance) between two adjacent waveguide elements 10 is denoted by p. In this case, the electric-field vectors (formula (11)) of light emitted to air at $y_q$ and $y_{q+1}$ on the boundary surface (Z=$z_0$) satisfy the following formula.

$$E(x,y_{q+1},z_0)=\exp[-jk_y(y_{q+1}-y_q)]E(x,y_q,z_0)=\exp[-jk_yp]$$
$$E(x,y_q,z_0) \quad (14)$$

When the phases in any two adjacent waveguide elements are set such that the phase difference is $\Delta\phi = k_y p$ (constant), $k_y$ satisfies the relation of formula (15) below.

$$k_y = \frac{\Delta\phi}{p} \quad (15)$$

In this case, the phase of light at $y_q$ is represented by $\phi_q = \phi_0 + q\Delta\phi$ ($\phi_{q+1} - \phi_q = \Delta\phi$). Specifically, the phase $\phi_q$ is constant ($\Delta\phi = 0$), linearly increases in the Y direction ($\Delta\phi > 0$), or linearly decreases in the Y direction ($\Delta\phi < 0$). When the waveguide elements 10 are arranged in the Y direction at non-regular intervals, the phases at $y_q$ and $y_{q+1}$ are set such that the phase difference for a given $k_y$ is $\Delta\phi_q = \phi_{q+1} - \phi_q = k_y(y_{q+1} - y_q)$. In this case, the phase of the light at $y_q$ is represented by $\phi_q = \phi_0 + k_y(y_q - y_0)$. Using $k_x$ and $k_y$ obtained from formulas (14) and (15), respectively, $k_z$ is derived from formula (12). The emission direction of the light (the direction of the wave vector) can thereby be obtained.

For example, as shown in FIG. 26, the angle between the wave vector ($k_x$, $k_y$, $k_z$) of the emitted light and a vector (0, $k_y$, $k_z$) obtained by projecting the wave vector onto the YZ plane is denoted by θ. θ is the angle between the wave vector and the YZ plane. θ is represented by formula (16) below using formulas (12) and (13).

$$\sin\theta = \frac{k_x}{\sqrt{k_x^2+k_y^2+k_z^2}} = \frac{\lambda}{2\pi}k_x = \sqrt{n_w^2 - \left(\frac{m\lambda}{2d}\right)^2} \quad (16)$$

Formula (16) is exactly the same as formula (3) derived when the emitted light is restricted to be parallel to the XZ plane. As can be seen from formula (16), the X component of the wave vector changes depending on the wavelength of the light, the refractive index of the optical waveguide layers 20, and the thickness of the optical waveguide layers 20.

Similarly, as shown in FIG. 26, the angle between the wave vector ($k_x$, $k_y$, $k_z$) of the emitted light (zeroth-order light) and a vector ($k_x$, 0, $k_z$) obtained by projecting the wave vector onto the XZ plane is denoted by $\alpha_0$. $\alpha_0$ is the angle between the wave vector and the XZ plane. $\alpha_0$ is represented by formula (17) below using formulas (12) and (13).

$$\sin\alpha_0 = \frac{k_y}{\sqrt{k_x^2+k_y^2+k_z^2}} = \frac{\lambda}{2\pi}k_y = \frac{\Delta\phi\lambda}{2\pi p} \quad (17)$$

As can be seen from formula (17), the Y component of the wave vector of the light changes depending on the phase difference $\Delta\phi$ of the light.

As described above, θ and $\alpha_0$ obtained from formulas (16) and (17), respectively, may be used instead of the wave vector ($k_x$, $k_y$, $k_z$) to identify the emission direction of the light. In this case, the unit vector representing the emission direction of the light can be represented by (sin θ, sin $\alpha_0$, $(1-\sin^2\alpha_0-\sin^2\theta)^{1/2}$). For light emission, all these vector components must be real numbers, and therefore $\sin^2\alpha_0+\sin^2\theta \leq 1$ is satisfied. Since $\sin^2\alpha_0 \leq 1-\sin^2\theta = \cos^2\theta$, the emitted light is changed within an angle range in which −cos θ ≤ sin $\alpha_0$ ≤ cos θ is satisfied. Since −1 sin $\alpha_0$ ≤ 1, the emitted light is changed within the angle range of −90° ≤ $\alpha_0$ ≤ 90° at θ=0°. However, as θ increases, cos θ decreases, so that the angle range of $\alpha_0$ is narrowed. When θ=90° (cos θ=0), light is emitted only at $\alpha_0$=0°.

The two-dimensional optical scanning in the present embodiment can be implemented using at least two waveguide elements 10. When the number of waveguide elements 10 is small, the divergence angle $\Delta\alpha$ of $\alpha_0$ is large. As the number of waveguide elements 10 increases, $\Delta\alpha$ decreases. This can be explained as follows. For the sake of simplicity, θ is assumed to be 0° in FIG. 26. Specifically, the emission direction of the light is parallel to the YZ plane.

Assume that light beams having the same emission intensity and the above-described phases $\phi_q$ are emitted from N waveguide elements 10 (N is an integer of 2 or more). In this case, the absolute value of the total amplitude distribution of the light beams (electric fields) emitted from the N waveguide elements 10 in a far field is proportional to F(u) represented by formula (18) below.

$$F(u) = \left| \frac{\sin(Nu/2)}{\sin(u/2)} \right| \quad (18)$$

Here, u is represented by formula (19) below.

$$u = \frac{2\pi p}{\lambda}(\sin\alpha - \sin\alpha_0) \quad (19)$$

Here, α is the angle between the Z axis and a line connecting the origin and an observation point in the YZ plane. $\alpha_0$ satisfies formula (17). F(u) in formula (18) is N (maximum) when u=0 ($\alpha=\alpha_0$) and is 0 when u=±2π/N. Let the angle satisfying u=−2π/N be $\alpha_1$, and the angle satisfying u=2π/N be $\alpha_2$ ($\alpha_1<\alpha_0<\alpha_2$). Then the divergence angle of $\alpha_0$ is $\Delta\alpha=\alpha_2-\alpha_1$. A peak within the range of −2π/N<u<2π/N ($\alpha_1<\alpha<\alpha_2$) is generally referred to as a main lobe. A plurality of small peaks referred to as side lobes are present on both sides of the main lobe. By comparing the width $\Delta u=4\pi/N$ of the main lobe and $\Delta u=2\pi p\Delta(\sin \alpha)/\lambda$, obtained from formula (19), $\Delta(\sin \alpha)=2\lambda/(Np)$ is obtained. When $\Delta\alpha$ is small, $\Delta(\sin \alpha)=\sin \alpha_2-\sin \alpha_1=[(\sin \alpha_2-\sin \alpha_1)/(\alpha_2-\alpha_1)] \Delta\alpha\approx[d(\sin \alpha)/d\alpha]_{\alpha=\alpha 0} \Delta\alpha=\cos \alpha_0 \Delta\alpha$. Therefore, the divergence angle is represented by formula (20) below.

$$\Delta\alpha = \frac{2\lambda}{Np\cos\alpha_0} \quad (20)$$

Thus, as the number of waveguide elements 10 increases, the divergence angle $\Delta\alpha$ decreases, and high resolution optical scanning can be performed on a distant target. The same discussion is applicable to the case when θ≠0° in FIG. 26.

<Diffracted Light Emitted from Waveguide Array>

In addition to the zeroth-order light beam, higher-order diffracted light beams may be emitted from the waveguide array. For the sake of simplicity, θ is assumed to be 0° in FIG. 26. Specifically, the emission direction of the diffracted light is parallel to the YZ plane.

Figure 27A:
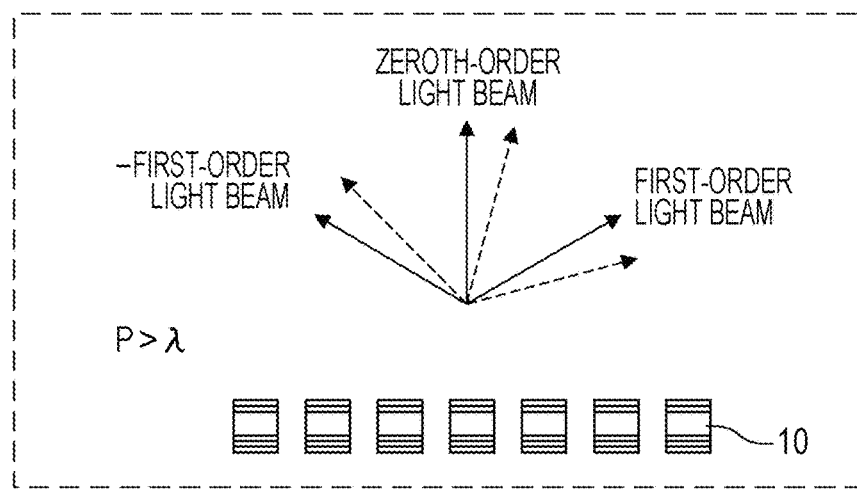
FIG. 27A is a schematic diagram showing how diffracted light is emitted from the waveguide array when p is larger than λ.

FIG. 27A is a schematic diagram showing how diffracted light is emitted from the waveguide array when p is larger than λ. In this case, when there is no phase shift ($\alpha_0=0°$), zeroth-order and ±first-order light beams are emitted in directions indicated by solid arrows shown in FIG. 27A (higher-order diffracted light beams may be emitted, but this depends on the magnitude of p). When a phase shift is given to this state ($\alpha_0\neq0°$), the emission angles of the zeroth-order and ±first-order light beams rotate in the same rotation direction as shown by broken line arrows in FIG. 27A. Higher-order light beams such as the ±first-order light beams can be used for beam scanning. However, to configure a simpler device, only the zeroth-order light beam is used. To avoid a reduction in gain of the zeroth-order light beam, the distance p between two adjacent waveguide elements 10 may be reduced to be less than λ to suppress the emission of higher-order light beams. Even when p>λ, only the zeroth-order light beam can be used by physically blocking the higher-order light beams.

Figure 27B:
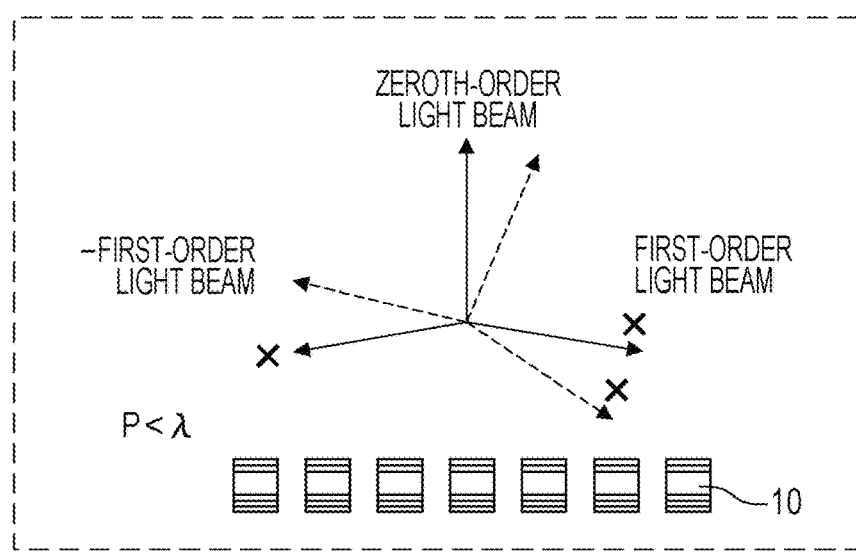
FIG. 27B is a schematic diagram showing how diffracted light is emitted from the waveguide array when p is smaller than λ.
Figure 27C:
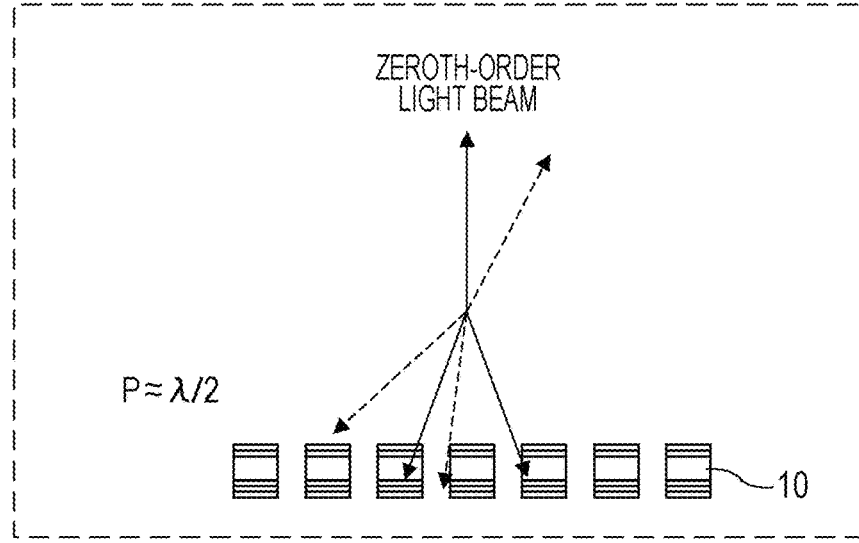
FIG. 27C is a schematic diagram showing how diffracted light is emitted from the waveguide array when p≈λ/2.

FIG. 27B is a schematic diagram showing how diffracted light is emitted from the waveguide array when p is smaller than λ. In this case, when there is no phase shift ($\alpha_0=0°$), no higher-order light beams are present because the diffraction angles of the higher-order light beams exceed 90 degrees, and only the zeroth-order light beam is emitted forward. However, in the case where p is close to λ, when a phase shift is given ($\alpha_0\neq0°$), the emission angles change, and the ±first-order light beams may be emitted. FIG. 27C is a schematic diagram showing how diffracted light is emitted from the waveguide array when p≈λ/2. In this case, even when a phase shift is given ($\alpha_0\neq0°$), the ±first-order light beams are not emitted. Even when the ±first-order light beams are emitted, they are emitted at considerably large angles. When p<λ/2, even when a phase shift is given, no higher-order light beams are emitted. However, even when p is further reduced, no particular advantage is expected. Therefore, p may be set to be, for example, λ/2 or more.

The relation between the zeroth-order light beam and ±first-order light beams emitted to air in FIGS. 27A to 27C can be quantitatively explained as follows. F(u) in formula (18) is F(u)=F(u+2π) and is a function with a period of 2π. When u=±2mπ, F(u)=N (maximum). In this case, ±m-th order light beams are emitted at emission angles α satisfying u=±2mπ. Peaks around u=±2mπ (m≠0) (peak width: Δu=4π/N) are referred to as grating lobes.

Only ±first-order light beams contained in higher-order light are considered (u=±2π). The emission angles α± of the ±first-order light beams satisfy formula (21) below.

$$\sin\alpha_\pm = \sin\alpha_0 \pm \frac{\lambda}{p} \quad (21)$$

p<λ/(1−sin $\alpha_0$) is obtained from the condition sin $\alpha_0$>1 indicating that the +first-order light beam is not emitted. Similarly, p<λ/(1+sin $\alpha_0$) is obtained from the condition sin $\alpha_0$<−1 indicating that the −first-order light beam is not emitted.

Conditions indicating whether or not the ±first-order light beams are emitted in addition to the zeroth-order light beam at an emission angle $\alpha_0$ (>0) are classified as follows. When p≥λ/(1−sin $\alpha_0$), both ±first-order light beams are emitted. When λ/(1+sin $\alpha_0$)≤p<λ/(1−sin $\alpha_0$), the +first-order light beam is not emitted, but the −first-order light beam is emitted. When p<λ/(1+sin $\alpha_0$), the ±first-order light beams are not emitted. In particular, when p<λ/(1+sin $\alpha_0$) is satisfied, the ±first-order light beams are not emitted even when θ≠0° in FIG. 26. For example, to achieve scanning over 10° on one side when the ±first-order light beams are not emitted, $\alpha_0$ is set to 10°, and it is only necessary that the relation p≤λ/(1+sin 10°)≈0.85λ be satisfied. Using the above-described lower limit of p in combination, it is only necessary to satisfy λ/2≤p≤λ/(1+sin 10°).

However, to satisfy the condition that the ±first-order light beams are not emitted, p must be very small. This makes it difficult to produce the waveguide array. Therefore, it is contemplated that the angle range of 0°<$\alpha_0$<$\alpha_{max}$ is scanned with the zeroth-order light beam irrespective of the presence or absence of the ±first-order light beams. However, it is assumed that the ±first-order light beams are not present in this angle range. To satisfy this condition, the emission angle of the +first-order light beam when $\alpha_0=0°$ must be $\alpha_+\geq\alpha_{max}$ (i.e., sin $\alpha_+=(\lambda/p)\geq\sin \alpha_{max}$), and the emission angle of the −first-order light beam when $\alpha_0=\alpha_{max}$ must be $\alpha_-\leq0$ (i.e., sin $\alpha_-=\sin \alpha_{max}-(\lambda/p)\leq0$). These restrictions give p λ/sin $\alpha_{max}$.

As can be seen from the above discussion, the maximum value $\alpha_{max}$ of the emission angle $\alpha_0$ of the zeroth-order light beam when the ±first-order light beams are not present within the scanning angle range satisfies formula (22) below.

$$\sin\alpha_{max} = \frac{\lambda}{p} \quad (22)$$

For example, to achieve scanning over 10° on one side when the ±first-order light beams are not present within the scanning angle range, $\alpha_0$ is set to 10°, and it is necessary that the relation p≤λ/sin 10°≈5.76λ be satisfied. Using the above-described condition for the lower limit of p in combination, p satisfies λ/2≤p≤λ/sin 10°. Since this upper limit of p (p≈5.76λ) is sufficiently larger than the upper limit (p≈0.85λ) when the ±first-order light beams are not emitted, the waveguide array can be produced relatively easily. When the light used is not single-wavelength light, λ is the center wavelength of the light used.

As described above, to scan over a wider angle range, it is necessary to reduce the distance p between waveguides. However, to reduce the divergence angle Δα of the emitted light in formula (20) when p is small, it is necessary to increase the number of waveguides in the waveguide array. The number of waveguides in the waveguide array is appropriately determined according to its intended application and the required performance. The number of waveguides in the waveguide array may be, for example, 16 or more and may be 100 or more in some applications.

<Phase Control of Light Introduced into Waveguide Array>

To control the phase of light emitted from each waveguide element 10, a phase shifter that changes the phase of the light before introduction into the waveguide element 10 is installed upstream of the waveguide element 10. The optical scanning device 100 in the present embodiment further includes a plurality of phase shifters connected to the respective waveguide elements 10 and a second adjusting element that changes the phases of light beams propagating through of the phase shifters. Each phase shifter includes a waveguide that is connected to the optical waveguide layer 20 of a corresponding one of the plurality of waveguide elements 10 directly or through another waveguide. The second adjusting element changes the phase differences between the light beams propagating from the plurality of phase shifters to the plurality of waveguide elements 10 to thereby change the direction (the third direction D3) of light emitted from the plurality of waveguide elements 10. In the following description, the plurality of arranged phase shifters may be referred to as a "phase shifter array," as in the case of the waveguide array.

Figure 28:
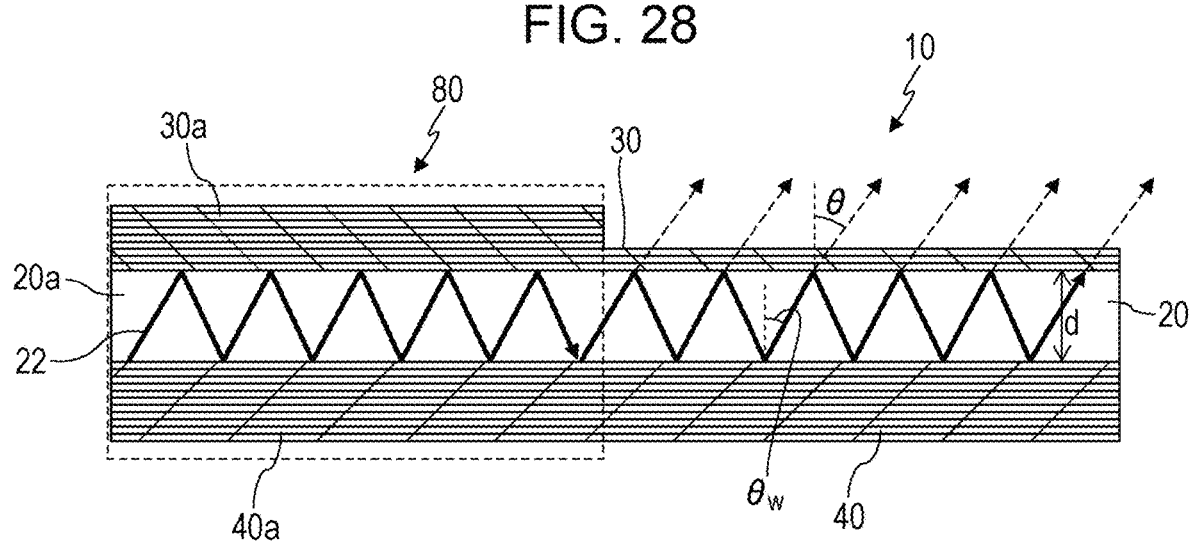
FIG. 28 is a schematic diagram showing an example of a structure in which a phase shifter is connected directly to a waveguide element.

FIG. 28 is a schematic diagram showing an example of a structure in which a phase shifter 80 is connected directly to a waveguide element 10. In FIG. 28, a portion surrounded by a broken line frame corresponds to the phase shifter 80. The phase shifter 80 includes a pair of opposed mirrors (a fifth mirror 30a and a sixth mirror 40a which may be referred to simply as mirrors) and a waveguide 20a disposed between the mirrors 30a and 40a. The waveguide 20a in this example is formed of the same material as the material of the optical waveguide layer 20 of the waveguide element 10 and is connected directly to the optical waveguide layer 20. Similarly, the mirror 40a is formed of the same material as the material of the mirror 40 of the waveguide element 10 and is connected to the mirror 40. The mirror 30a has a lower transmittance (higher reflectance) than the mirror 30 of the waveguide element 10. The mirror 30a is connected to the mirror 30. The phase shifter 80 is designed such that the transmittance of the mirror 30a is as low as that of the mirrors 40 and 40a in order not to emit light. Specifically, the light transmittance of the fifth mirror 30a and the light transmittance of the sixth mirror 40a are lower than the light transmittance of the first mirror 30. In this example, the phase shifter 80 corresponds to the "first waveguide" in the present disclosure. The "first waveguide" may serve as the phase shifter as described above.

Figure 29:
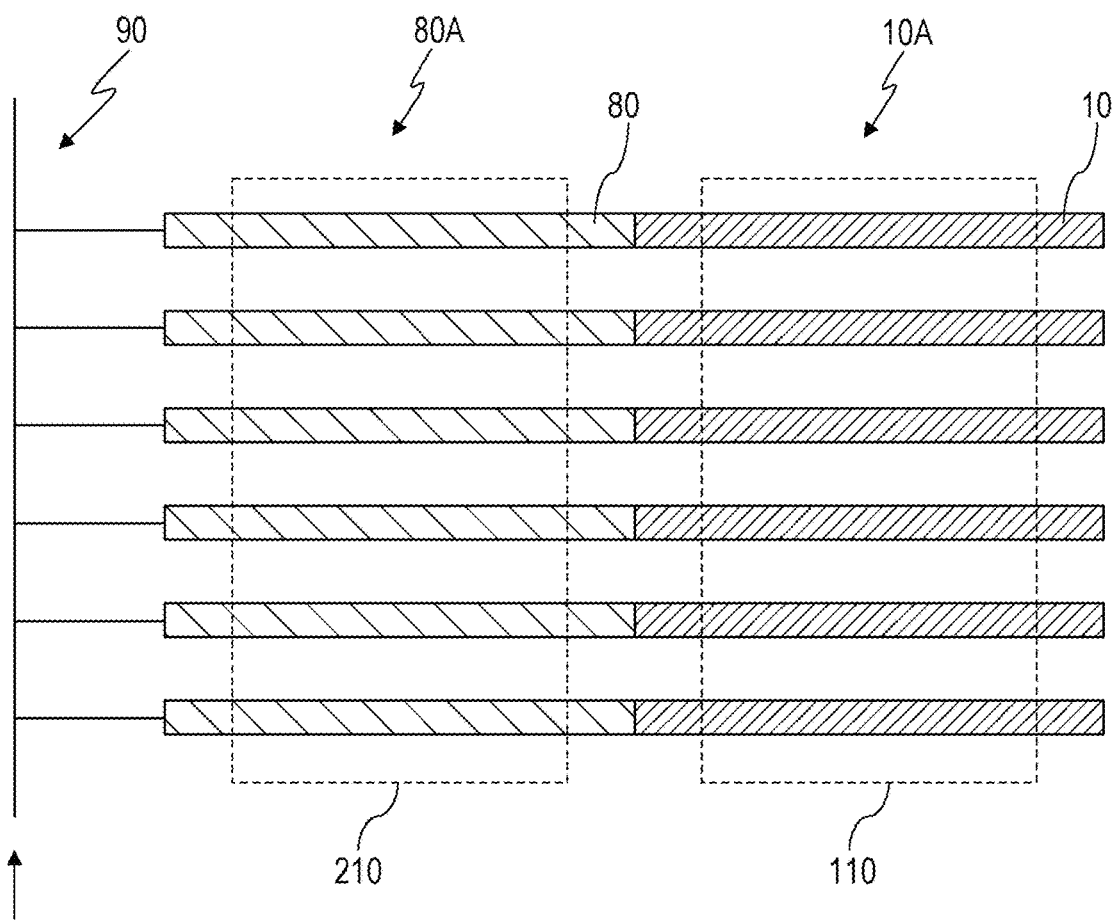
FIG. 29 is a schematic diagram showing a waveguide array and a phase shifter array as viewed in a direction normal to a light-emission surface (the Z direction)

FIG. 29 is a schematic diagram of a waveguide array 10A and a phase shifter array 80A as viewed in a direction normal to a light-emission surface (in the Z direction). In the example shown in FIG. 29, all the phase shifters 80 have the same propagation characteristics, and all the waveguide elements 10 have the same propagation characteristics. The phase shifters 80 may have the same length or may have different lengths, and the waveguide elements 10 may have the same length or may have different lengths. When the phase shifters 80 have the same length, a driving voltage may be changed to control the phase shift amount of each of the phase shifters 80. When the phase shifters 80 have lengths that differ in equal steps, the same driving voltage can be used to give phase shifts that differ in equal steps. This optical scanning device 100 further includes an optical divider 90 that divides light and supplies divided light beams to the plurality of phase shifters 80, a first driving circuit 110 that drives each of the waveguide elements 10, and a second driving circuit 210 that drives each of the phase shifters 80. A straight arrow in FIG. 29 indicates light input. The first driving circuit 110 and the second driving circuit 210 that are disposed separately are controlled independently to implement two-dimensional scanning. In this example, the first driving circuit 110 serves as a component of the first adjusting element, and the second driving circuit 210 serves as a component of the second adjusting element.

As described later, the first driving circuit 110 changes (modulates) the refractive index or thickness of the optical waveguide layer 20 of each of the waveguide elements 10 to thereby change the angle of light emitted from the optical waveguide layer 20. As described later, the second driving circuit 210 changes the refractive index of the waveguide 20a of each of the phase shifters 80 to thereby change the phase of light propagating inside the waveguide 20a. The optical divider 90 may be composed of waveguides in which light propagates by total reflection or reflective waveguides similar to the waveguide elements 10.

The phases of light beams divided by the optical divider 90 may be controlled, and then the resulting light beams may be introduced into the phase shifters 80. To control the phases, for example, a passive phase control structure in which the lengths of waveguides connected to the phase shifters 80 are adjusted to control the phases of the light beams may be used. Alternatively, phase shifters that have the same function as the phase shifters 80 and are controllable using an electric signal may be used. By using any of these methods, the phases of the light beams may be adjusted before they are introduced into the phase shifters 80 such that, for example, light beams having the same phase are supplied to all the phase shifters 80. By adjusting the phases as described above, the second driving circuit 210 can control each of the phase shifters 80 in a simpler manner.

Figure 30:
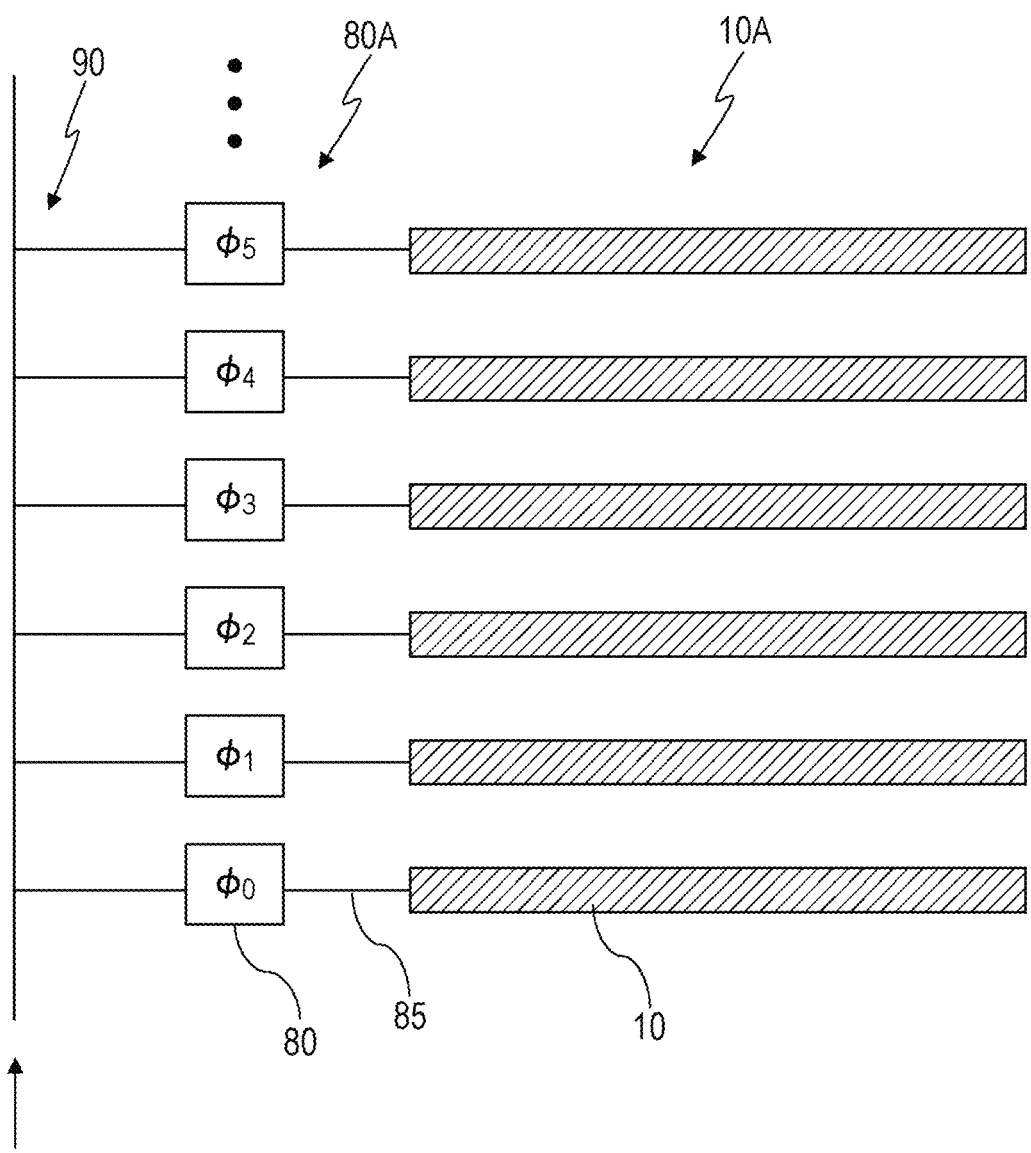
FIG. 30 is an illustration schematically showing an example of a structure in which waveguides of phase shifters are connected to optical waveguide layers of waveguide elements through additional waveguides.

FIG. 30 is an illustration schematically showing an example of a structure in which the waveguides of the phase shifters 80 are connected to the optical waveguide layers 20 of the waveguide elements 10 through additional waveguides 85. Each of the additional waveguides 85 may be any of the above-described first waveguides 1. Each additional waveguide 85 may be a combination of the waveguides 1 and 1' shown in FIG. 14. Each phase shifter 80 may have the same structure as the phase shifter 80 shown in FIG. 28 or may have a different structure. In FIG. 30, the phase shifters 80 are simply represented by symbols $\phi_0$ to $\phi_5$ that indicate the phase shift amounts. The same representation may be used in later figures. A waveguide that can propagate light using total reflection may be used for each phase shifter 80. In this case, the mirrors 30a and 40a shown in FIG. 28 are not necessary.

Figure 31:
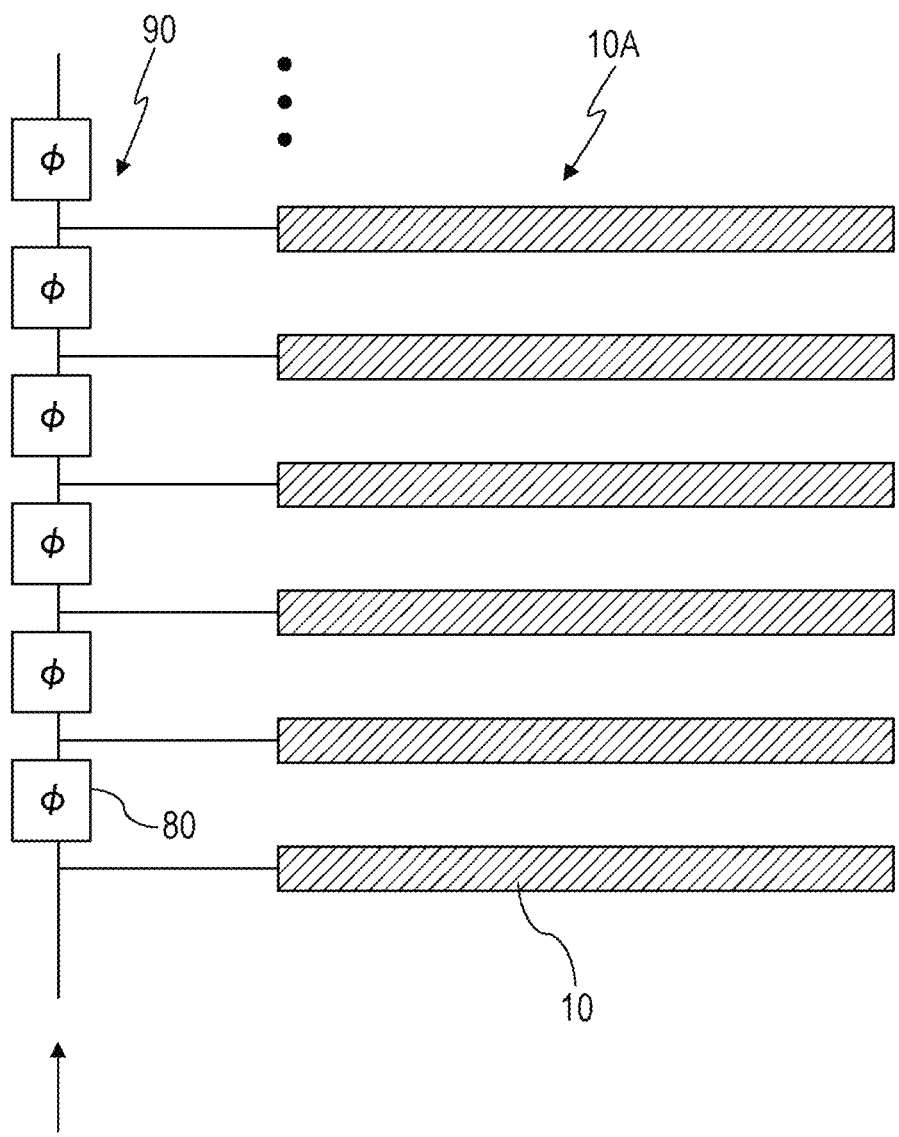
FIG. 31 is an illustration showing a structural example in which a plurality of phase shifters arranged in a cascaded manner are inserted into an optical divider.

FIG. 31 is an illustration showing a structural example in which a plurality of phase shifters 80 arranged in a cascaded manner are inserted into the optical divider 90. In this example, the plurality of phase shifters 80 are connected to intermediate points of a channel of the optical divider 90. The phase shifters 80 give the same phase shift amount φ to light propagating therethrough. When the phase shift amounts given by the phase shifters 80 are the same, the phase differences between any two adjacent waveguide elements 10 are the same. Therefore, the second adjusting element can transmit a common phase control signal to all the phase shifters 80. This is advantageous in that the structure is simplified.

Waveguides can be used to efficiently propagate light between the optical divider 90, the phase shifters 80, the waveguide elements 10, etc. An optical material having a higher refractive index than its surrounding material and absorbing less light can be used for the waveguides. For example, materials such as Si, GaAs, GaN, $SiO_2$, $TiO_2$, $Ta_2O_5$, AlN, and SiN can be used. Any of the above-described first waveguides 1 may be used to propagate light from the optical divider 90 to the waveguide elements 10. To propagate light from the optical divider 90 to the waveguide elements 10, the waveguides 1 and 1' shown in FIG. 14 may be used.

The phase shifters 80 require a mechanism for changing a light path length in order to give a phase difference to light. In the present embodiment, the refractive index of the waveguide of each phase shifter 80 is modulated to change the light path length. In this manner, the phase difference between light beams to be supplied from two adjacent phase shifters 80 to their respective waveguide elements 10 can be adjusted. More specifically, the refractive index of a phase shift material in the waveguide of each phase shifter 80 is modulated, and the phase shift can thereby be given. A specific example of the structure for refractive index modulation will be described later.

<Examples of First Adjusting Element>

Next, a description will be given of structural examples of the first adjusting element that adjusts the refractive index or thickness of the optical waveguide layer 20 of each waveguide element 10. First, a structural example when the refractive index is adjusted will be described.

Figure 32A:
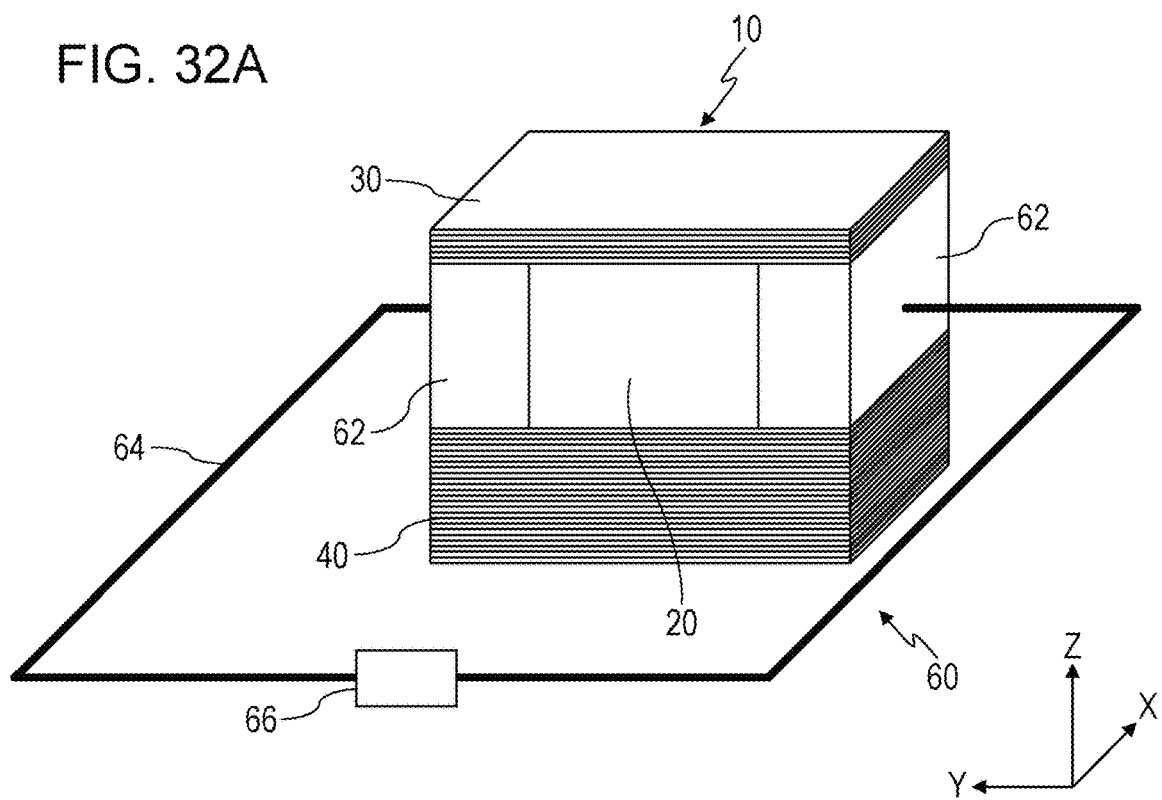
FIG. 32A is a perspective view schematically showing an example of the structure of a first adjusting element.

FIG. 32A is a perspective view schematically showing an example of the structure of the first adjusting element 60 (hereinafter may be referred to simply as an adjusting element). In the example shown in FIG. 32A, the adjusting element 60 includes a pair of electrodes 62 and is installed in the waveguide element 10. The optical waveguide layer 20 is sandwiched between the pair of electrodes 62. The optical waveguide layer 20 and the pair of electrodes 62 are disposed between a first mirror 30 and a second mirror 40. The entire side surfaces (the surfaces parallel to the XZ plane) of the optical waveguide layer 20 are in contact with the electrodes 62. The optical waveguide layer 20 contains a refractive index modulatable material whose refractive index for the light propagating through the optical waveguide layer 20 is changed when a voltage is applied. The adjusting element 60 further includes wiring lines 64 led from the pair of electrodes 62 and a power source 66 connected to the wiring lines 64. By turning on the power source 66 to apply a voltage to the pair of electrodes 62 through the wiring lines 64, the refractive index of the optical waveguide layer 20 can be modified. Therefore, the adjusting element 60 may be referred to as a refractive index modulatable element.

Figure 32B:
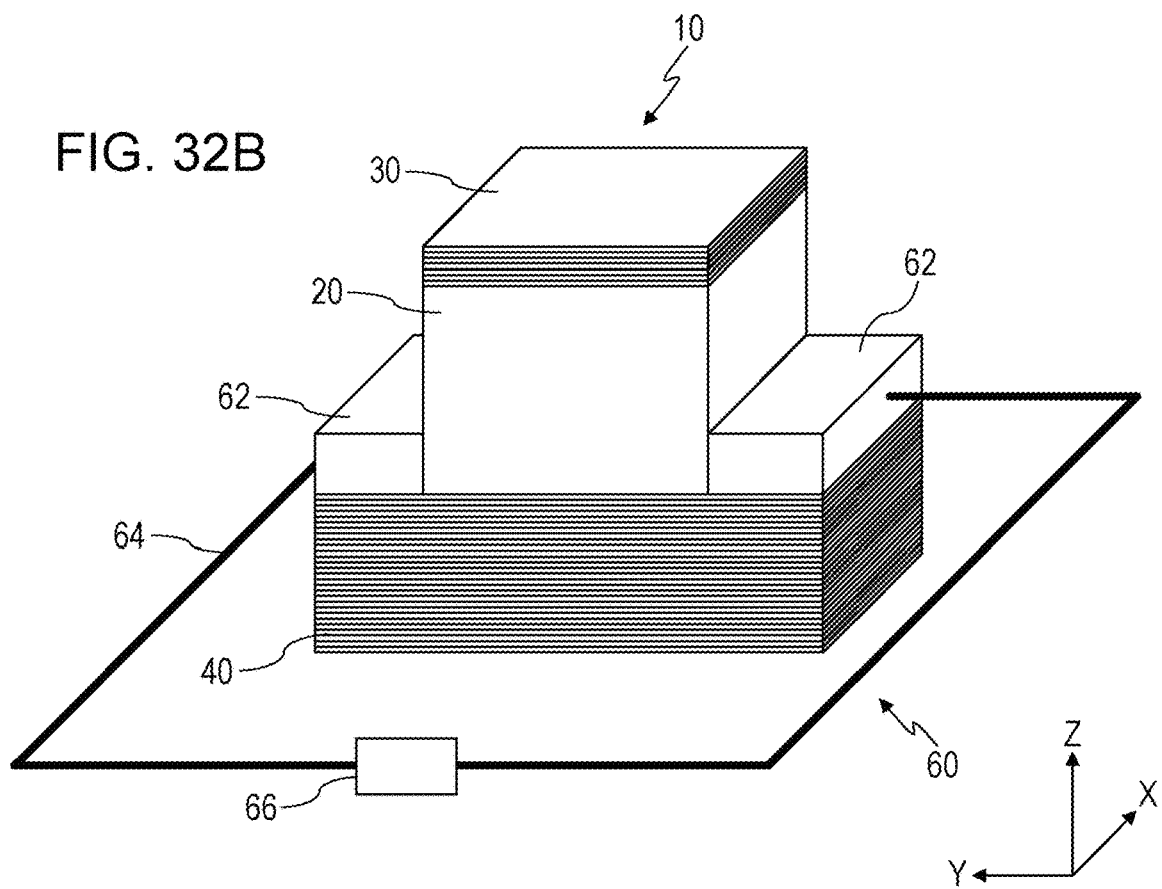
FIG. 32B is a perspective view schematically showing another example of the structure of the first adjusting element.

FIG. 32B is a perspective view schematically showing another example of the structure of the first adjusting element 60. In this example, only parts of the side surfaces of the optical waveguide layer 20 are in contact with the electrodes 62. The rest of the structure is the same as that shown in FIG. 32A. Even with the structure in which the refractive index of part of the optical waveguide layer 20 is changed, the direction of emitted light can be changed.

Figure 32C:
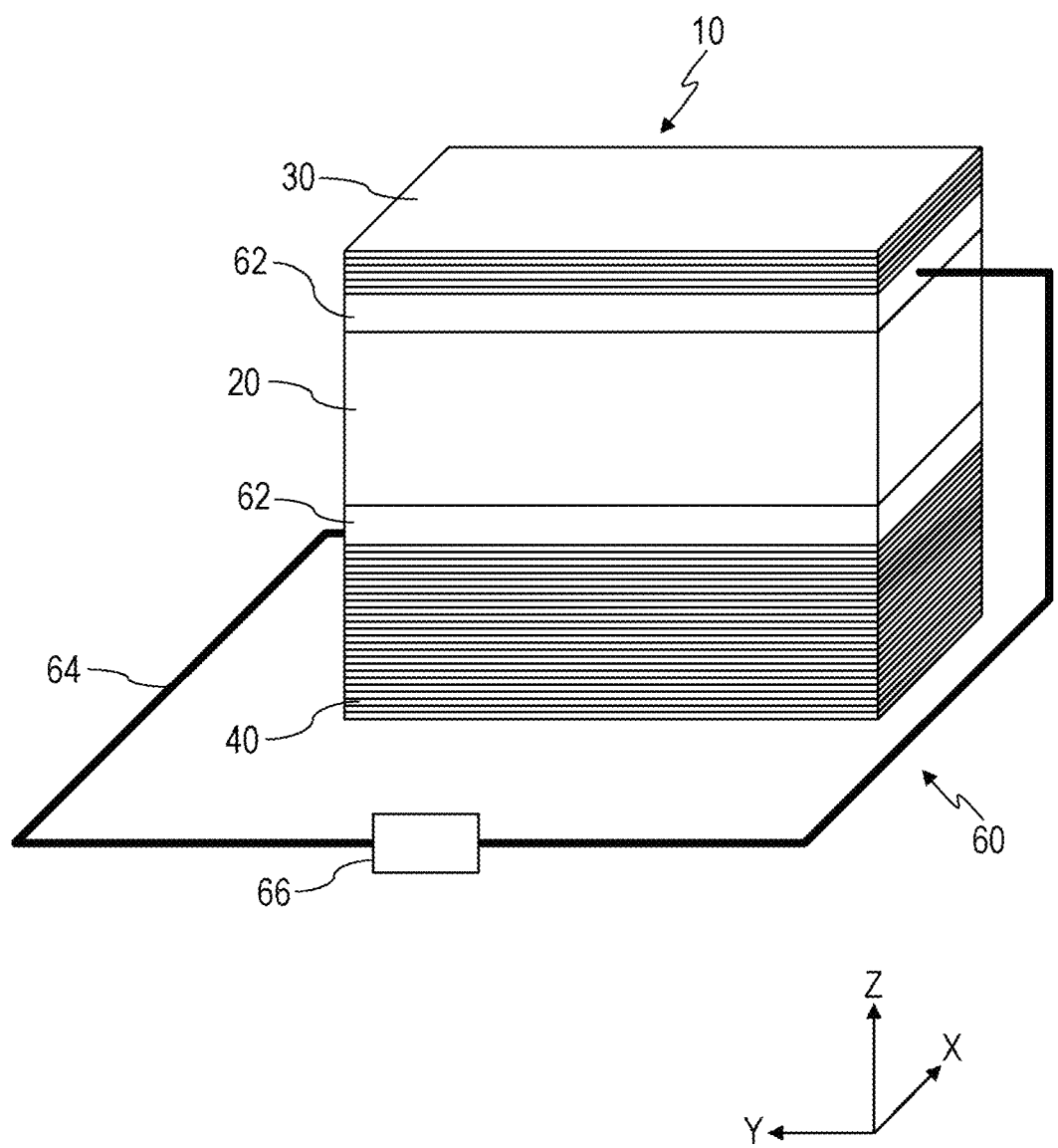
FIG. 32C is a perspective view schematically showing yet another example of the structure of the first adjusting element.

FIG. 32C is a perspective view schematically showing yet another example of the structure of the first adjusting element 60. In this example, the pair of electrodes 62 have a layer shape approximately parallel to the reflecting surfaces of the mirrors 30 and 40. One of the electrodes 62 is sandwiched between the first mirror 30 and the optical waveguide layer 20. The other electrode 62 is sandwiched between the second mirror 40 and the optical waveguide layer 20. When this structure is employed, transparent electrodes may be used as the electrodes 62. This structure is advantageous in that it can be produced relatively easily.

In the examples shown in FIGS. 32A to 32C, the optical waveguide layer 20 of each waveguide element 10 contains a material whose refractive index for the light propagating through the optical waveguide layer 20 is changed when a voltage is applied. The first adjusting element 60 includes the pair of electrodes 62 sandwiching the optical waveguide layer 20 and changes the refractive index of the optical waveguide layer 20 by applying a voltage to the pair of electrodes 62. The voltage is applied using the first driving circuit 110 described above.

Examples of the materials used for the above components will be described.

The material used for the mirrors 30, 40, 30a, and 40a may be, for example, a dielectric multilayer film. A mirror using a multilayer film can be produced by, for example, forming a plurality of films having an optical thickness of ¼ wavelength and having different refractive indexes periodically. Such a multilayer film mirror can have high reflectance. The materials of the films used may be, for example, $SiO_2$, $TiO_2$, $Ta_2O_5$, Si, and SiN. The mirrors are not limited to multilayer film mirrors and may be formed of a metal such as Ag or Al.

Various conductive materials can be used for the electrodes 62 and the wiring lines 64. For example, conductive materials including metal materials such as Ag, Cu, Au, Al, Pt, Ta, W, Ti, Rh, Ru, Ni, Mo, Cr, and Pd, inorganic compounds such as ITO, tin oxide, zinc oxide, IZO (registered trademark), and SRO, and conductive polymers such as PEDOT and polyaniline can be used.

Various light-transmitting materials such as dielectric materials, semiconductors, electrooptical materials, and liquid crystal molecules can be used for the material of the optical waveguide layer 20. Examples of the dielectric materials include $SiO_2$, $TiO_2$, $Ta_2O_5$, SiN, and AlN. Examples of the semiconductor materials include Si-based, GaAs-based, and GaN-based materials. Examples of the electrooptical materials include lithium niobate ($LiNbO_3$), barium titanate ($BaTiO_3$), lithium tantalate ($LiTaO_3$), zinc oxide (ZnO), lead lanthanum zirconate titanate (PLZT), and potassium tantalate niobate (KTN).

To modulate the refractive index of the optical waveguide layer 20, for example, methods utilizing a carrier injection effect, an electrooptical effect, a birefringent effect, and a thermooptical effect can be used. Examples of these methods will next be described.

The method utilizing the carrier injection effect can be implemented by a structure utilizing a pin junction of semiconductors. In this method, a structure in which a semiconductor with a low dopant concentration is sandwiched between a p-type semiconductor and an n-type semiconductor is used, and the refractive index of the semiconductor is modulated by injecting carriers into the semiconductor. In this structure, the optical waveguide layer 20 of each of the waveguide elements 10 contains a semiconductor material. One of the pair of electrodes 62 may contain a p-type semiconductor, and the other one may contain an n-type semiconductor. In the first adjusting element 60, a voltage is applied to the pair of electrodes 62 to inject carriers into the semiconductor material, and the refractive index of the optical waveguide layer 20 is thereby changed. Specifically, the optical waveguide layer 20 may be produced using a non-doped or low-dopant concentration semiconductor, and the p-type semiconductor and the n-type semiconductor may be disposed in contact with the optical waveguide layer 20. A complex structure may be used in which the p-type semiconductor and the n-type semiconductor are disposed in contact with the low-dopant concentration semiconductor and conductive material layers are in contact with the p-type semiconductor and the n-type semiconductor. For example, when carriers of about $10^{20}$ cm$^{-3}$ are injected into Si, the refractive index of Si is changed by about 0.1 (see, for example, "Free charge carrier induced refractive index modulation of crystalline Silicon," $7^{th}$ IEEE International Conference on Group IV Photonics, P102-104, 1-3 Sep. 2010). When this method is used, a p-type semiconductor and an n-type semiconductor may be used as the materials of the pair of electrodes 62 in FIGS. 32A to 32C. Alternatively, the pair of electrodes 62 may be formed of a metal, and the optical waveguide layer 20 itself or layers between the optical waveguide layer 20 and the electrodes 62 may contain a p-type or n-type semiconductor.

The method utilizing the electrooptical effect can be implemented by applying a voltage to an optical waveguide layer 20 containing an electrooptical material. In particular, when KTN is used as the electrooptical material, the electrooptical effect obtained can be large. The relative dielectric constant of KTN increases significantly at a temperature slightly higher than its tetragonal-to-cubic phase transition temperature, and this effect can be utilized. For example, according to "Low-Driving-Voltage Electro-Optic Modulator With Novel KTa1-xNbxO3 Crystal Waveguides," Jpn. J. Appl. Phys., Vol. 43, No. 8B (2004), an electrooptical constant of $g=4.8\times10^{-15}$ m$^2$/V$^2$ is obtained for light with a wavelength of 1.55 μm. For example, when an electric field of 2 kV/mm is applied, the refractive index is changed by about 0.1 ($=gn^3E^3/2$). With the structure utilizing the electrooptical effect, the optical waveguide layer 20 of each of the waveguide elements 10 contains an electrooptical material such as KTN. The first adjusting element 60 changes the refractive index of the electrooptical material by applying a voltage to the pair of electrodes 62.

In the method utilizing the birefringent effect of a liquid crystal, an optical waveguide layer 20 containing the liquid crystal material is driven using the electrodes to change the refractive index anisotropy of the liquid crystal. In this manner, the refractive index for the light propagating through the optical waveguide layer 20 can be modulated. Generally, a liquid crystal has a birefringence of about 0.1 to 0.2, and a change in refractive index comparable to the birefringence can be obtained by changing the alignment direction of the liquid crystal using an electric field. In the structure using the birefringent effect of the liquid crystal, the optical waveguide layer 20 of each of the waveguide elements 10 contains the liquid crystal material. The first adjusting element 60 changes the refractive index anisotropy of the liquid crystal material by applying a voltage to the pair of electrodes 62 to thereby change the refractive index of the optical waveguide layer 20.

The thermooptical effect is a change in the refractive index of a material due to a change in its temperature. When the thermooptical effect is used for driving, an optical waveguide layer 20 containing a thermooptical material may be heated to modulate its refractive index.

Figure 33:
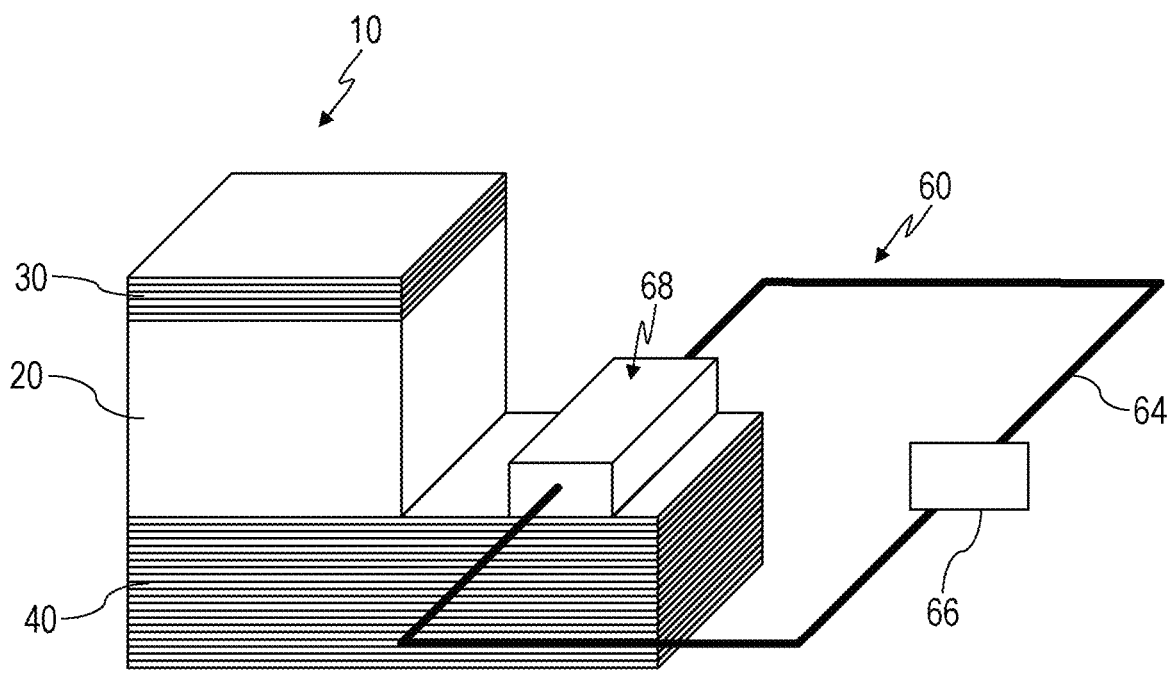
FIG. 33 is an illustration showing an example of a structure in which a waveguide element is combined with an adjusting element including a heater formed of a material having high electrical resistance.

FIG. 33 is an illustration showing an example of a structure in which a waveguide element 10 is combined with an adjusting element 60 including a heater 68 formed of a material having high electrical resistance. The heater 68 may be disposed near an optical waveguide layer 20. When a power source 66 is turned on, a voltage is applied to the heater 68 through wiring lines 64 containing a conductive material, and the heater 68 can thereby be heated. The heater 68 may be in contact with the optical waveguide layer 20. In the present structural example, the optical waveguide layer 20 of each of the waveguide elements 10 contains a thermooptical material whose refractive index is changed with a change in temperature. The heater 68 included in the first adjusting element 60 is disposed in contact with or near the optical waveguide layer 20. In the first adjusting element 60, the thermooptical material is heated by the heater 68 to thereby change the refractive index of the optical waveguide layer 20.

The optical waveguide layer 20 itself may be formed of a high-electric resistance material and sandwiched directly between a pair of electrodes 62, and a voltage may be applied to the pair of electrodes 62 to heat the optical waveguide layer 20. In this case, the first adjusting element 60 includes the pair of electrodes 62 sandwiching the optical waveguide layer 20. In the first adjusting element 60, a voltage is applied to the pair of electrodes 62 to heat the thermooptical material (e.g., a high-electric resistance material) in the optical waveguide layer 20, and the refractive index of the optical waveguide layer 20 is thereby changed.

The high-electric resistance material used for the heater 68 or the optical waveguide layer 20 may be a semiconductor or a high-resistivity metal material. Examples of the semiconductor used include Si, GaAs, and GaN. Examples of the high-resistivity metal material used include iron, nickel, copper, manganese, chromium, aluminum, silver, gold, platinum, and alloys of combinations of these materials. For example, the temperature dependence dn/dT of the refractive index of Si for light with a wavelength of 1,500 nm is $1.87\times10^{-4}$ (K$^{-1}$) (see "Temperature-dependent refractive index of silicon and germanium," Proc. SPIE 6273, Optomechanical Technologies for Astronomy, 62732J). Therefore, by changing temperature by 500 degrees, the refractive index can be changed by about 0.1. When the heater 68 is disposed near the optical waveguide layer 20 to heat it locally, a large temperature change of 500 degrees can be achieved at a relatively fast speed.

The speed of response to change in refractive index by carrier injection is determined by the life of the carriers. Generally, the life of carriers is of the order of nanoseconds (ns), and the speed of response is about 100 MHz to about 1 GHz.

When an electrooptical material is used, an electric field is applied to induce polarization of electrons, and the refractive index is thereby changed. The speed of polarization induction is generally very high. In materials such as LiNbO$_3$ and LiTaO$_3$, the response time is of the order of femtoseconds (fs), and this allows high-speed driving at higher than 1 GHz.

When a thermooptical material is used, the speed of response to change in refractive index is determined by the rate of temperature increase or decrease. By heating only a portion in the vicinity of the waveguide, a steep temperature increase is obtained. By turning off the heater after the temperature is locally increased, the heat is dissipated to the surroundings, and the temperature can be steeply reduced. The speed of response can be as high as about 100 KHz.

In the above examples, the first adjusting element 60 changes the refractive indexes of the optical waveguide layers 20 by a constant value simultaneously to change the X component of the wave vector of the emitted light. In the refractive index modulation, the amount of modulation depends on the properties of the material. To obtain a large amount of modulation, it is necessary to apply a high electric field or to align the liquid crystal. The direction of the light emitted from the waveguide elements 10 depends also on the distance between the mirrors 30 and 40. Therefore, the thickness of each optical waveguide layer 20 may be changed by changing the distance between the mirrors 30 and 40. Next, examples of a structure in which the thickness of the optical waveguide layer 20 is changed will be described.

To change the thickness of the optical waveguide layer 20, the optical waveguide layer 20 may be formed from an easily deformable material such as a gas or a liquid. By moving at least one of the mirrors 30 and 40 sandwiching the optical waveguide layer 20, the thickness of the optical waveguide layer 20 can be changed. In this case, to maintain the parallelism between the upper and lower mirrors 30 and 40, a structure in which the deformation of the mirror 30 or 40 is minimized may be employed.

Figure 34:
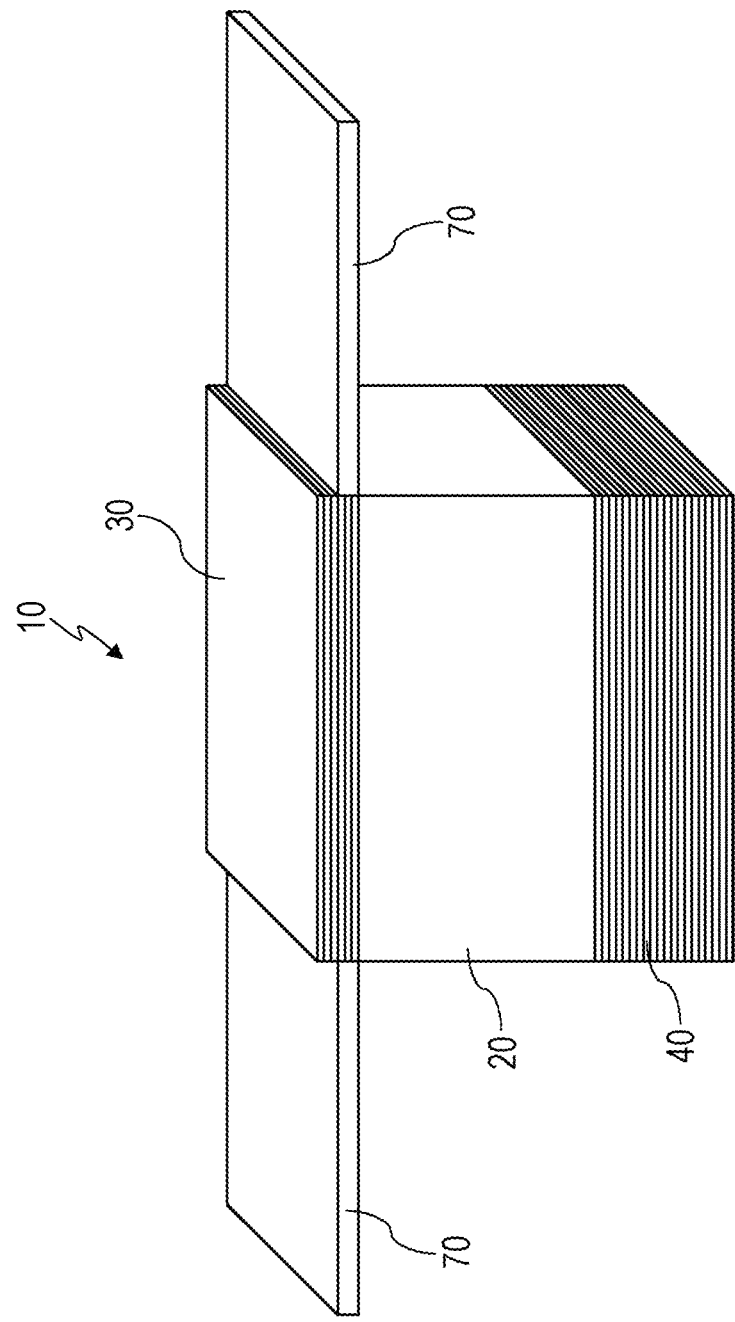
FIG. 34 is an illustration showing a structural example in which a mirror is held by support members formed of an easily deformable material.

FIG. 34 is an illustration showing a structural example in which a mirror 30 is held by support members 70 formed of an easily deformable material. Each support member 70 may include a thin member or a narrow frame more easily deformable than the mirror 30. In this example, the first adjusting element includes an actuator connected to the first mirror 30 of each waveguide element 10. The actuator changes the distance between the first mirror 30 and the second mirror 40 to thereby change the thickness of the optical waveguide layer 20. The actuator may be connected to at least one of the first mirror 30 and the second mirror 40. The actuator used to drive the mirror 30 may be any of various actuators that utilize, for example, electrostatic force, electromagnetic induction, a piezoelectric material, a shape-memory alloy, and heat.

In a structure using electrostatic force, the actuator in the first adjusting element moves the mirror 30 and/or the mirror 40 using an attractive or repulsive force generated between electrodes by the electrostatic force. Some examples of such a structure will next be described.

Figure 35:
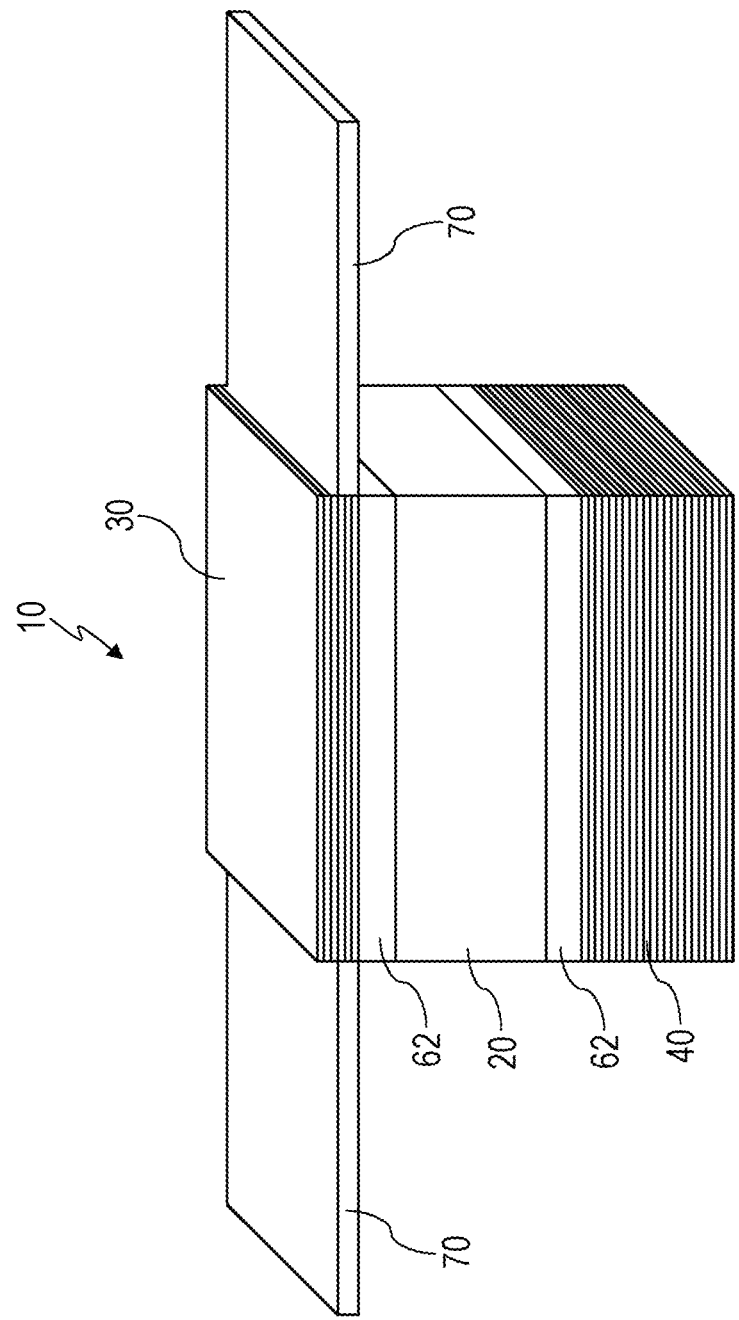
FIG. 35 is an illustration showing an example of a structure in which a mirror and/or a mirror is moved by an electrostatic force generated between electrodes.

FIG. 35 is an illustration showing an example of a structure in which the mirror 30 and/or the mirror 40 is moved by an electrostatic force generated between electrodes. In this example, a light-transmitting electrode 62 (e.g., transparent electrode) is disposed between the optical waveguide layer 20 and the mirror 30, and another light-transmitting electrode 62 is disposed between the optical waveguide layer 20 and the mirror 40. Support members 70 are disposed on both sides of the mirror 30. One end of each support member 70 is fixed to the mirror 30, and the other end is fixed to an unillustrated casing. When positive and negative voltages are applied to the pair of electrodes 62, an attractive force is generated, and the distance between the mirrors 30 and 40 is reduced. When the application of the voltage is stopped, the restoring force of the support members 70 holding the mirror 30 allows the distance between the mirrors 30 and 40 to be returned to the original length. It is unnecessary that the electrodes 62 generating the attractive force be provided over the entire mirror surfaces. The actuator in this example includes the pair of electrodes 62. One of the pair of electrodes 62 is fixed to the first mirror 30, and the other one of the pair of electrodes 62 is fixed to the second mirror 40. In the actuator, an electrostatic force is generated between the pair of electrodes by applying a voltage to the electrodes to thereby change the distance between the first mirror 30 and the second mirror 40. The above-described first driving circuit 110 (e.g., FIG. 29) is used to apply the voltage to the electrodes 62.

Figure 36:
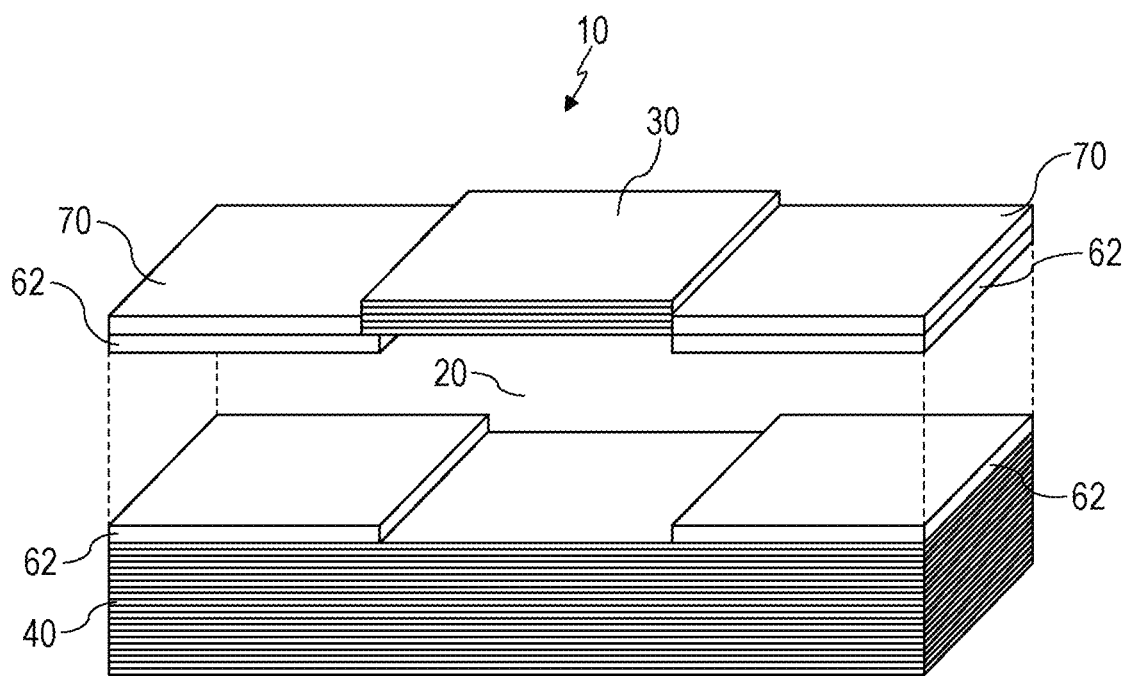
FIG. 36 is an illustration showing a structural example in which electrodes that generate an attractive force are disposed in portions that do not impede propagation of light.

FIG. 36 is an illustration showing a structural example in which electrodes 62 that generate an attractive force are disposed in portions that do not impede propagation of light. In this example, it is not necessary that the electrodes 62 be transparent. As shown in FIG. 36, it is unnecessary that the electrodes 62 fixed to the mirrors 30 and 40 be single electrodes, and the electrodes 62 may be divided. The distance between the mirrors 30 and 40 can be measured by measuring the electrostatic capacitance between parts of the divided electrodes, and feedback control can be performed to adjust, for example, the parallelism between the mirrors 30 and 40.

Instead of using the electrostatic force between the electrodes, electromagnetic induction that generates an attractive or repulsive force in a magnetic material in a coil may be used to drive the mirror 30 and/or the mirror 40.

In an actuator that utilizes a piezoelectric material, a shape-memory alloy, or deformation by heat, a phenomenon in which a material is deformed by energy applied from the outside is utilized. For example, lead zirconate titanate (PZT), which is a typical piezoelectric material, expands and contracts when an electric field is applied in its polarization direction. The use of this piezoelectric material allows the distance between the mirrors 30 and 40 to be changed directly. However, since the piezoelectric constant of PZT is about 100 pm/V, the amount of displacement is very small, e.g., about 0.01%, even when an electric field of 1 V/μm is applied. Therefore, when the piezoelectric material is used, a sufficient mirror moving distance cannot be obtained. However, a structure called unimorph or bimorph may be used to increase the amount of deformation.

Figure 37:
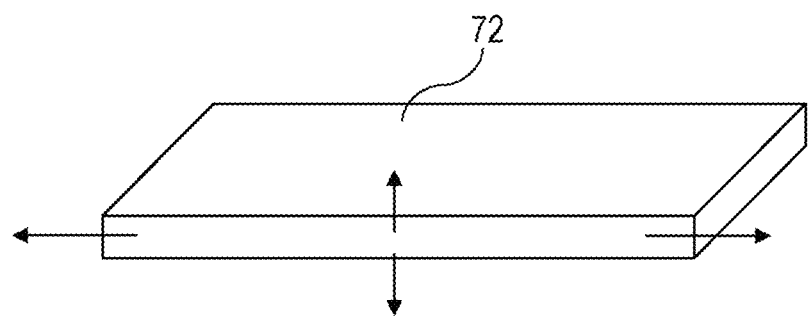
FIG. 37 is an illustration showing an example of a piezoelectric element containing a piezoelectric material.

FIG. 37 is an illustration showing an example of a piezoelectric element 72 containing a piezoelectric material. Arrows represent the deformation directions of the piezoelectric element 72, and the sizes of the arrows represent the amounts of deformation. As shown in FIG. 37, since the amounts of deformation of the piezoelectric element 72 depend on the length of the material, the amount of deformation in the plane direction is larger than the amount of deformation in the thickness direction.

Figure 38A:
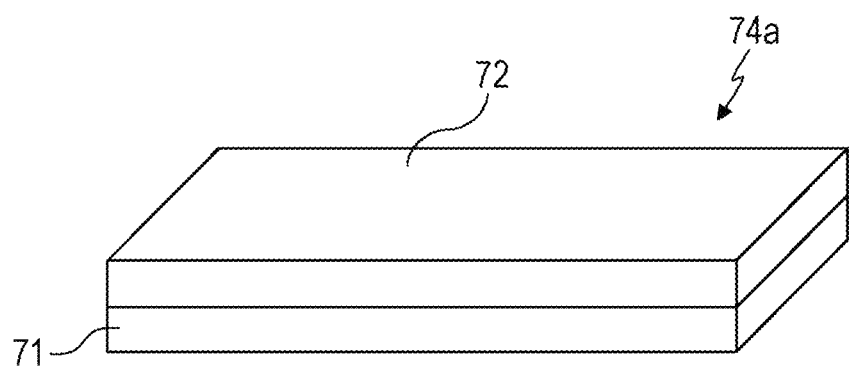
FIG. 38A is an illustration showing a structural example of a support member having a unimorph structure using the piezoelectric element shown in FIG. 37.

FIG. 38A is an illustration showing a structural example of a support member 74a having a unimorph structure using the piezoelectric element 72 shown in FIG. 37. This support member 74a has a structure in which one piezoelectric element 72 and one non-piezoelectric element 71 are stacked. This support member 74a is fixed to at least one of the mirrors 30 and 40. Then, by deforming the resulting support member 74a, the distance between the mirrors 30 and 40 can be changed.

Figure 38B:
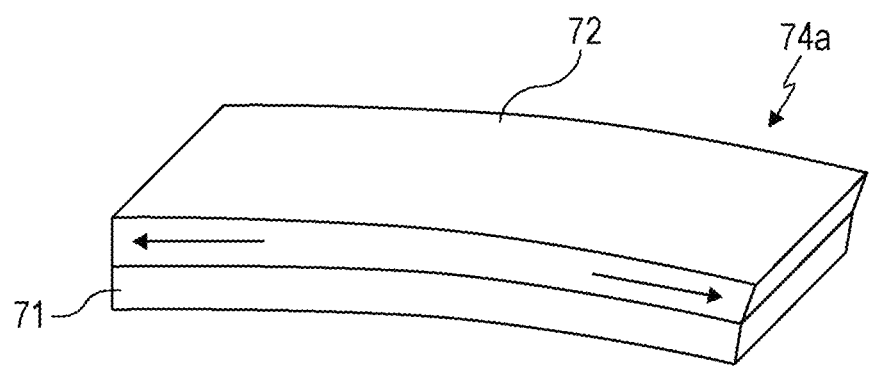
FIG. 38B is an illustration showing an example of a state in which the support member is deformed by applying a voltage to the piezoelectric element.

FIG. 38B is an illustration showing an example of a state in which the support member 74a is deformed by applying a voltage to the piezoelectric element 72. When a voltage is applied to the piezoelectric element 72, only the piezoelectric element 72 expands in a plane direction, and the entire support member 74a is thereby bent. The amount of deformation is larger than that when the non-piezoelectric element 71 is not provided.

Figure 39A:
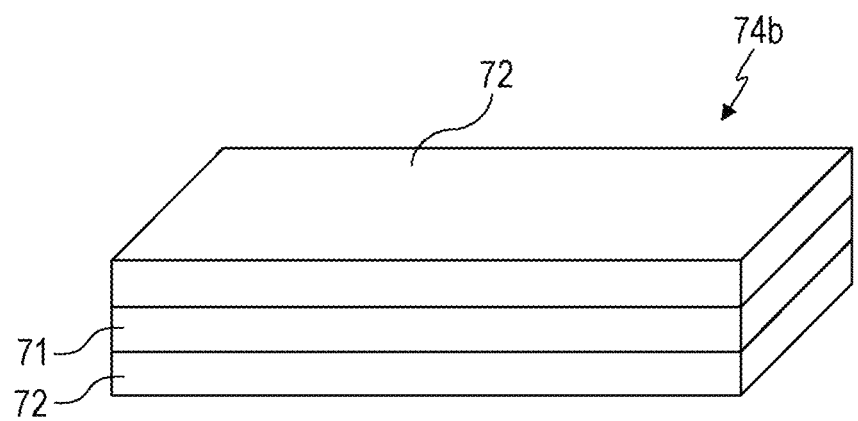
FIG. 39A is an illustration showing a structural example of a support member having a bimorph structure using the piezoelectric elements shown in FIG. 37.

FIG. 39A is an illustration showing a structural example of a support member 74b having a bimorph structure using the piezoelectric element 72 shown in FIG. 37. This support member 74*b* has a structure in which two piezoelectric elements 72 are stacked with one non-piezoelectric element 71 disposed therebetween. This support member 74*b* is fixed to at least one of the mirrors 30 and 40. Then, by deforming the resulting support member 74*b*, the distance between the mirrors 30 and 40 can be changed.

Figure 39B:
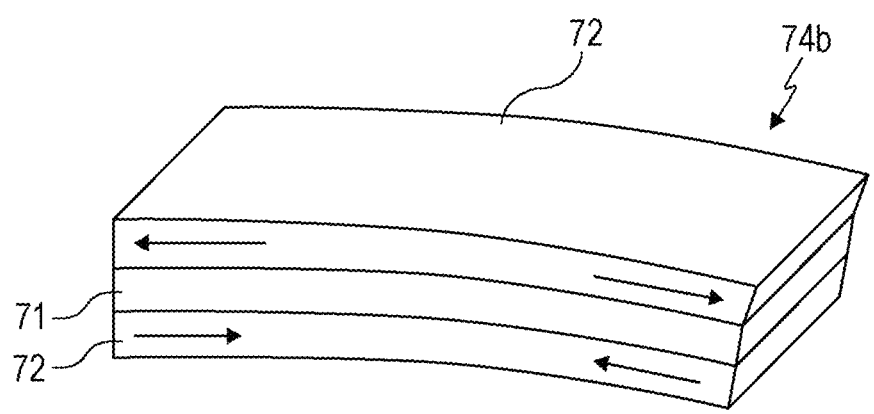
FIG. 39B is an illustration showing an example of a state in which the support member is deformed by applying a voltage to the piezoelectric elements on both sides.

FIG. 39B is an illustration showing a state in which the support member 74*a* is deformed by applying a voltage to the piezoelectric elements 72 on both sides. In the bimorph structure, the deformation direction of the upper piezoelectric element 72 is opposite to the deformation direction of the lower piezoelectric element 72. Therefore, when the bimorph structure is used, the amount of deformation can be larger than that using the unimorph structure.

FIG. 40 is an illustration showing an example of an actuator in which the support members 74*a* shown in FIG. 38A are disposed on both sides of a mirror 30. By using this piezoelectric actuator, each support member 74*a* can be deformed, just like a beam is bent, and the distance between the mirrors 30 and 40 can thereby be changed. Instead of the support members 74*a* shown in FIG. 38A, the support members 74*b* shown in FIG. 39A may be used.

Figure 41A:
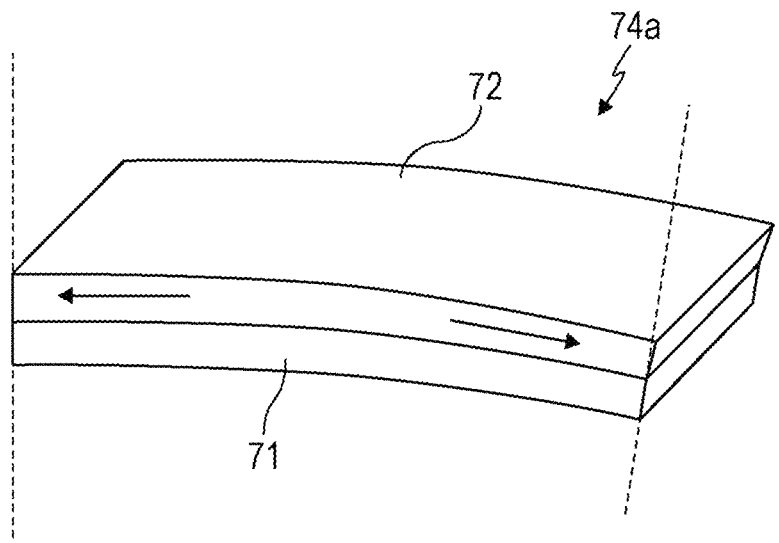
FIG. 41A is an illustration showing the inclination of a forward end that occurs in a unimorph-type actuator.
Figure 41B:
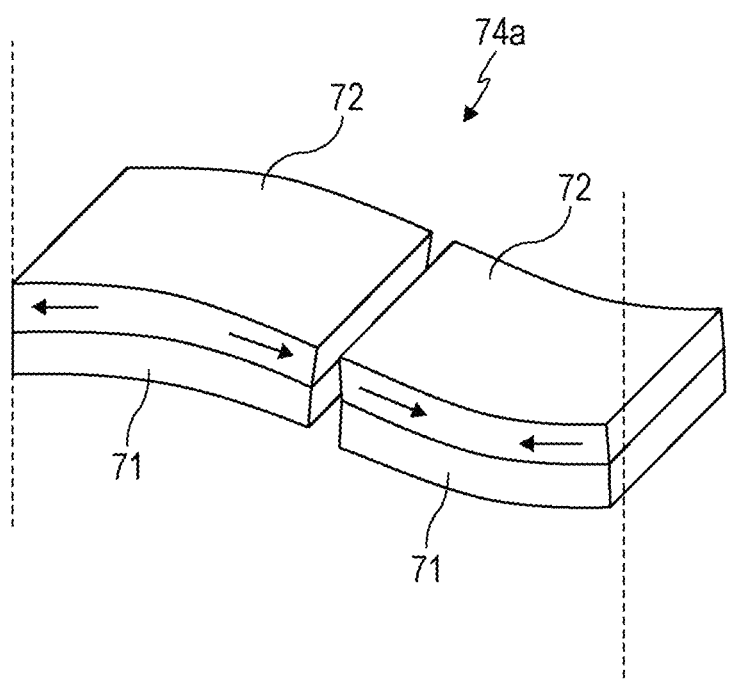
FIG. 41B is an illustration showing an example in which two unimorph-type support members having different expansion-contraction directions are connected in series.

The unimorph-type actuator deforms into an arc shape. Therefore, as shown in FIG. 41A, a non-fixed end of the actuator is inclined. If the stiffness of the mirror 30 is low, it is difficult to maintain the parallelism between the mirrors 30 and 40. As shown in FIG. 41B, two unimorph-type support members 74*a* with different expansion directions may be connected in series. In the support members 74*a* in the example in FIG. 41B, the bending direction of a contracted region is opposite to the bending direction of an extended region. This can prevent the non-fixed end from being inclined. By using the above support members 74*a*, the inclination of the mirrors 30 and 40 can be prevented.

By laminating materials with different thermal expansion coefficients, a bendable-deformable beam structure can be obtained, as in the above case. Such a beam structure can be obtained by using a shape-memory alloy. Any of them can be used to control the distance between the mirrors 30 and 40.

The distance between the mirrors 30 and 40 can be changed also by the following method. A closed space is used as the optical waveguide layer 20, and air or liquid is pumped into or out of the closed space using, for example, a small pump to thereby change the volume of the optical waveguide layer 20.

As described above, various structures can be used for the actuator of the first adjusting element to change the thickness of the optical waveguide layer 20. The thicknesses of the plurality of waveguide elements 10 may be changed separately or together. In particular, when all the plurality of waveguide elements 10 have the same structure, the distances between the mirrors 30 and 40 of the waveguide elements 10 are controlled uniformly. Therefore, one actuator can be used to drive all the waveguide elements 10 collectively.

Figure 42:
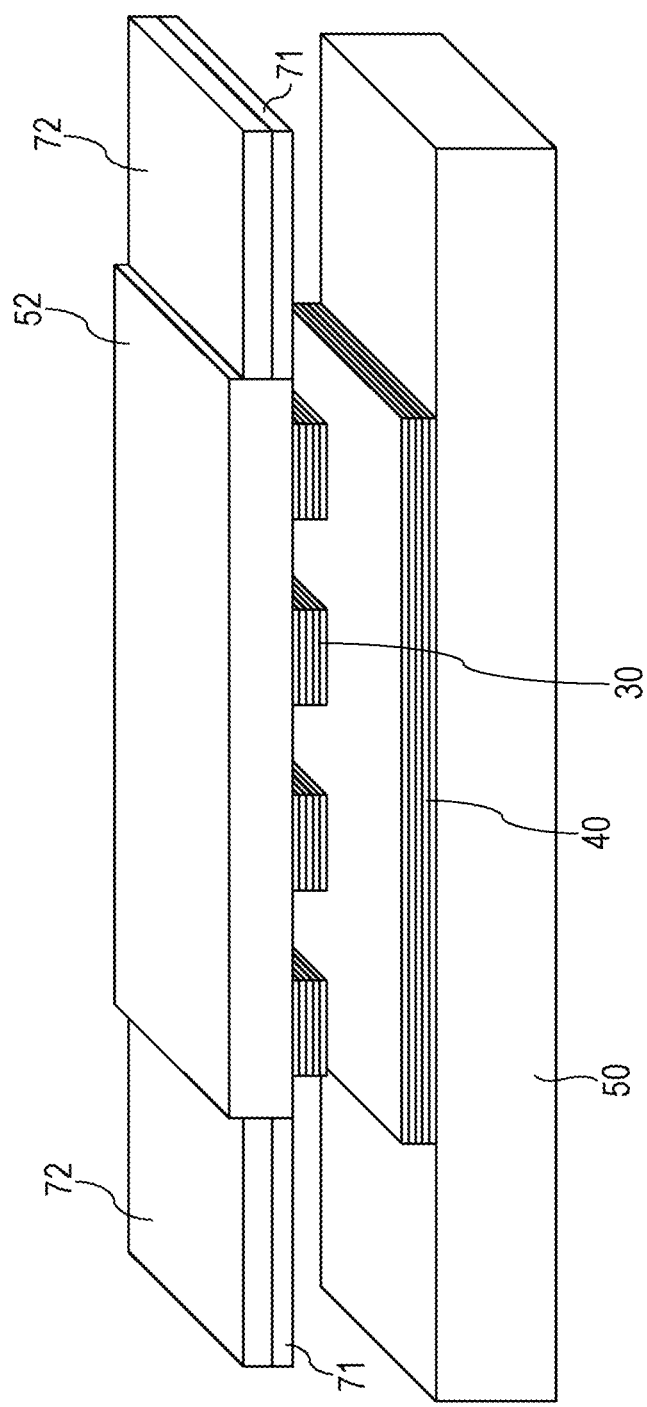
FIG. 42 is an illustration showing an example of a structure in which a plurality of first mirrors held by a support member (i.e., an auxiliary substrate) are collectively driven by an actuator.

FIG. 42 is an illustration showing an example of a structure in which a plurality of first mirrors held by a support member (i.e., an auxiliary substrate) are collectively driven by an actuator. In FIG. 42, one plate-shaped mirror is used as the second mirror 40. The mirror 40 may be divided into a plurality of mirrors, as in the above embodiment. The support member 52 is formed of a light-transmitting material, and unimorph-type piezoelectric actuators are disposed on both sides of the support member 52.

Figure 43:
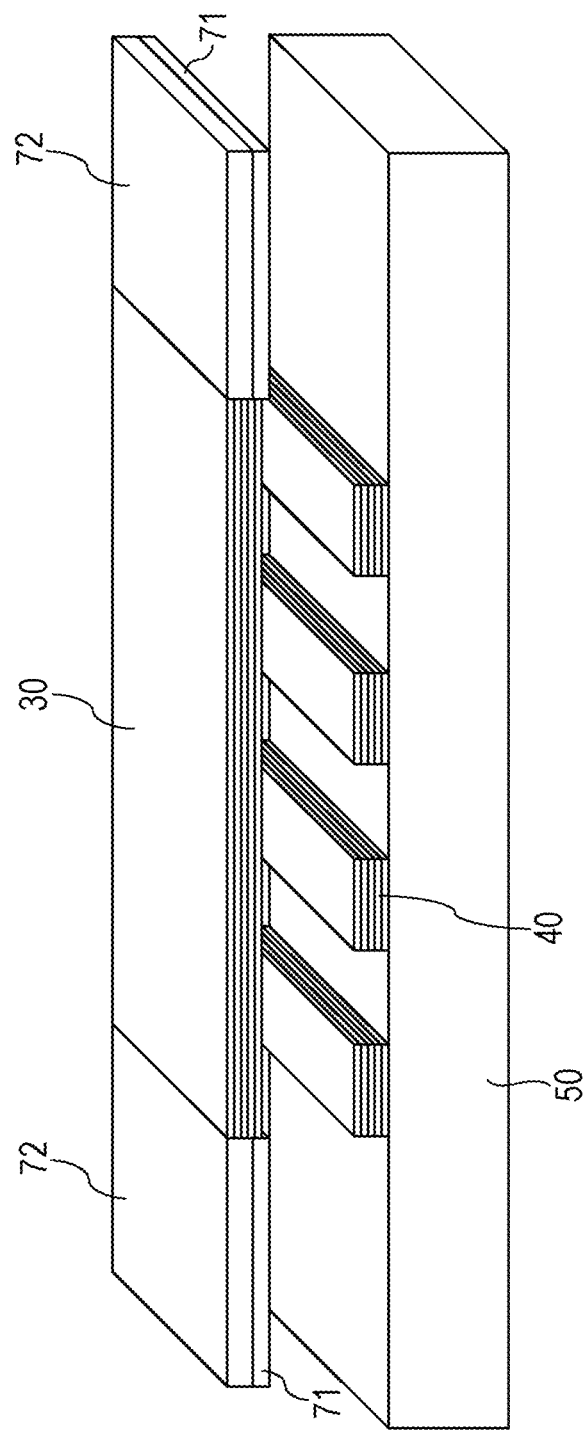
FIG. 43 is an illustration showing a structural example in which one plate-shaped first mirror is used for a plurality of waveguide elements.

FIG. 43 is an illustration showing a structural example in which one plate-shaped first mirror 30 is used for a plurality of waveguide elements 10. In this example, divided second mirrors 40 are provided for respective waveguide elements 10. As in the examples shown in FIGS. 42 and 43, the mirrors 30 or the mirrors 40, or both, of the waveguide elements 10 may be portions of single plate-shaped mirrors. The actuator may move the plate-shaped mirrors to change the distance between the mirrors 30 and 40.

<Refractive Index Modulation for Phase Shifting>

A description will next be given of a structure for adjusting phases in a plurality of phase shifters 80 using the second adjusting element. The phases in the plurality of phase shifters 80 can be adjusted by changing the refractive indexes of waveguides 20*a* of the phase shifters 80. The refractive indexes can be changed using the same method as any of the above-described methods for adjusting the refractive index of the optical waveguide layer 20 of each of the waveguide elements 10. For example, any of the structures and methods for refractive index modulation described with reference to FIGS. 32A to 33 can be applied without any modification. Specifically, in the descriptions for FIGS. 32A to 33, the waveguide element 10 is replaced with the phase shifter 80, the first adjusting element 60 is replaced with the second adjusting element, the optical waveguide layer 20 is replaced with the waveguide 20*a*, and the first driving circuit 110 is replaced with the second driving circuit 210. Therefore, the detailed description of the refractive index modulation in the phase shifter 80 will be omitted.

The waveguide 20*a* of each of the phase shifters 80 contains a material whose refractive index is changed when a voltage is applied or temperature is changed. The second adjusting element changes the refractive index of the waveguide 20*a* of each of the phase shifters 80 by applying a voltage to the waveguide 20*a* or changing the temperature of the waveguide 20*a*. In this manner, the second adjusting element can change the phase differences between light beams propagating from the plurality of phase shifters 80 to the plurality of waveguide elements 10.

Each phase shifter 80 may be configured such that the phase of light can be shifted by at least $2\pi$ when the light passes through. When the amount of change in the refractive index per unit length of the waveguide 20*a* of the phase shifter 80 is small, the length of the waveguide 20*a* may be increased. For example, the size of the phase shifter 80 may be several hundreds of micrometers ($\mu$m) to several millimeters (mm) or may be lager for some cases. However, the length of each waveguide element 10 may be several tens of micrometers to several tens of millimeters.

<Structure for Synchronous Driving>

In the present embodiment, the first adjusting element drives the plurality of waveguide elements 10 such that light beams emitted from the waveguide elements 10 are directed in the same direction. To direct the light beams emitted from the plurality of waveguide elements 10 in the same direction, driving units are provided for their respective waveguide elements 10 and driven synchronously.

Figure 44:
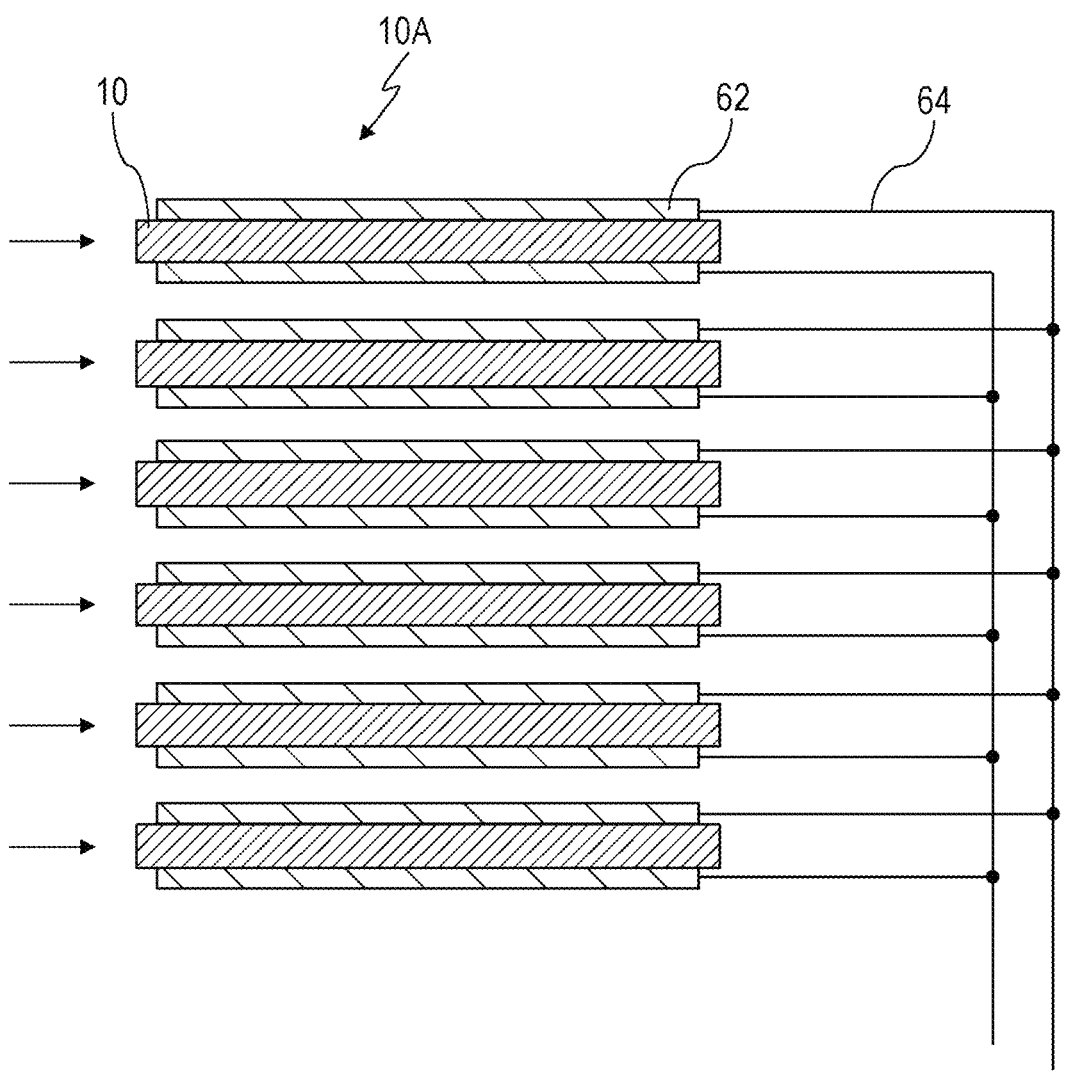
FIG. 44 is an illustration showing an example of a structure in which common wiring lines are led from electrodes of waveguide elements.
Figure 45:
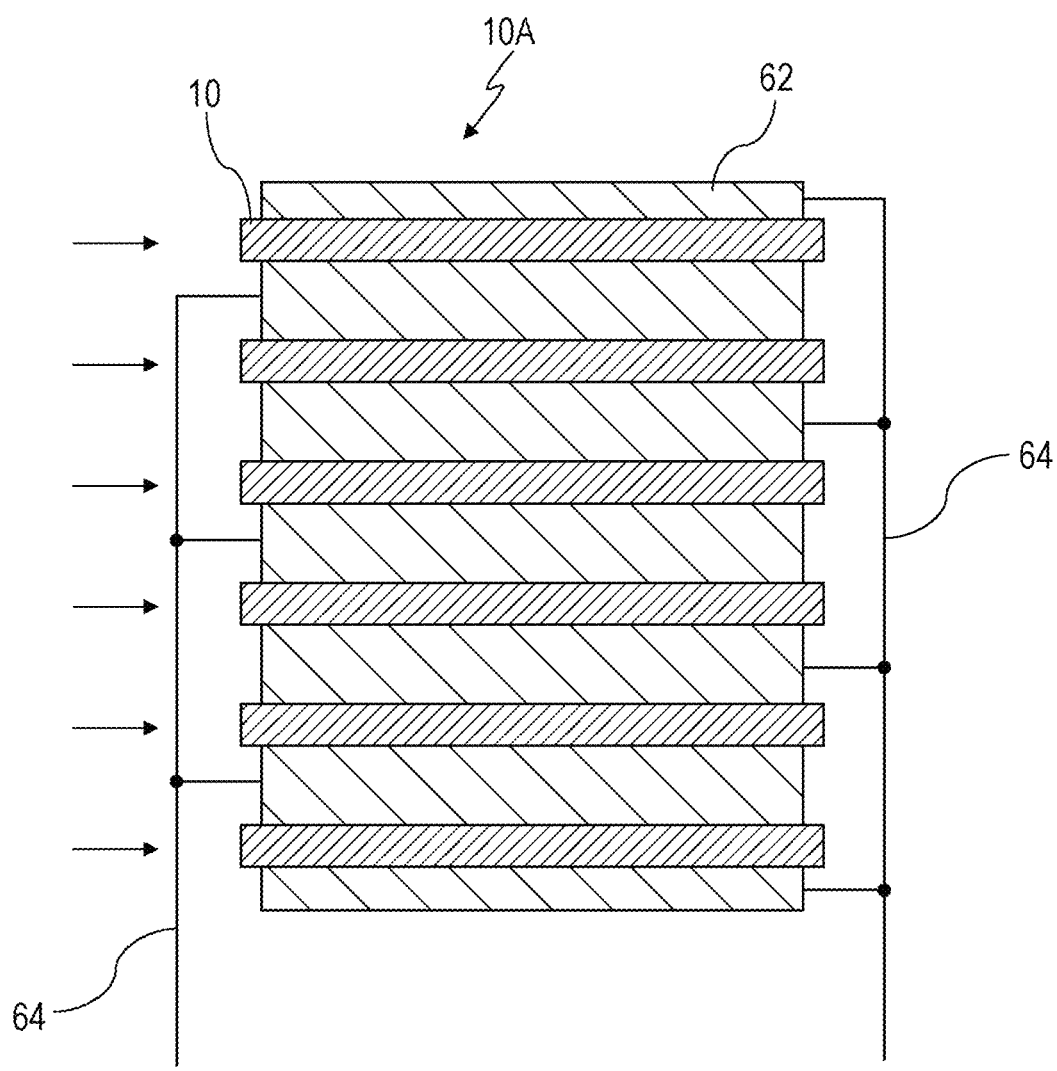
FIG. 45 is an illustration showing an example of a structure in which the wiring lines and some of the electrodes are shared.
Figure 46:
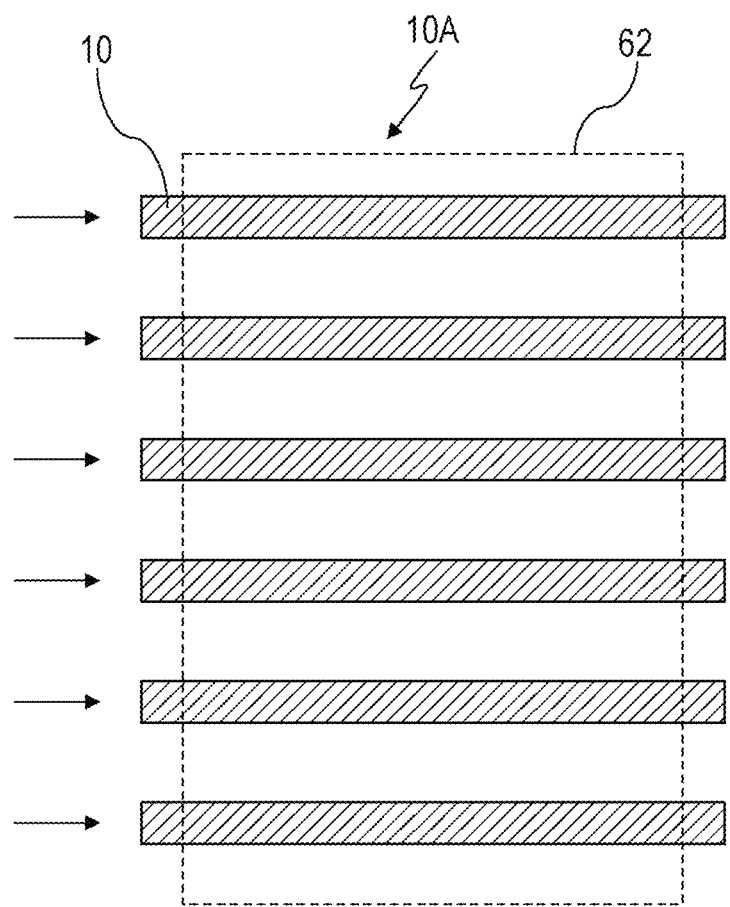
FIG. 46 is an illustration showing an example of a structure in which common electrodes are provided for a plurality of waveguide elements.

FIG. 44 is an illustration showing an example of a structure in which common wiring lines 64 are led from electrodes 62 of the waveguide elements 10. FIG. 45 is an illustration showing an example of a structure in which the wiring lines 64 and some of the electrodes 62 are shared. FIG. 46 is an illustration showing an example of a structure in which common electrodes 62 are provided for a plurality of waveguide elements 10. In FIGS. 44 to 46, each straight arrow indicates the input of light. With the structures shown in FIGS. 44 to 46, the wiring for driving the waveguide array 10A can be simplified.

With the structures in the present embodiment, two-dimensional optical scanning can be performed using a simple device structure. For example, when a waveguide array including N waveguide elements 10 is driven in a synchronous manner using independent driving circuits, N driving circuits are necessary. However, when common electrodes or wiring lines are used in an ingenious manner, only one driving circuit may be used for operation.

When the phase shifter array 80A is disposed upstream of the waveguide array 10A, additional N driving circuits are necessary to drive the phase shifters 80 independently. However, as shown in the example in FIG. 31, by arranging the phase shifters 80 in a cascaded manner, only one driving circuit may be used for driving. Specifically, with the structures in the present disclosure, a two-dimensional optical scanning operation can be implemented by using 2 to 2N driving circuits. The waveguide array 10A and the phase shifter array 80A may be operated independently, so that their wiring lines can be easily arranged with no interference.

<Production Method>

The waveguide array, the phase shifter array 80A, and the waveguides connecting them can be produced by a process capable of high-precision fine patterning such as a semiconductor process, a 3D printer, self-organization, or nanoimprinting. With such a process, all necessary components can be integrated in a small area.

In particular, the use of a semiconductor process is advantageous because very high processing accuracy and high mass productivity can be achieved. When the semiconductor process is used, various materials can be deposited on a substrate using vacuum evaporation, sputtering, CVD, application, etc. Fine patterning can be achieved by photolithography and an etching process. For example, Si, $SiO_2$, $Al_2O_3$, AlN, SiC, GaAs, GaN, etc. can be used as the material of the substrate.

Modifications

Modifications of the present embodiment will next be described.

Figure 47:
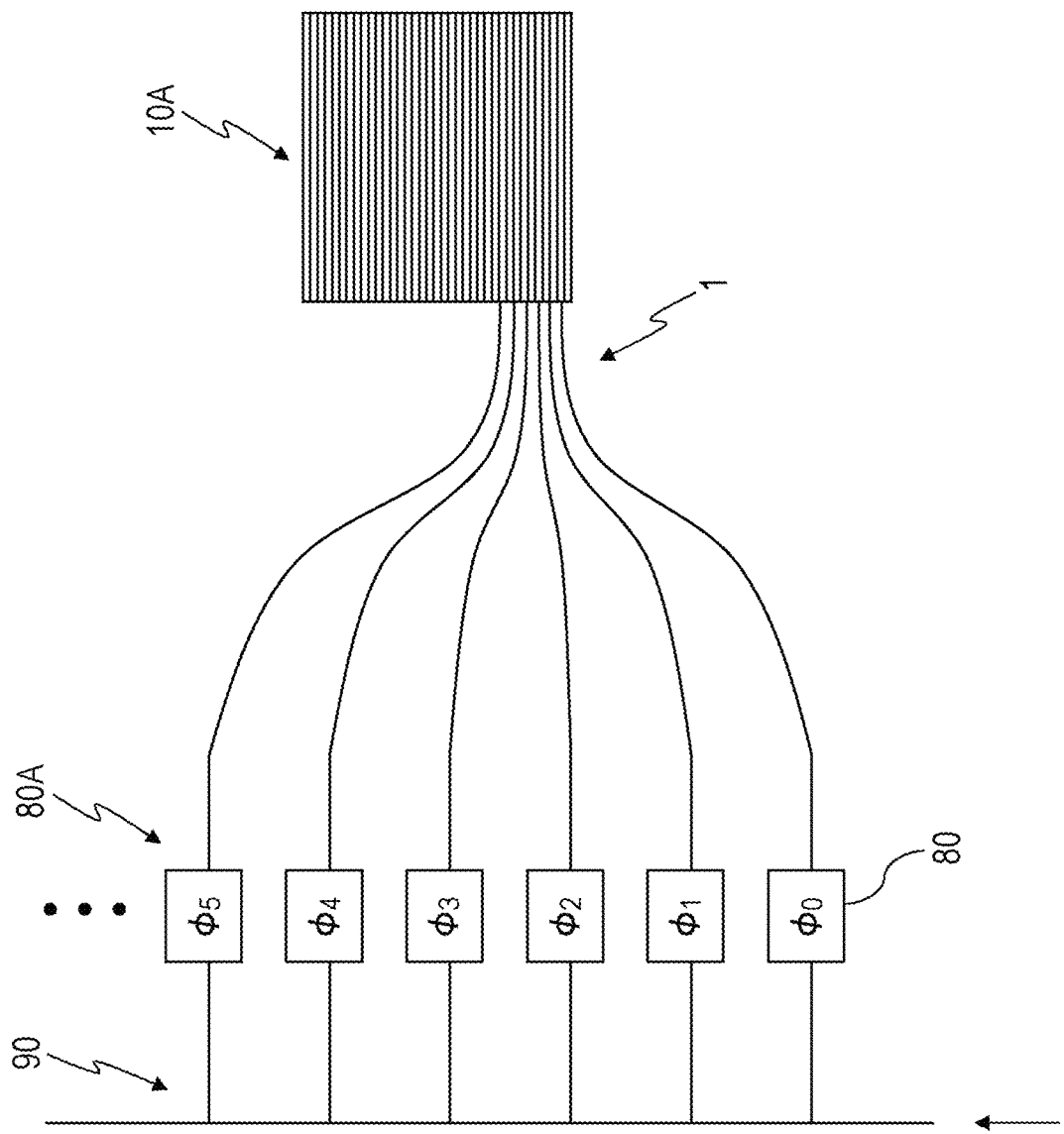
FIG. 47 is an illustration schematically showing an example of a structure in which waveguides are integrated into a small array while a large arrangement area is allocated for a phase shifter array.

FIG. 47 is an illustration schematically showing an example of a structure in which waveguides are integrated into a small array while a large arrangement area is allocated for the phase shifter array 80A. With this structure, even when the change in the refractive index of the material forming the waveguides of the phase shifters 80 is small, a sufficient phase shift amount can be ensured. When each phase shifter 80 is driven using heat, the influence on its adjacent phase shifters 80 can be reduced because large spacing can be provided between them.

FIG. 48 is an illustration showing a structural example in which two phase shifter arrays 80Aa and 80Ab are disposed on respective sides of the waveguide array 10A. In the optical scanning device 100 in this example, two optical dividers 90a and 90b and the two phase shifter arrays 80Aa and 80Ab are disposed on respective sides of the waveguide array 10A. Dotted straight arrows in FIG. 48 indicate light beams propagating through the optical dividers 90a and 90b and the phase shifters 80a and 80b. The phase shifter array 80Aa and the optical divider 90a are connected to one side of the waveguide array 10A, and the phase shifter array 80Ab and the optical divider 90b are connected to the other side of the waveguide array 10A. The optical scanning device 100 further includes an optical switch 92 that switches between supply of light to the optical divider 90a and supply of light to the optical divider 90b. The optical switch 92 allows switching between the state in which light is inputted to the waveguide array 10A from the left side in FIG. 48 and the state in which light is inputted to the waveguide array 10A from the right side in FIG. 48.

The structure in this modification is advantageous in that the range of scanning in the X direction with the light emitted from the waveguide array 10A can be increased. In a structure in which light is inputted to the waveguide array 10A from one side, the direction of the light can be changed from the front direction (the +Z direction) toward one of the +X direction and the −X direction by driving the waveguide elements 10. In the present modification, when the light is inputted from the left optical divider 90a in FIG. 48, the direction of the light can be changed from the front direction toward the +X direction. When the light is inputted from the right optical divider 90b in FIG. 48, the direction of the light can be changed from the front direction toward the −X direction. Specifically, in the structure in FIG. 48, the direction of the light can be changed in both the left and right directions in FIG. 48 as viewed from the front. Therefore, the scanning angle range can be larger than that when the light is inputted from one side. The optical switch 92 is controlled by an electric signal from an unillustrated control circuit (e.g., a microcontroller unit). In this structural example, all the elements can be driven and controlled using electric signals.

Figure 49A:
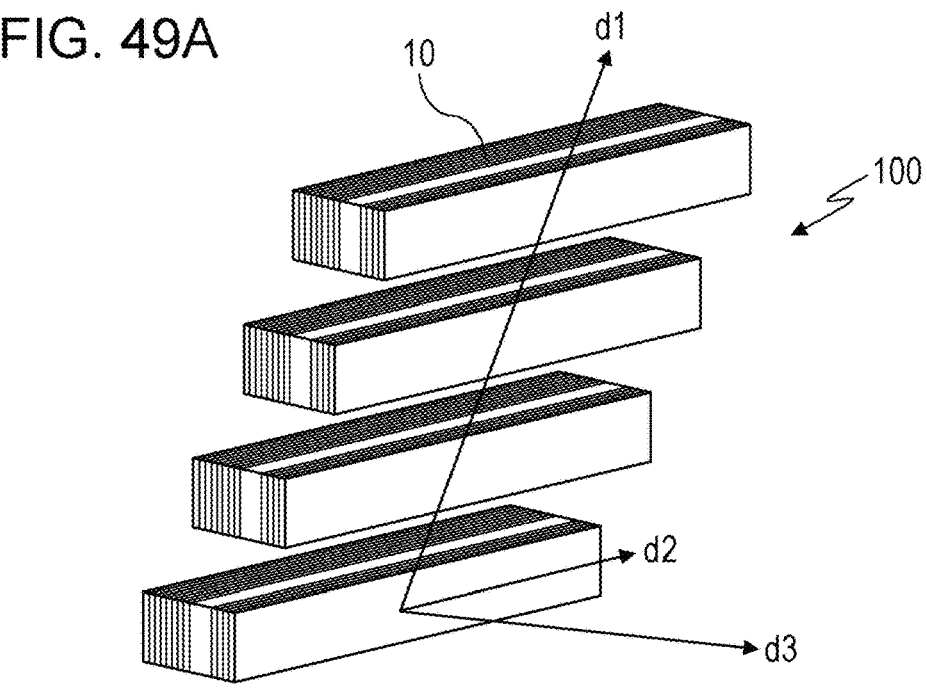
FIG. 49A shows a structural example of a waveguide array in which an arrangement direction d1 of waveguide elements is not orthogonal to an extending direction d2 of the waveguide elements.

In all the waveguide arrays in the above description, the arrangement direction of the waveguide elements 10 is orthogonal to the extending direction of the waveguide elements 10. However, it is unnecessary that these directions be orthogonal to each other. For example, a structure shown in FIG. 49A may be used. FIG. 49A shows a structural example of a waveguide array in which an arrangement direction d1 of waveguide elements 10 is not orthogonal to an extending direction d2 of the waveguide elements 10. In this example, the light-emission surfaces of the waveguide elements 10 may not be in the same plane. Even with this structure, the emission direction d3 of light can be changed two-dimensionally by appropriately controlling the waveguide elements 10 and the phase shifters.

Figure 49B:
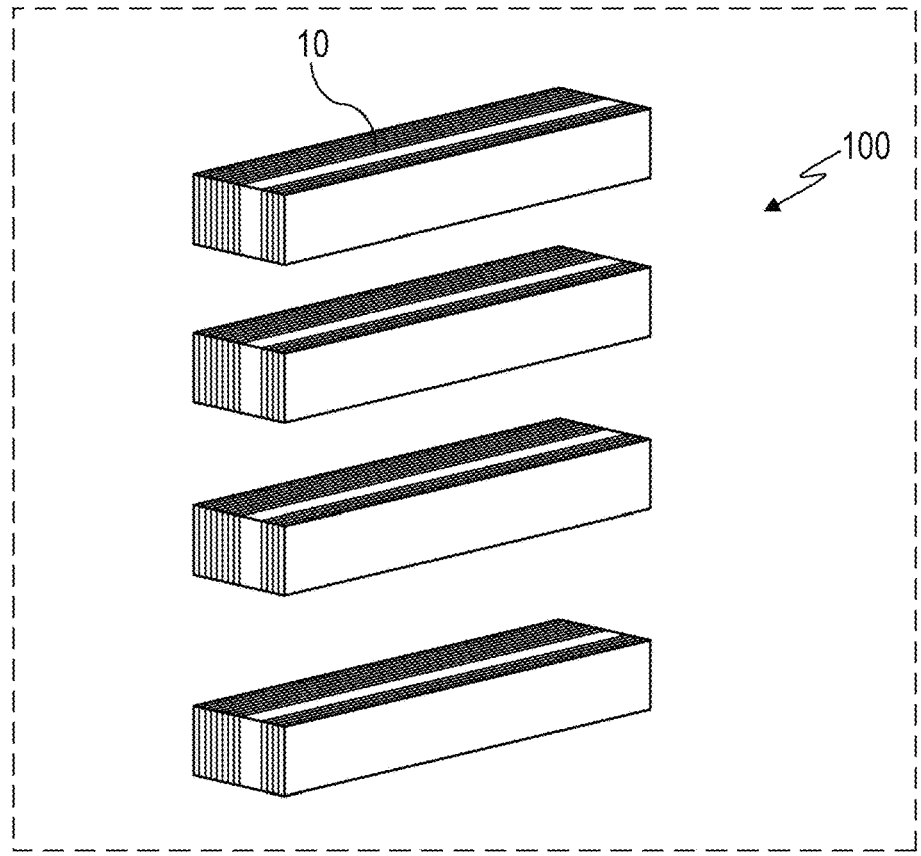
FIG. 49B shows a structural example of a waveguide array in which waveguide elements are arranged at non-regular intervals.

FIG. 49B shows a structural example of a waveguide array in which waveguide elements 10 are arranged at non-regular intervals. Even when this structure is employed, two-dimensional scanning can be performed by appropriately setting the phase shift amounts by the phase shifters. Also in the structure in FIG. 49B, the arrangement direction d1 of the waveguide array may not be orthogonal to the extending direction d2 of the waveguide elements 10.

<Embodiment in which First and Second Waveguides are Disposed on Substrate>

Next, an embodiment of an optical scanning device in which first and second waveguides are disposed on a substrate will be descried.

The optical scanning device in the present embodiment includes: first waveguides; second waveguides connected to the first waveguides; and a substrate that supports the first and second waveguides. More specifically, the optical scanning device includes: a plurality of waveguide units arranged in a first direction; and the substrate that supports the plurality of waveguide units. Each of the plurality of waveguide units includes a first waveguide and a second waveguide. The second waveguide is connected to the first waveguide and propagates light in a second direction intersecting the first direction. The substrate supports the first waveguide and the second waveguide of each of the waveguide units.

The second waveguide corresponds to the reflective waveguide in the embodiment described above. Specifically, the second waveguide includes: a first mirror including a multilayer reflective film; a second mirror including a multilayer reflective film facing the multilayer reflective film of the first mirror; and an optical waveguide layer that is located between the first and second mirrors and propagates light inputted to the first waveguide and transmitted therethrough. The first mirror has a higher light transmittance than the second mirror and allows part of the light propagating through the optical waveguide layer to be emitted to the outside of the optical waveguide layer. The optical scanning device further includes an adjusting element that changes at least one of the refractive index and thickness of the optical waveguide layer of each of the second waveguides to thereby change the direction of light emitted from the each of the second waveguides.

In the present embodiment, the first and second waveguides are disposed on one substrate, so that the first waveguides 1 and the second waveguides 10 can be easily aligned with each other. In addition, positional displacement between the first and second waveguides due to thermal expansion is reduced. Therefore, light beams can be efficiently introduced from the first waveguides to the second waveguides.

Each optical waveguide layer may contain a material whose refractive index for the light propagating through the optical waveguide layer is changed when a voltage is applied. In this case, the adjusting element changes the refractive index of the optical waveguide layer by applying a voltage to the optical waveguide layer. In this manner, the adjusting element changes the direction of the light emitted from each second waveguide.

At least part of each first waveguide may have the function as the phase shifter described above. In this case, a mechanism that modulates the refractive index of the first waveguide is installed in the first waveguide. The optical scanning device may further include a second adjusting element that modulates the refractive index of at least a partial region of each first waveguide. The second adjusting element may be a heater disposed in the vicinity of the first waveguide. The refractive index of at least the partial region of the first waveguide can be changed by heat generated by the heater. In this manner, the phases of light beams inputted from the first waveguides to the second waveguides are adjusted. As described above, various structures can be used to adjust the phases of the light beams inputted from the first waveguides to the second waveguides. Any of these structures may be used.

The phase shifters may be disposed outside of the first waveguides. In this case, each first waveguide is disposed between a corresponding external phase shifter and a corresponding waveguide element (second waveguide). No clear boundary may be present between the phase shifter and the first waveguide. For example, the phase shifter and the first waveguide may share components such as a waveguide and the substrate.

Each first waveguide may be a general waveguide that utilizes total reflection of light or may be a reflective waveguide. The phase-modulated light beam passes through the first waveguide and is introduced into the corresponding second waveguide.

The embodiment of the optical scanning device in which the first and second waveguides are disposed on the substrate will be described in more detail. In the following description, the optical scanning device includes a plurality of waveguide units. The optical scanning device may include only one waveguide unit. Specifically, an optical scanning device including only one pair of first and second waveguides is included in the scope of the present disclosure.

Figure 50A:
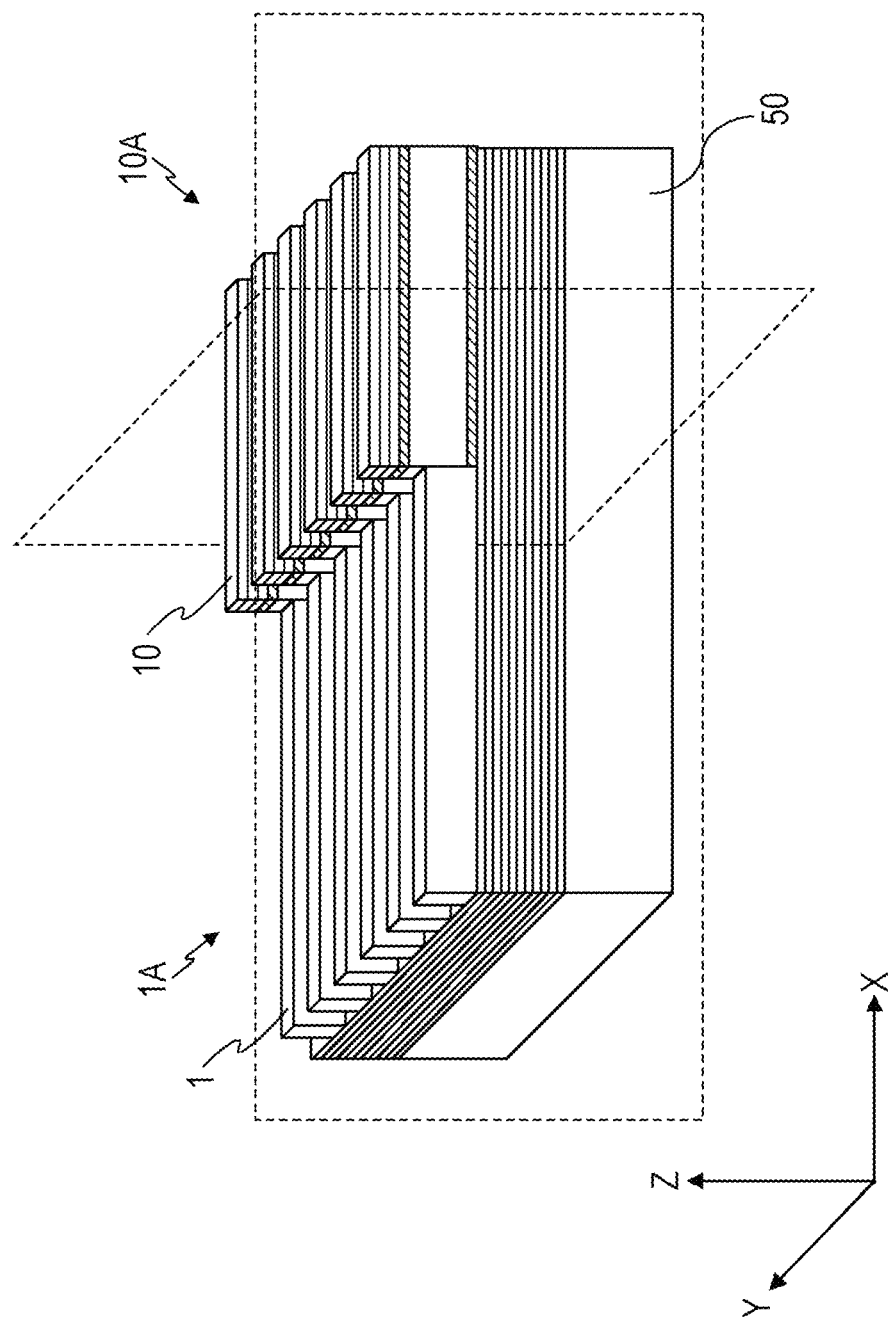
FIG. 50A is an illustration schematically showing an optical scanning device in an embodiment.

FIG. 50A is an illustration schematically showing the optical scanning device in the present embodiment. This optical scanning device includes a plurality of waveguide units arranged in the Y direction and a substrate 50 that supports the plurality of waveguide units. Each of the waveguide units includes a first waveguide 1 and a second waveguide 10. The substrate 50 supports the first waveguide 1 and the second waveguide 10 of each of the waveguide units.

The substrate 50 extends along the XY plane. The upper and lower surfaces of the substrate 50 are disposed approximately parallel to the XY plane. The substrate 50 may be formed of a material such as glass Si, $SiO_2$, GaAs, or GaN.

A first waveguide array 1A includes a plurality of the first waveguides 1 arranged in the Y direction. Each of the first waveguides 1 has a structure extending in the X direction. A second waveguide array 10A includes a plurality of the second waveguides 10 arranged in the Y direction. Each of the second waveguides 10 has a structure extending in the X direction.

Figure 50B:
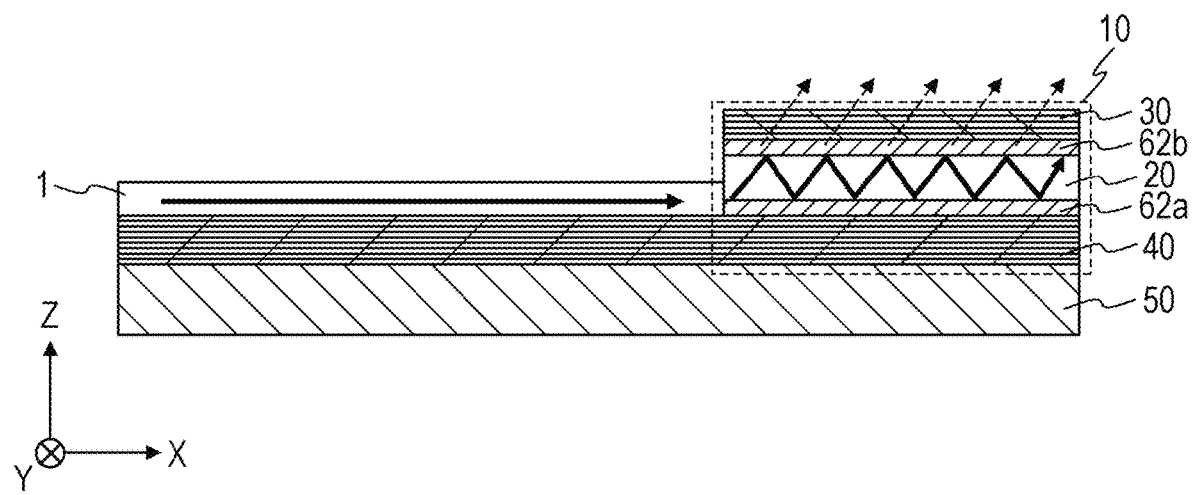
FIG. 50B is a cross-sectional view of the optical scanning device in the XZ plane shown by one of broken lines in FIG. 50A.

FIG. 50B is a cross-sectional view of the optical scanning device in the XZ plane shown by one of broken lines in FIG. 50A. First and second waveguides 1 and 10 are disposed on the substrate 50. A second mirror 40 extends in a region between an optical waveguide layer 20 and the substrate 50 and between the first waveguide 1 and the substrate 50. The first waveguide 1 is, for example, a general waveguide that uses total reflection of light. One example of the general waveguide is a waveguide formed of a semiconductor such as Si or GaAs. The second waveguide 10 includes the optical waveguide layer 20 and first and second mirrors 30 and 40. The optical waveguide layer 20 is located between the first mirror 30 and the second mirror 40 facing each other. The optical waveguide layer 20 propagates light inputted to the first waveguide and transmitted therethrough.

The optical waveguide layer 20 in the present embodiment contains a material whose refractive index for the light beam propagating through the optical waveguide layer 20 is changed when a voltage is applied. The adjusting element includes a pair of electrodes. The pair of electrodes includes a lower electrode 62a and an upper electrode 62b. The lower electrode 62a is disposed between the optical waveguide layer 20 and the second mirror 40. The upper electrode 62b is disposed between the optical waveguide layer 20 and the first mirror 30. The adjusting element in the present embodiment changes the refractive index of the optical waveguide layer 20 by applying a voltage to the pair of electrodes 62a and 62b. In this manner, the adjusting element changes the direction of the light emitted from each second waveguide 10. Each of the electrodes 62a and 62b may be in contact with the optical waveguide layer 20 as shown in FIG. 50B or may not be in contact with the optical waveguide layer 20.

In the structural example in FIG. 50B, the second mirror 40 is stacked on the substrate 50 to form a common support, and other structures are disposed on the support. Specifically, a stack including the first waveguides 1, the first electrode 62a, the optical waveguide layers 20, the second electrodes 62b, and the first mirrors 30 is formed on the integrally formed support. Since the common support is used, the first waveguides 1 and the optical waveguide layers 20 are easily aligned with each other during production. In addition, positional displacement of connection portions between the first waveguides 1 and the optical waveguide layer 20 due to thermal expansion can be reduced. The support is, for example, a support substrate.

Figure 50C:
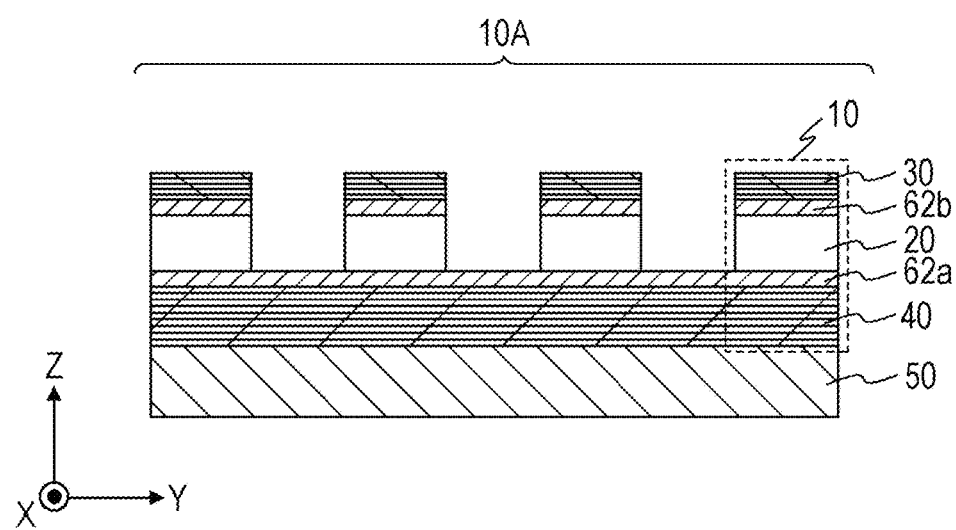
FIG. 50C is a cross-sectional view of the optical scanning device in the YZ plane shown by the other one of the broken lines in FIG. 50A.

FIG. 50C is a cross-sectional view of the optical scanning device in the YZ plane shown by the other one of the broken lines in FIG. 50A. In this example, the second mirror 40 is shared by the plurality of second waveguides 10. Specifically, the second mirror 40 is not divided, and this non-divided second mirror 40 is used for the plurality of second waveguides 10. Similarly, the lower electrode 62a is shared by the plurality of second waveguides 10. This allows the production process to be simplified.

In the plurality of second waveguides 10, the optical waveguide layers 20 are separated from each other. The upper electrodes 62b are separated from each other, and the first mirrors 30 are separated from each other. In this manner, each optical waveguide layer 20 can propagate light in the X direction. The upper electrodes 62b and the first mirrors 30 may be a single non-divided upper electrode 62 and a single non-divided first mirror 30, respectively.

Modifications of the optical scanning device in the present embodiment will be described. In the following modifications, repeated description of the same components will be omitted.

Figure 51A:
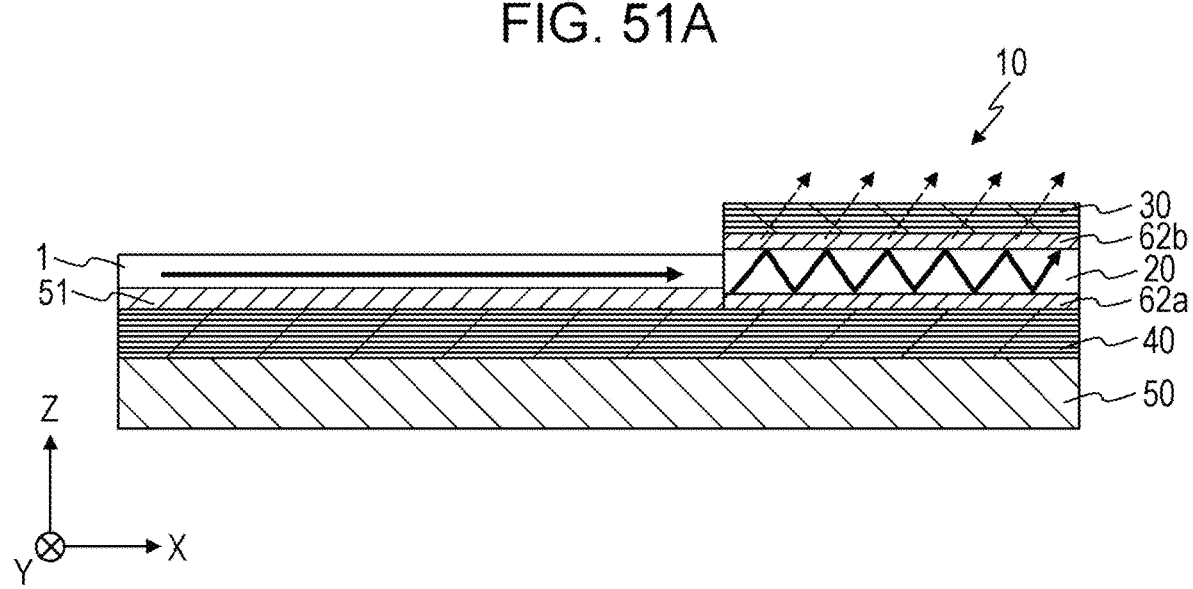
FIG. 51A is an illustration showing a structural example in which a dielectric layer is disposed between a second mirror and a waveguide.

FIG. 51A is an illustration showing a structural example in which a dielectric layer 51 is disposed between the second mirror 40 and the waveguide 1. The optical scanning device in this example further includes the dielectric layer 51 extending between the second mirror 40 and the first waveguide 1. The dielectric layer 51 serves as an adjustment layer for adjusting the height level of the first waveguide 1 relative to the height level of the optical waveguide layer 20. Hereinafter, the dielectric layer 51 is referred to as the adjustment layer 51. By adjusting the thickness of the adjustment layer 51 in the Z direction, the coupling efficiency of light from the first waveguide 1 to the optical waveguide layer 20 can be increased. The adjustment layer 51 serves also as a spacer that prevents the guided light in the first waveguide 1 from being absorbed, scattered, and reflected by the second mirror 40. The first waveguide 1 propagates light by total reflection. Therefore, the adjustment layer 51 is formed of a transparent material having a lower refractive index than the first waveguide 1. For example, the adjustment layer 51 may be formed of a dielectric material such as $SiO_2$.

Another dielectric layer serving as a protective layer may be disposed on the first waveguide.

Figure 51B:
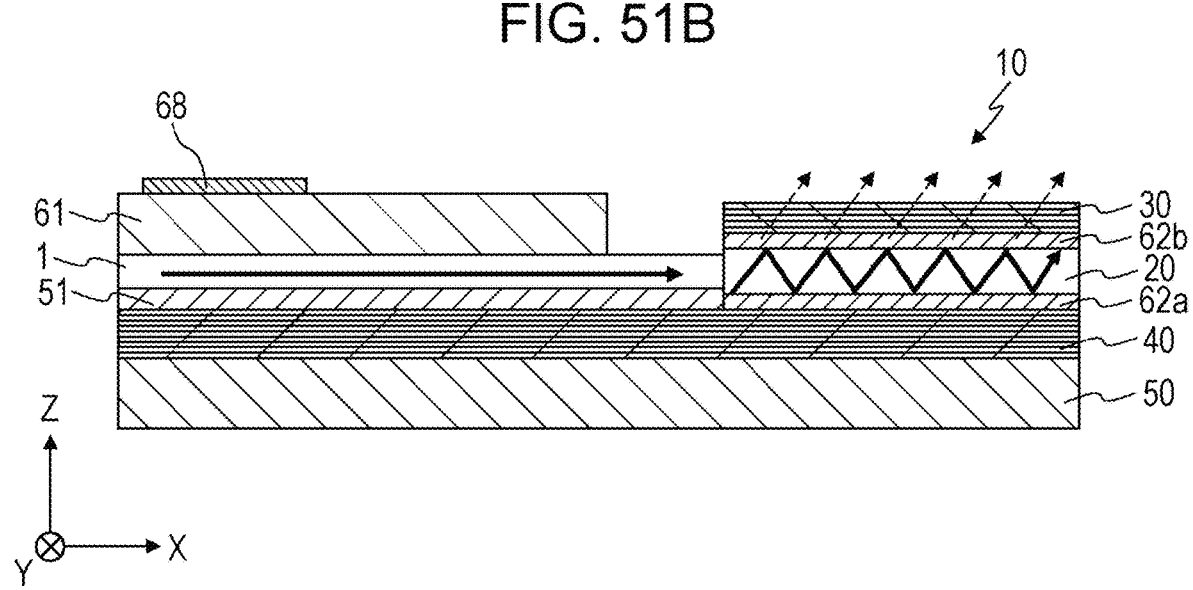
FIG. 51B is an illustration showing a structural example in which a second dielectric layer is disposed on the first waveguide.

FIG. 51B is an illustration showing a structural example in which a second dielectric layer 61 is disposed on the first waveguide 1. As described above, the optical scanning device may further include the second dielectric layer 61 that covers at least part of the first waveguide 1. The second dielectric layer 61 is in contact with the first waveguide 1 and is formed of a transparent material having a lower refractive index than the first waveguide 1. The second dielectric layer 61 serves also as the protective layer that prevents particles and dust from adhering to the first waveguide 1. This can reduce loss of the guided light in the first waveguide 1. Hereinafter, the second dielectric layer 61 is referred to as the protective layer 61.

The first waveguide 1 shown in FIG. 51B functions as a phase shifter. The optical scanning device further includes a second adjusting element that modulates the refractive index of the first waveguide 1 to thereby change the phase of the light introduced into the optical waveguide layer 20. When the first waveguide 1 contains a thermooptical material, the second adjusting element includes a heater 68. The second adjusting element modulates the refractive index of the first waveguide 1 using heat generated by the heater 68.

A wiring material such as a metal contained in the heater 68 can absorb, scatter, or reflect light. The protective layer 61 keeps the heater 68 at a distance from the first waveguide 1 to thereby reduce loss of the guided light in the first waveguide 1.

The protective layer 61 may be formed of the same material as the material (e.g., $SiO_2$) of the adjustment layer 51. The protective layer 61 may cover not only the first waveguide 1 but also at least part of the second waveguide 10. In this case, at least part of the first mirror 30 is covered with the protective layer 61. The protective layer 61 may cover only the second waveguide 10. When the protective layer 61 is formed of a transparent material, the light emitted from the second waveguide 10 passes through the protective layer 61. This allows the loss of light to be small.

Figure 52:
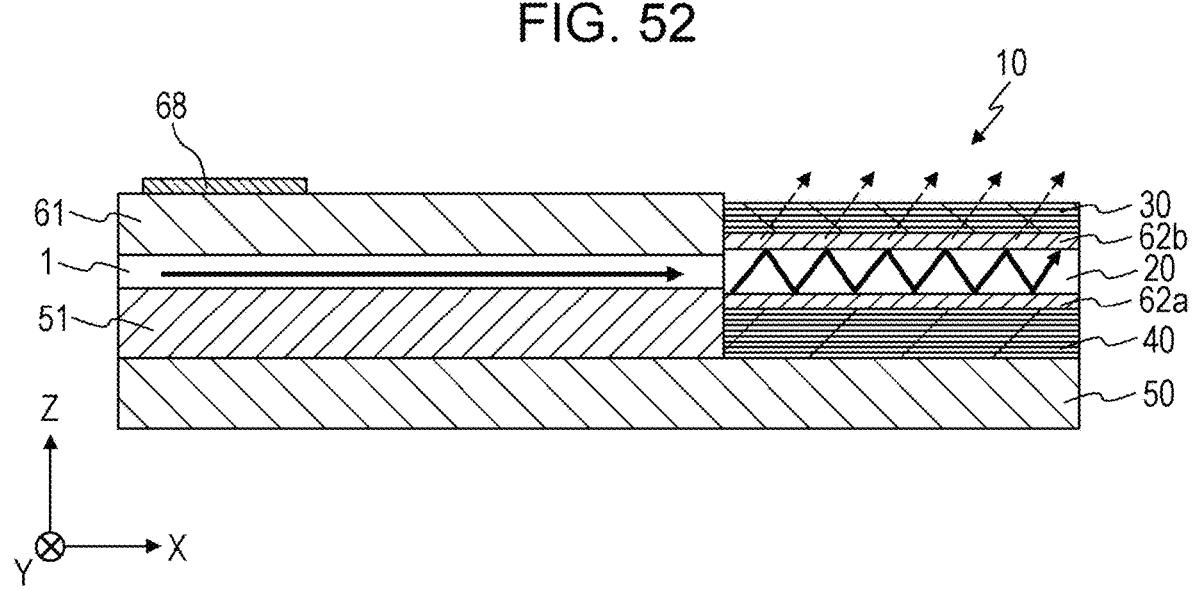
FIG. 52 is an illustration showing a structural example in which the second mirror is not disposed in a region between the first waveguide and the substrate.

FIG. 52 is an illustration showing a structural example in which the second mirror 40 is not disposed in a region between the first waveguide 1 and the substrate 50. The adjustment layer 51 in this example extends in the region between the first waveguide 1 and the substrate 50. The adjustment layer 51 is in contact with the first waveguide 1 and the substrate 50. Since the second mirror 40 is not present below the first waveguide 1, the guided light in the first waveguide 1 is not influenced by the second mirror 40.

Figure 53:
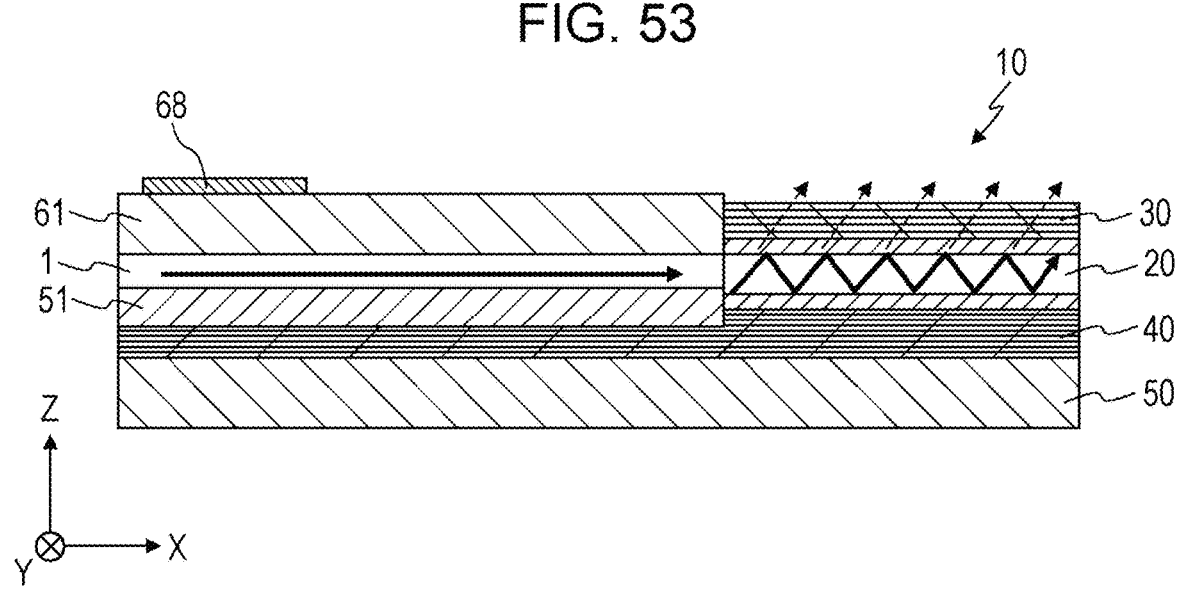
FIG. 53 is an illustration showing a structural example in which, between the first waveguide and the substrate, the second mirror is thinner than the second mirror in the structural example in FIG. 51B.

FIG. 53 is an illustration showing a structural example in which, between the first waveguide 1 and the substrate 50, the second mirror 40 is thinner than the second mirror 40 in the structural example in FIG. 51B. The second mirror 40 may have a portion disposed between the first waveguide 1 and the substrate 50 and having a smaller thickness than a portion disposed between the second waveguide 10 and the substrate 50, as in this example. The adjustment layer 51 is disposed between the first waveguide 1 and the second mirror 40. In this structure, the guided light in the first waveguide 1 is less influenced by the second mirror 40. In the example in FIG. 53, a step is formed by the second mirror 40 at the junction between the first waveguide 1 and the optical waveguide layer 20, but the height of the step is smaller than that in the example in FIG. 52. Therefore, the second mirror 40 can be more easily processed.

The thickness of the second mirror 40 may vary along the waveguide 1. Such an example will next be described.

Figure 54A:
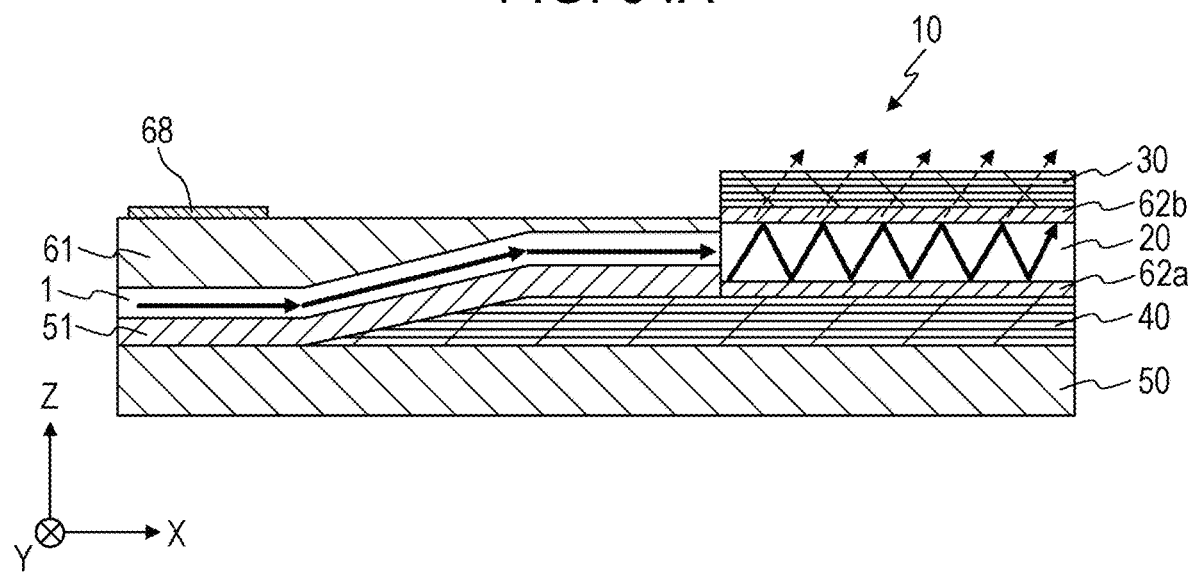
FIG. 54A is an illustration showing a structural example in which the thickness of the second mirror varies gradually.

FIG. 54A is an illustration showing a structural example in which the thickness of the second mirror 40 varies gradually. Between the first waveguide 1 and the substrate 50, the thickness of the second mirror 40 varies along the first waveguide 1.

In the example in FIG. 54A, the second mirror 40 is not present below a left portion of the first waveguide 1. The left portion of the first waveguide 1 is located lower than the optical waveguide layer 20. The second mirror 40 is present below a right portion of the first waveguide 1, i.e., its portion connected to the optical waveguide layer 20. The right portion of the first waveguide 1 is located at about the same height as the optical waveguide layer 20. By adjusting the thickness of the protective layer 61, the upper surface of the protective layer 61 can be made flat.

In the structural example in FIG. 54A, the heater 68 disposed on the protective layer 61 is sufficiently spaced apart from the first waveguide 1. Therefore, the guided light in the first waveguide 1 is less influenced by the wiring of the heater 68. The loss of the guided light in the first waveguide 1 can thereby be reduced.

Figure 54B:
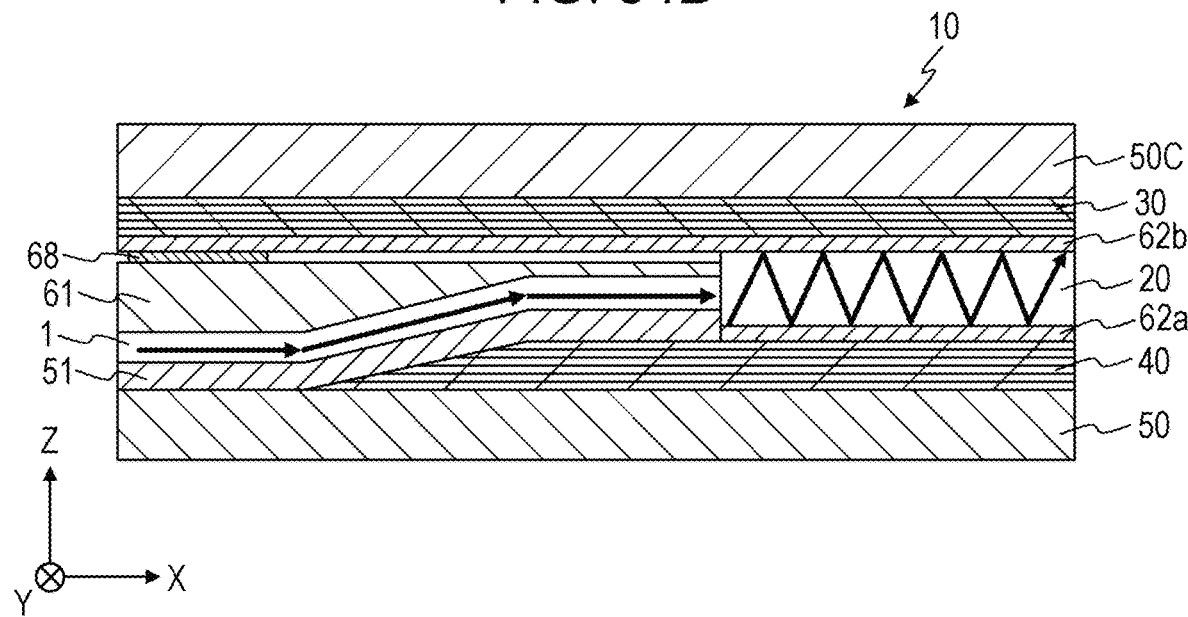
FIG. 54B is an illustration showing a structural example in which an upper electrode, a first mirror, and a second substrate are disposed so as to extend over a protective layer of the first waveguide and the optical waveguide layer of the second waveguide.
Figure 54C:
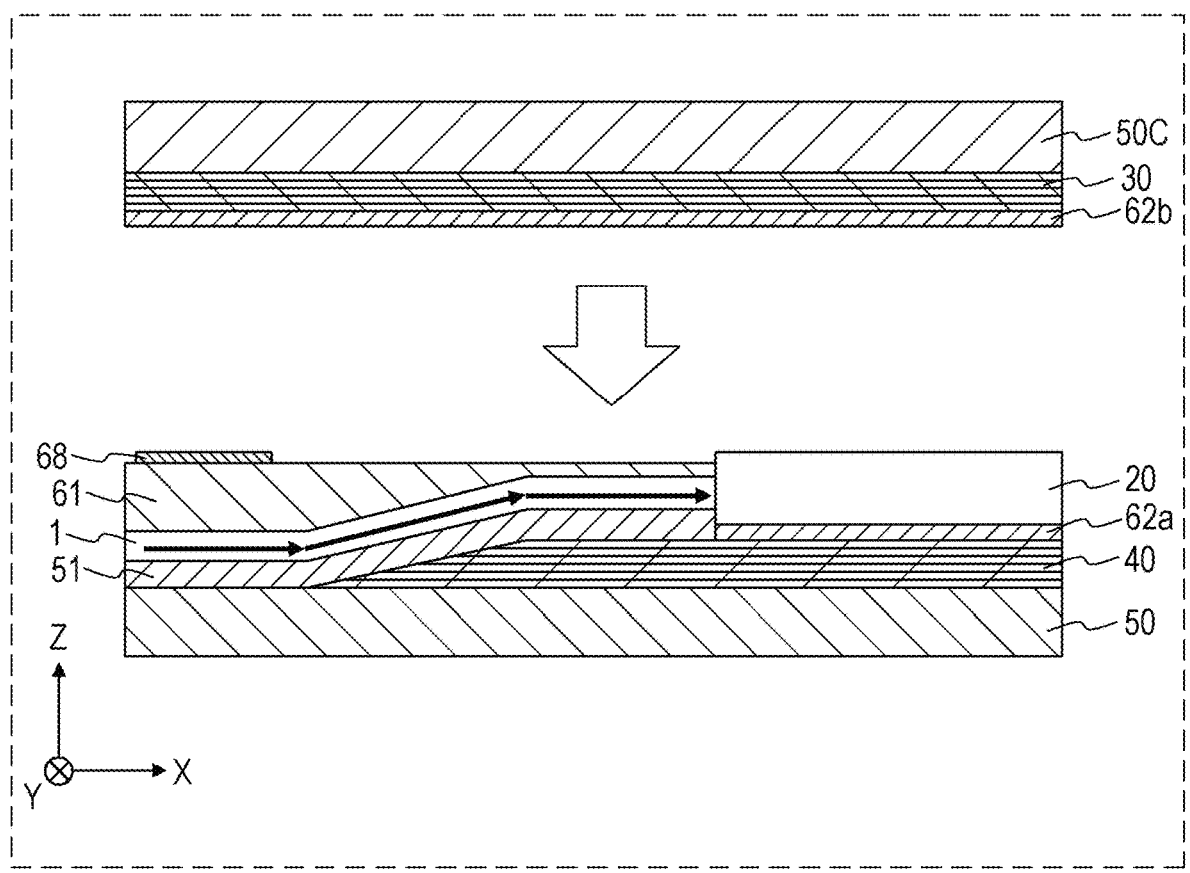
FIG. 54C is an illustration showing part of a production process in the structural example in FIG. 54B.

FIG. 54B is an illustration showing a structural example in which the upper electrode 62b, the first mirror 30, and a second substrate 50C are disposed so as to extend over the protective layer 61 of the first waveguide 1 and the optical waveguide layer 20 of the second waveguide 10. FIG. 54C is an illustration showing part of a production process in the structural example in FIG. 54B.

In the example in FIG. 54B, a structural body including the upper electrode 62b, the first mirror 30, and the second substrate 50C (hereinafter referred to as an "upper structural body") and a structural body lower than the upper electrode 62b (hereinafter referred to as a "lower structural body") are produced separately.

To produce the lower structural body, the second mirror 40 having an inclination is first formed on the first substrate 50. The adjustment layer 51, a layer of the waveguide 1, and the protective layer 61 are formed in this order on a portion of the second mirror 40 that includes the inclination. The lower electrode 62a and the optical waveguide layer 20 are formed on a flat portion of the second mirror 40.

The upper structural body is produced by stacking the first mirror 30 and the upper electrode 62b in this order on the second substrate 50C. As shown in FIG. 54C, the upper structural body is turned upside down and then laminated onto the lower structural body. With the above production method, it is unnecessary to precisely align the first waveguide 1 and the second waveguide 10 with each other.

The upper surface of the protective layer 61, i.e., its surface opposite to the surface in contact with the first waveguide 1, is lower than the upper surface of the optical waveguide layer 20 of the second waveguide 10. The upper surface of the heater 68 on the first waveguide 1 is at about the same level as the upper surface of the optical waveguide layer 20 of the second waveguide 10. In this case, the upper structural body and the lower structural body can be laminated together with no step. The upper structural body may be formed by, for example, vapor deposition or sputtering.

Figure 55:
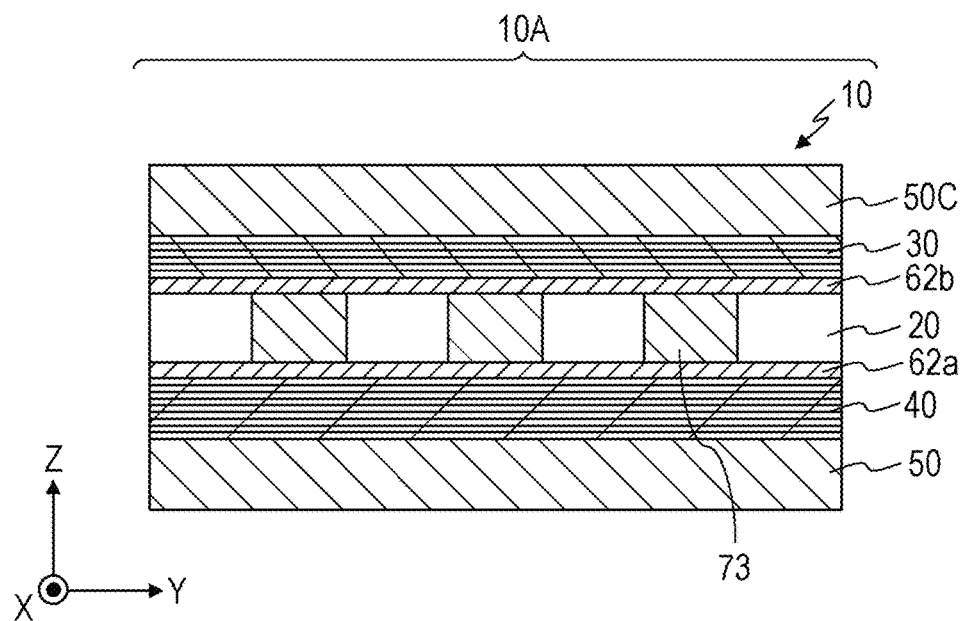
FIG. 55 is an illustration showing a YZ-plane cross section of a plurality of second waveguides in an optical scanning device having the structure shown in FIG. 54B.

FIG. 55 is an illustration showing a YZ-plane cross section of a plurality of second waveguides 10 in an optical scanning device having the structure shown in FIG. 54B. In this example, the plurality of second waveguides 10 share the first mirror 30, the second mirror 40, and the electrodes 62a and 62b. A plurality of optical waveguide layers 20 are disposed between the common electrodes 62a and 62b. Regions between the plurality of optical waveguide layers 20 serve as spacers 73. The spacers 73 are, for example, air (or a vacuum) or a transparent material such as $SiO_2$, $TiO_2$, $Ta_2O_5$, SiN, or AlN. When the spacers 73 are formed of a solid material, the upper structural body can be formed by, for example, vapor deposition or sputtering. Each spacer 73 may be in direct contact with two adjacent optical waveguide layers 20.

It is unnecessary that the first waveguides 1 be general waveguides that use total reflection of light. For example, the first waveguides 1 may be reflective waveguides similar to the second waveguides 10.

Figure 56:
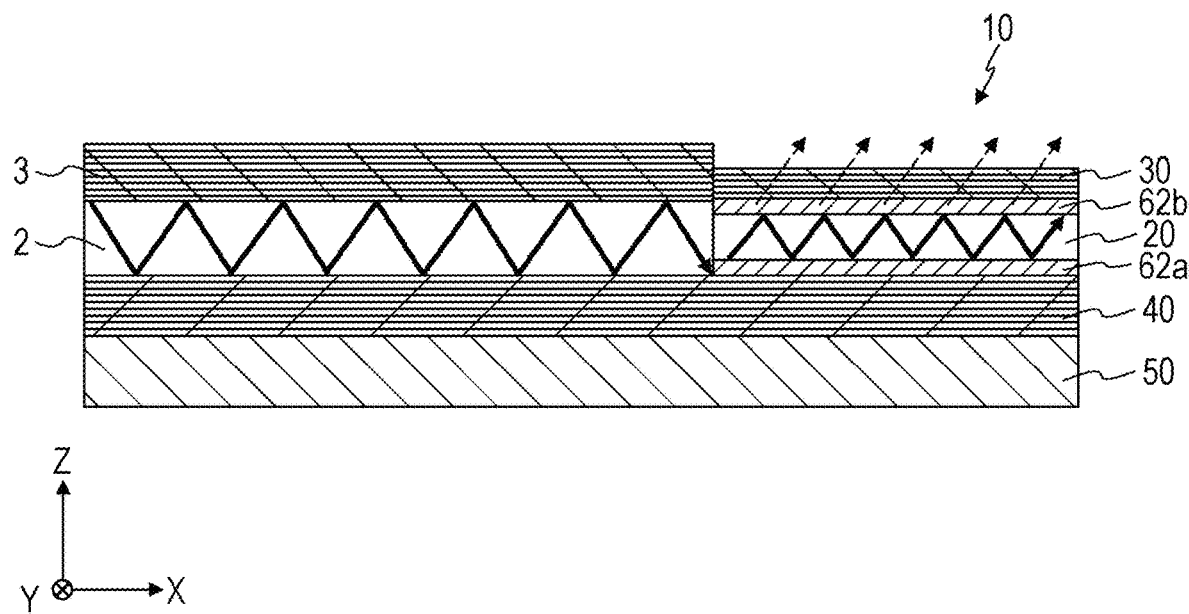
FIG. 56 is an illustration showing a structural example in which the first waveguide and the second waveguide are reflective waveguides.

FIG. 56 is an illustration showing a structural example in which the first waveguide 1 and the second waveguide 10 are reflective waveguides. The first waveguide 1 is sandwiched between two opposed multilayer reflective films 3 and 40. The principle of light propagation through the first waveguide 1 is the same as the principle of light propagation through the second waveguide 10. When the thickness of the multilayer reflective film 3 is sufficiently large, no light is emitted from the first waveguide 1.

In the structural example in FIG. 56, the coupling efficiency of light can be increased by optimizing the connection conditions of the two reflective waveguides, as described above with reference to FIGS. 20, 21, etc. The optimization allows light to be efficiently introduced from the first waveguide 1 to the second waveguide 10.

Next, modifications of the arrangement of the pair of electrodes 62a and 62b will be described. In the examples in FIGS. 50A to 56, the pair of electrodes 62a and 62b are in contact with the optical waveguide layer 20 of the second waveguide 10. In the examples in FIGS. 50C and 55, the plurality of second waveguides 10 shares one or both of the electrodes 62a and 62b. However, the structure of the electrodes 62a and 62b is not limited to the above structures.

Figure 57:
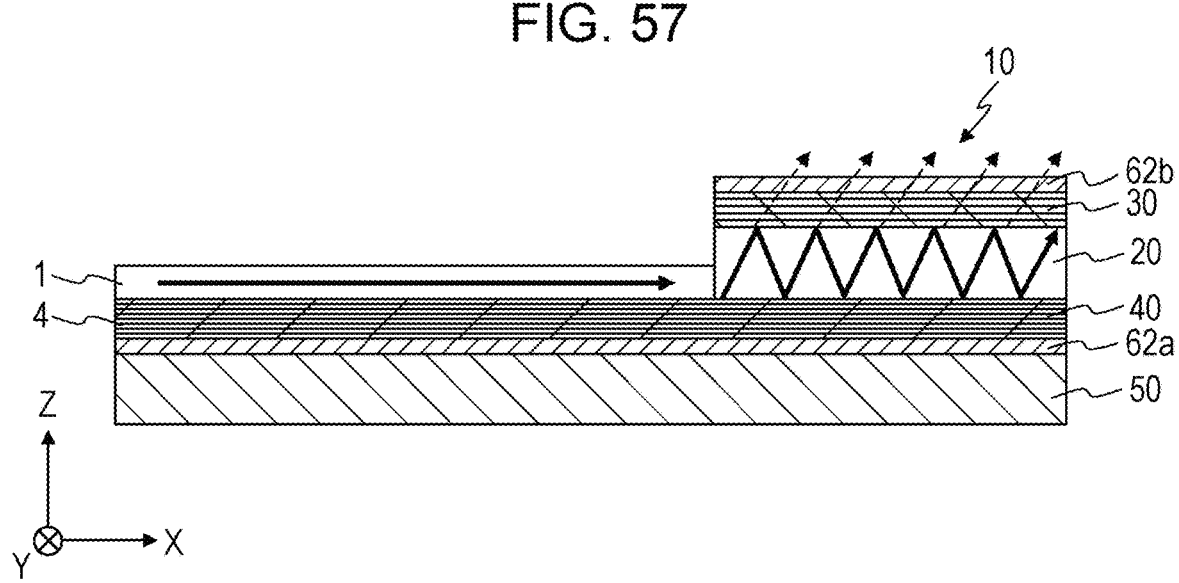
FIG. 57 is an illustration showing a structural example in which the upper electrode is disposed on the upper surface of the first mirror and the lower electrode is disposed on the lower surface of the second mirror.

FIG. 57 is an illustration showing a structural example in which the upper electrode 62b is disposed on the upper surface of the first mirror 30 and the lower electrode 62a is disposed on the lower surface of the second mirror 40. The first mirror 30 is disposed between the upper electrode 62b and the optical waveguide layer 20. The second mirror 40 is disposed between the lower electrode 62a and the optical waveguide layer 20. As shown in this example, the pair of electrodes 62a and 62b may sandwich the optical waveguide layer 20 indirectly through the first and second mirrors 30 and 40.

In the example in FIG. 57, the lower electrode 62a extends to the first waveguide 1 side. When a wiring line is led from the lower electrode 62a, a space below the first waveguide 10 can be used. Therefore, the design flexibility of the wiring line is increased.

In this example, the pair of electrodes 62a and 62b are not in contact with the optical waveguide layer 20. The guided light in the optical waveguide layer 20 is less influenced by absorption, scattering, and reflection by the pair of electrodes 62a and 62b. Therefore, the loss of the guided light in the optical waveguide layer 20 can be reduced.

Figure 58:
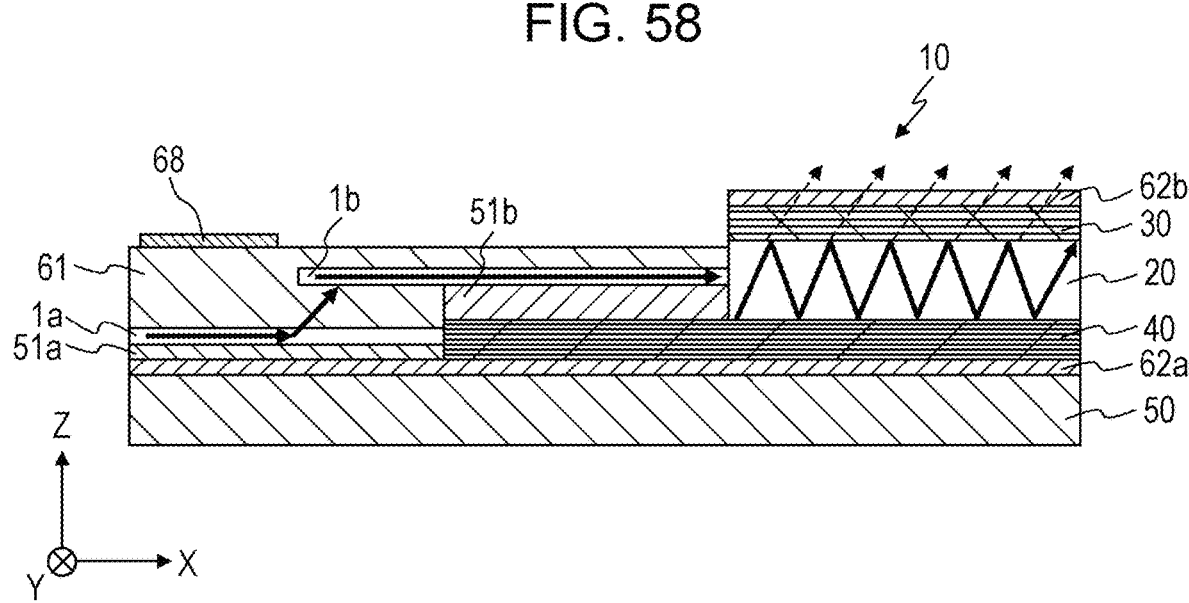
FIG. 58 is an illustration showing an example in which the first waveguide is separated into two portions.

FIG. 58 is a cross-sectional view showing another modification. In this example, the first waveguide 1 is separated into a first portion 1a and a second portion 1b. The first portion 1a is located at a lower position and spaced apart from the second waveguide 10. The second portion 1b is located at a higher position and connected to the optical waveguide layer 20 of the second waveguide 10. The first portion 1a and the second portion 1b overlap each other when viewed in the +Z direction. The first portion 1a and the second portion 1b are approximately parallel to each other and extend in the X direction. In this example, the adjustment layer 51 is also separated into two portions 51a and 51b. The first portion 51a of the adjustment layer is disposed between the first portion 1a of the first waveguide and the lower electrode 62a. The second portion 51b of the adjustment layer is disposed between the second portion 1b of the first waveguide and the second mirror 40. The protective layer 61 is disposed on the first portion 1a and second portion 1b of the first waveguide. A part of the first portion 1a of the first waveguide faces a part of the second portion 1b of the first waveguide through the protective layer 61. The arrangement of the electrodes 62a and 62b is the same as the arrangement in FIG. 57.

In the structure shown in FIG. 58, the spacing between the first portion 1a and second portion 1b of the first waveguide, i.e., their distance in the Z direction, is equal to or less than the wavelength of light in the waveguide. In this case, the light can be propagated from the first portion 1a to the second portion 1b through evanescent coupling. In this example, unlike the example in FIG. 54A, it is unnecessary to change the thickness of the second mirror 40 along the first waveguides 1a and 1b.

Figure 59:
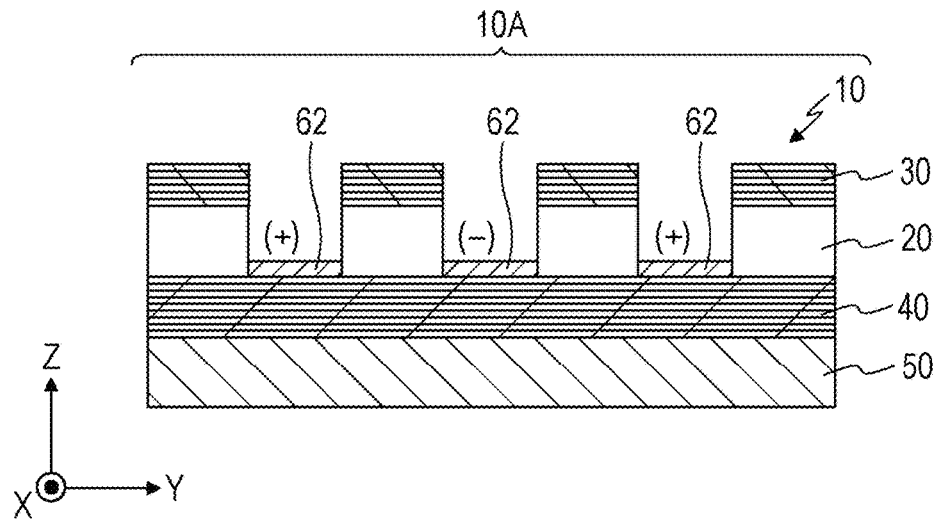
FIG. 59 is an illustration showing a structural example in which electrodes are disposed between adjacent optical waveguide layers.

FIG. 59 is an illustration showing a structural example in which electrodes 62 are disposed between adjacent optical waveguide layers 20. The adjusting element in this example includes the electrodes 62 and applies positive and negative voltages (denoted by "+" and "−" in the figure) to the electrodes in an alternate manner. In this manner, electric fields in the left-right direction in FIG. 59 can be generated in the optical waveguide layers 20.

In the example in FIG. 59, two electrodes 62 adjacent in the Y direction are in contact with at least part of an optical waveguide layer 20 disposed therebetween. The area of contact between the optical waveguide layer 20 and each electrode 62 is small. Therefore, even when the electrodes 62 are formed of a material that absorbs, scatters, or reflects light, the loss of the guided light in the optical waveguide layer 20 can be reduced.

In the structural examples in FIGS. 50A to 59, light used for scanning is emitted through the first mirror 30. The light used for scanning may be emitted through the second mirror 40.

Figure 60:
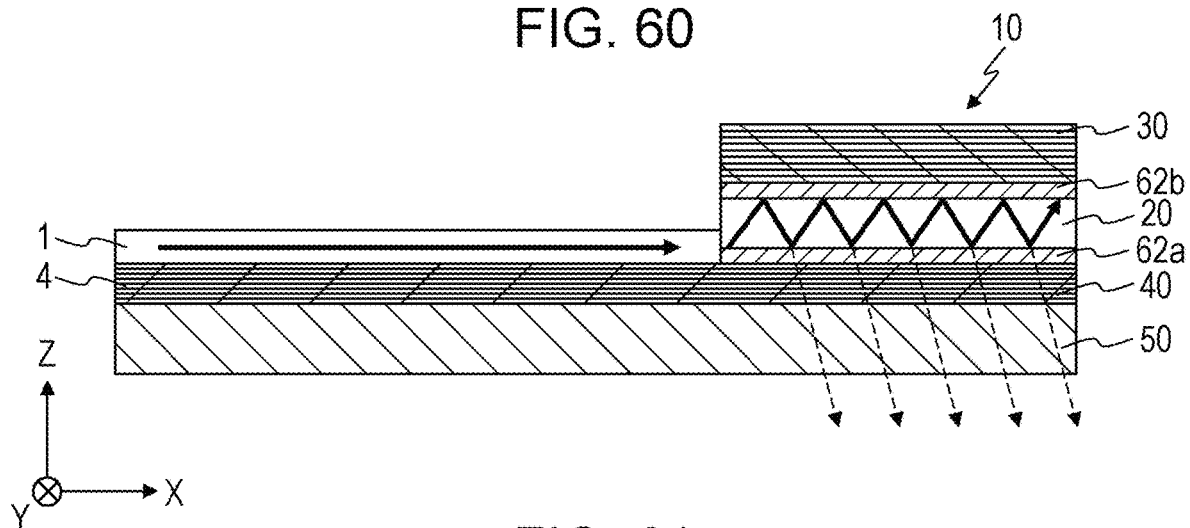
FIG. 60 is an illustration showing a structural example in which the first mirror is thick and the second mirror is thin.

FIG. 60 is an illustration showing a structural example in which the first mirror 30 is thick and the second mirror 40 is thin. In the example in FIG. 60, light passes through the second mirror 40 and is emitted from the substrate 50 side. The substrate 50 in this example is formed of a light-transmitting material. When the light emitted from the substrate 50 is used for scanning, the design flexibility of the optical scanning device increases.

<Discussion about Width of Mirrors>

Figure 61:
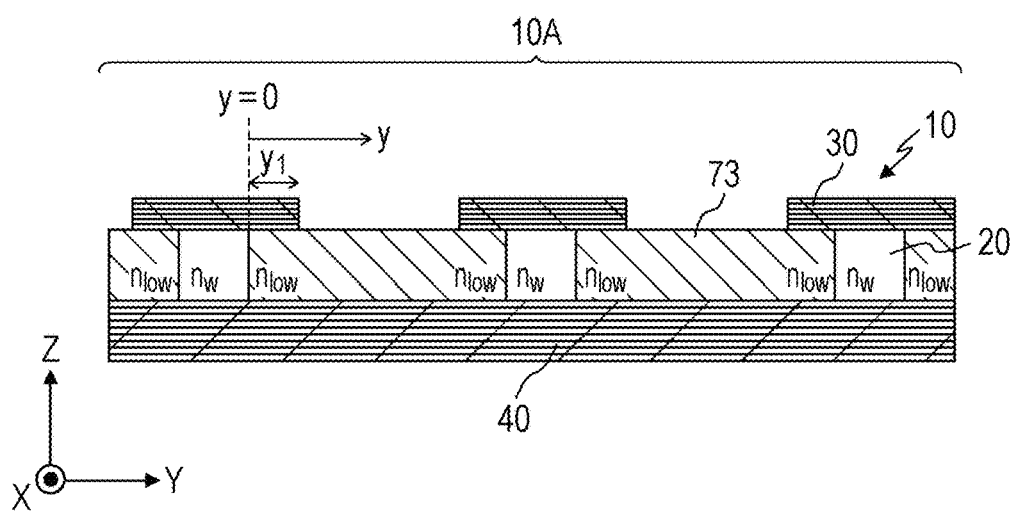
FIG. 61 is a cross-sectional view of an optical scanning device in the YZ plane, schematically showing a structural example of a waveguide array in an embodiment in which a plurality of waveguide elements are arranged in the Y direction.

FIG. 61 is a cross-sectional view of an optical scanning device in the YZ plane, schematically showing a structural example of a waveguide array 10A in an embodiment in which a plurality of waveguide elements 10 are arranged in the Y direction. In the structural example in FIG. 61, the width of the first mirrors 30 in the Y direction is larger than the width of the optical waveguide layers 20. The plurality of waveguide elements 10 share one second mirror 40. In other words, the second mirror 40 in each waveguide element 10 is a part of one integrated mirror. Each first mirror 30 has portions protruding in the Y direction from edge surfaces of a corresponding optical waveguide layer 20. The Y direction size of the protruding portions is denoted by $y_1$. The distance from an edge surface of the optical waveguide layer 20 in the Y direction is denoted by y. y=0 corresponds to the edge surface of the optical waveguide layer 20.

When the guided light propagates through the optical waveguide layer 20 in the X direction, evanescent light leaks from the optical waveguide layer 20 in the Y direction. The intensity I of the evanescent light in the Y direction is represented by the following formula.

$$I = I_0 \exp\left(-\frac{y}{y_d}\right) \quad (23)$$

Here, $y_d$ satisfies the following formula.

$$y_d = \frac{\lambda}{4\pi\sqrt{n_w^2 \sin^2\theta_{in} - n_{low}^2}} \quad (24)$$

Here, $I_0$ is the intensity of the evanescent light at y=0. The total reflection angle $\theta_{in}$ is shown in FIG. 11. At $y=y_d$, the intensity of the evanescent light is $I_0$ times 1/e. Here, e is the base of natural logarithm.

For the sake of simplicity, the guided light in the optical waveguide layer 20 is approximated as a ray of light, as shown in FIG. 11. As shown in the structural example in FIG. 61, when no first mirror 30 is present in a region satisfying $y>y_1$, light leakage, or light loss ($L_{loss}$), per reflection of the guided light at y=0 is represented by the following formula.

$$L_{loss} = \frac{\int_{y_1}^{\infty} I_0 \exp\left(-\frac{y}{y_d}\right)dy}{\int_0^{\infty} I_0 \exp\left(-\frac{y}{y_d}\right)dy} = \exp\left(-\frac{y_1}{y_d}\right) \quad (25)$$

As shown in formula (4), to set the divergence angle $\theta_{div}$ of light emitted from the waveguide element 10 to 0.1° or less, it is desirable that the propagation length L in the waveguide element 10 in the X direction is 1 mm or more. Let the width of the optical waveguide layer 20 in the Y direction be "a." Then the number of total reflections in the ±Y directions in FIG. 11 is 1,000/(a·tan $\theta_{in}$) or more. When a=1 μm and $\theta_{in}$=45°, the number of total reflections is 1,000 or more. Using formula (25) representing the light loss per reflection, the light loss after β reflections is represented by the following formula.

$$L_{loss}^{(\beta)} = 1 - \left\{1 - \exp\left(-\frac{y_1}{y_d}\right)\right\}^\beta \quad (26)$$

Figure 62:
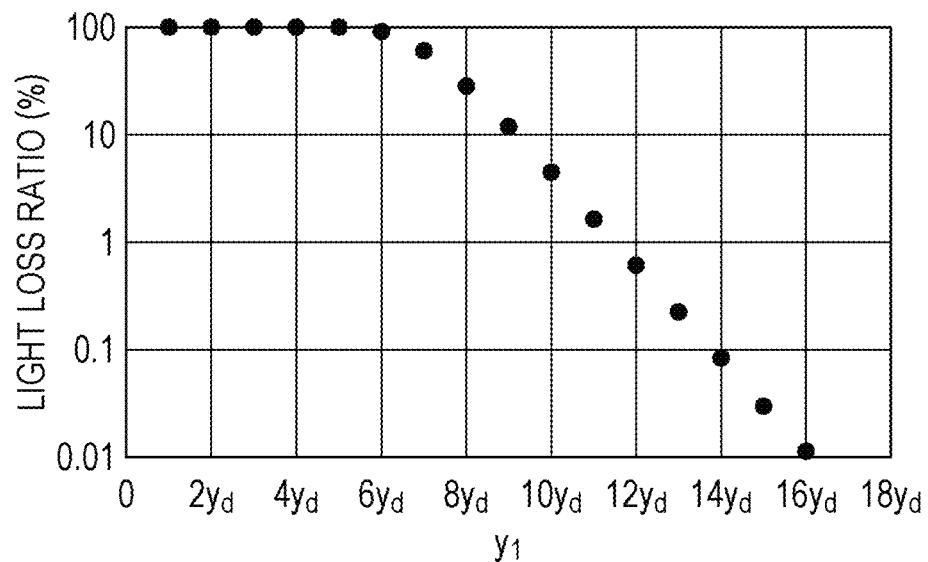
FIG. 62 is a graph showing the relation between the ratio of light loss ($L^{(\beta)}_{loss}$) and $y_1$ when $\beta=1,000$.

FIG. 62 is a graph showing the relation between the ratio of light loss ($L^{(\beta)}$ loss) and $y_1$ when β=1,000. The vertical axis represents the ratio of light loss, and the horizontal axis represents $y_1$. As shown in FIG. 62, to reduce the ratio of light loss to 50% or less, it is only necessary that $y_1 \geq 7y_d$. Similarly, to reduce the ratio of light loss to 10% or less, it is only necessary that $y_1 \geq 9y_d$. To reduce the ratio of light loss to 1% or less, it is only necessary that $y_1 \geq 11y_d$.

As shown by formula (25), in principle, the light loss can be reduced by increasing $y_1$. However, the light loss does not become zero.

Figure 63:
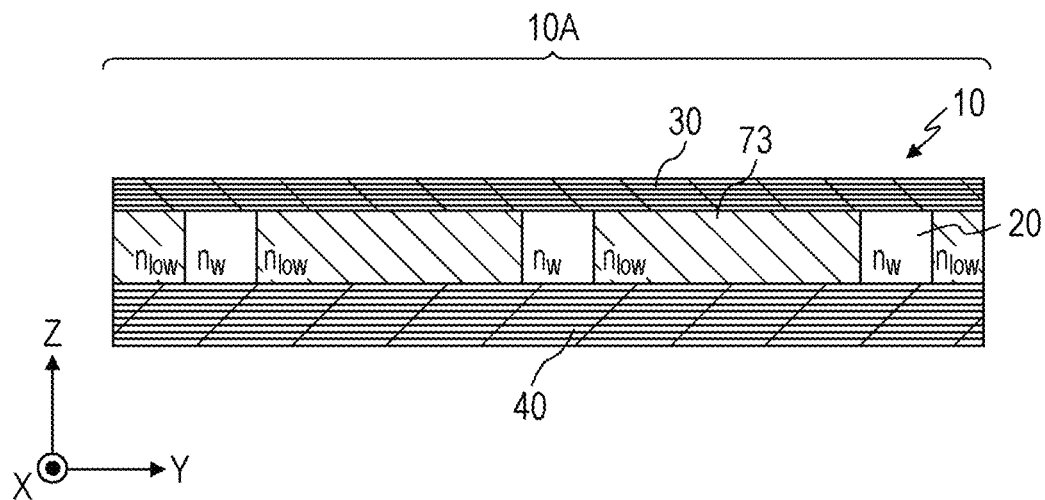
FIG. 63 is a cross-sectional view of an optical scanning device in the YZ plane, schematically showing another example of the waveguide array in the present embodiment in which the plurality of waveguide elements are arranged in the Y direction.

FIG. 63 is a cross-sectional view of an optical scanning device in the YZ plane, schematically showing another example of the waveguide array 10A in the present embodiment in which the plurality of waveguide elements 10 are arranged in the Y direction. In the structural example in FIG. 63, the plurality of waveguide elements 10 share the first and second mirrors 30 and 40. In other words, the first mirror 30 of each waveguide element 10 is a part of one integrated mirror, and the second mirror 40 of each waveguide element 10 is a part of one integrated mirror. In principle, this can minimize the light loss.

Next, leakage of evanescent light from each optical waveguide layer 20 was numerically computed for each of the structural examples in FIGS. 10 and 63, and the results were compared.

Figure 64A:
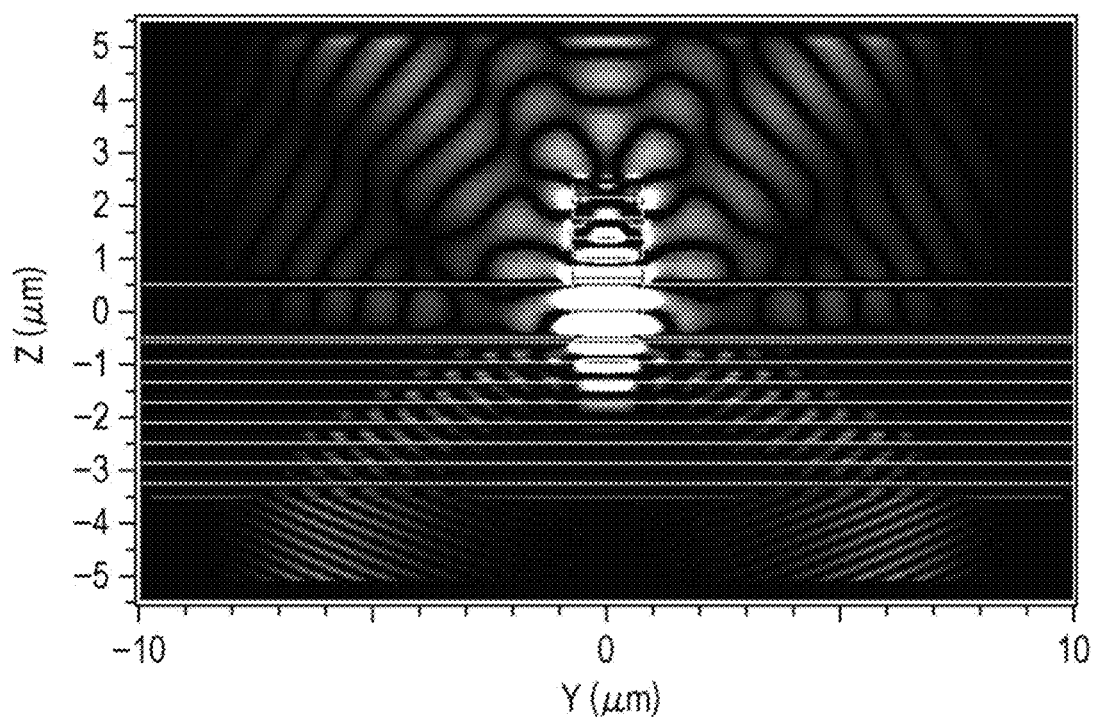
FIG. 64A is a graph showing the results of computations of an electric field intensity distribution in the structural example in FIG. 10.
Figure 64B:
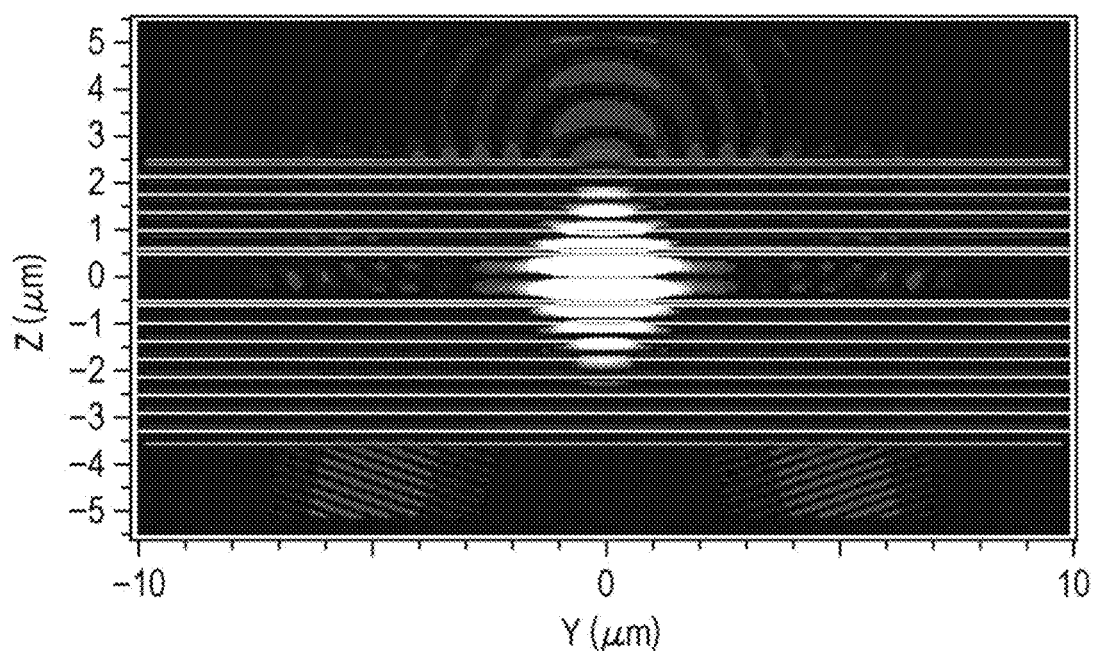
FIG. 64B is a graph showing the results of computations of an electric field intensity distribution in the structural example in FIG. 63.

FIG. 64A is a graph showing the results of computations of an electric field intensity distribution in the structural example in FIG. 10. FIG. 64B is a graph showing the results of computations of an electric field intensity distribution in the structural example in FIG. 63. FemSim available from Synopsys was used for the numerical computations. In FIGS. 64A and 64B, the width of the optical waveguide layer 20 in the Y direction is 1.5 μm, and the thickness of the optical waveguide layer 20 in the Z direction is 1 μm. The wavelength of the light is 1.55 μm. $n_w$ is 1.68, and $n_{low}$ is 1.44. This combination of $n_w$ and $n_{low}$ corresponds to the case in which, for example, a liquid crystal material contained in the optical waveguide layer 20 is enclosed by SiO₂ spacers 73.

As can be seen from FIG. 64A, in the structural example in FIG. 10, evanescent light leaks from regions in which no first mirror 30 is present. However, as can be seen from FIG. 64B, in the structural example in FIG. 63, the leakage of evanescent light is negligible. In FIGS. 64A and 64B, when the guided light propagates in the X direction, the intensity of the guided light decreases because of light emission from the first mirror 30 and leakage of evanescent light. The X direction propagation length of the guided light at which the intensity of the guided light is reduced by a factor of e was computed. The propagation length of the light in FIG. 64A was 7.8 µm, and the propagation length in FIG. 64B was 132 µm.

In the present embodiment, the spacers 73 may be formed of two or more different mediums.

Figure 65:
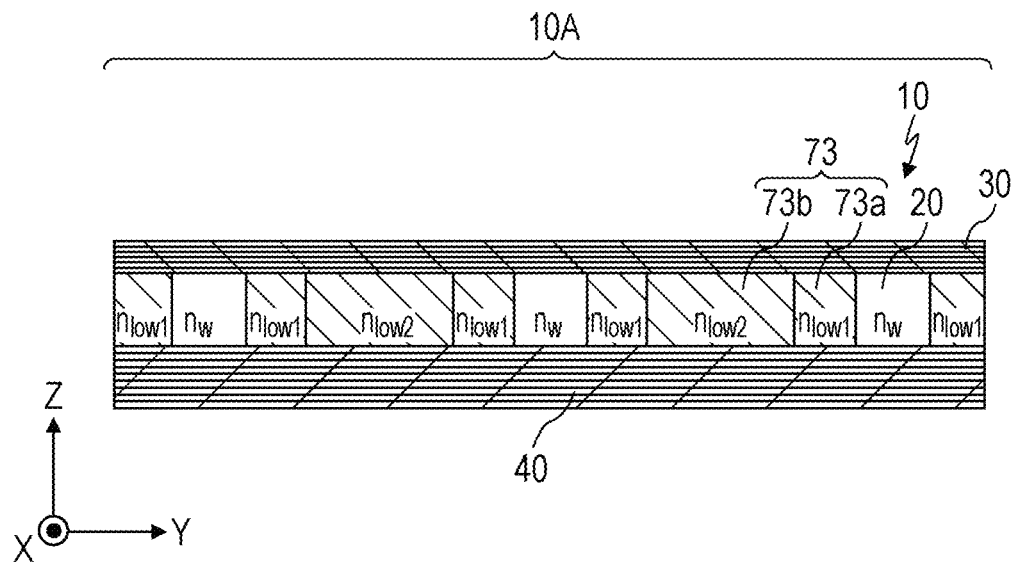
FIG. 65 is a cross-sectional view of an optical scanning device in the YZ plane, schematically showing a structural example in an embodiment in which spacers having different refractive indexes are present.

FIG. 65 is a cross-sectional view of an optical scanning device in the YZ plane, schematically showing a structural example in the present embodiment in which the spacers 73 include spacers 73a and 73b having different refractive indexes. In the structural example in FIG. 65, the refractive index $n_{low1}$ of the spacers 73a adjacent to the optical waveguide layers 20 is higher than the refractive index $n_{low2}$ of the spacers 73b not adjacent to the optical waveguide layers 20 ($n_{low1}$>$n_{low2}$). For example, when the optical waveguide layers 20 contain a liquid crystal material, SiO₂ may be used for the spacers 73a in order to enclose the liquid crystal material. The spacers 73b may be air. When the refractive index $n_{low2}$ of the spacers 73b is low, leakage of evanescent light from the optical waveguide layers 20 can be suppressed.

Figure 66:
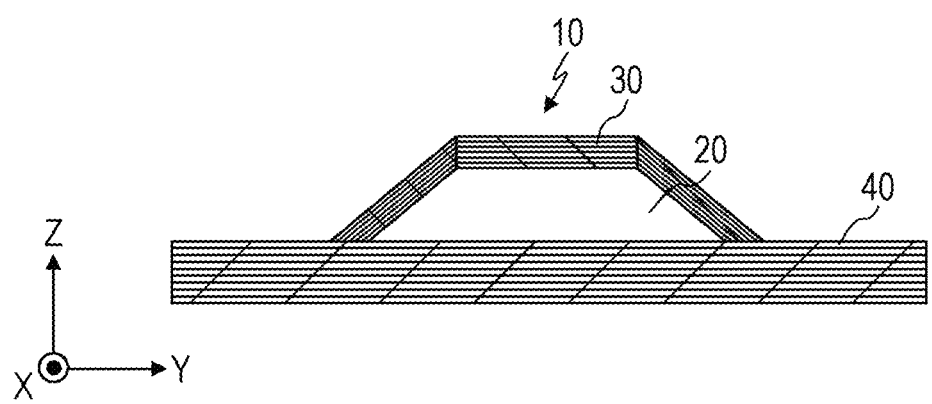
FIG. 66 is a cross-sectional view of an optical scanning device in the YZ plane, schematically showing a structural example of a waveguide element in a modification of the present embodiment.

FIG. 66 is a cross-sectional view of an optical scanning device in the YZ plane, schematically showing a structural example of a waveguide element 10 in a modification of the present embodiment. In the structural example in FIG. 66, the optical waveguide layer 20 has a trapezoidal cross section in the YZ plane. The first mirror 30 is disposed not only on the upper side of the optical waveguide layer 20 but also on its left and right sides. In this manner, light leakage from the left and right sides of the optical waveguide layer 20 can be prevented.

Next, the materials of the optical waveguide layers 20 and the spacers 73 will be described.

In the structural examples in FIGS. 61, 63, and 65, the refractive index $n_w$ of the optical waveguide layers 20 and the refractive index $n_{low}$ of the spacers 73 satisfy the relation $n_w$>$n_{low}$. Specifically, the spacers 73 contain a material having a lower refractive index than the material of the optical waveguide layers 20. For example, when the optical waveguide layers 20 contain an electrooptical material, the spacers 73 may contain a transparent material such as SiO₂, TiO₂, Ta₂O₅, SiN, AlN, or air. When the optical waveguide layers 20 contain a liquid crystal material, the spacers 73 may contain SiO₂ or air. By sandwiching the optical waveguide layers 20 between a pair of electrodes and applying a voltage to the electrodes, the refractive index of the optical waveguide layers 20 containing an electrooptical material or a liquid crystal material can be changed. In this manner, the emission angle of the light emitted from each first mirror 30 can be changed. The detailed driving method etc. of the optical scanning device when the optical waveguide layers 20 contain a liquid crystal material or an electrooptical material are as described above.

The electrooptical material used may be any of the following compounds.

KDP (KH₂PO₄) crystals such as KDP, ADP (NH₄H₂PO₄), KDA (KH₂AsO₄), RDA (RbH₂PO₄), and ADA (NH₄H₂AsO₄)

Cubic crystal materials such as KTN, BaTiO₃, SrTiO₃Pb₃MgNb₂O₉, GaAs, CdTe, and InAs Tetragonal crystal materials such as LiNbO₃ and LiTaO₃

Zincblende materials such as ZnS, ZnSe, ZnTe, GaAs, and CuCl

Tungsten bronze materials such as KLiNbO₃, SrBaNb₂O₆, KSrNbO, BaNaNbO, and Ca₂Nb₂O₇

The liquid crystal material used may be, for example, a nematic liquid crystal. The molecular structure of the nematic liquid crystal is as follows.

R1-Ph1-R2-Ph2-R3

Here, R1 and R3 each represent an amino group, a carbonyl group, a carboxyl group, a cyano group, an amine group, a nitro group, a nitrile group, or an alkyl chain. Ph1 and Ph2 each represent an aromatic group such as a phenyl group or a biphenyl group. R2 represents a vinyl group, a carbonyl group, a carboxyl group, a diazo group, or an azoxy group.

The liquid crystal is not limited to the nematic liquid crystal. For example, a smectic liquid crystal may be used. When the liquid crystal is a smectic liquid crystal, the smectic liquid crystal may exhibit, for example, a smectic C (SmC) phase. The liquid crystal exhibiting the smectic C (SmC) phase may be, for example, a ferroelectric liquid crystal exhibiting a chiral smectic (SmC*) phase in which the liquid crystal molecules have a chiral center (an asymmetric carbon atom).

The molecular structure of the SmC* phase is represented as follows.

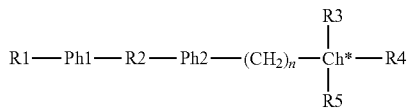

(n = 0 ~ 10)

R1 and R4 are each an amino group, a carbonyl group, a carboxyl group, a cyano group, an amine group, a nitro group, a nitrile group, or an alkyl chain. Ph1 and Ph2 are each an aromatic group such as a phenyl group or a biphenyl group. R2 is a vinyl group, a carbonyl group, a carboxyl group, a diazo group, or an azoxy group. Ch* represents a chiral center. The chiral center is typically carbon (C*). R3 and R5 are each hydrogen, a methyl group, an amino group, a carbonyl group, a carboxyl group, a cyano group, an amine group, a nitro group, a nitrile group, or an alkyl chain. R3, R4, and R5 are mutually different functional groups.

The liquid crystal material may be a mixture of a plurality of liquid crystal molecules with different compositions. For example, a mixture of nematic liquid crystal molecules and smectic liquid crystal molecules may be used as the material of the optical waveguide layers 20.

The structure in each of the examples in FIGS. 63 and 65 may be formed by laminating the first mirror 30 and the other components. In this case, the structure can be produced easily. When the spacers 73 are formed of a solid material, the first mirror 30 may be formed by, for example, vapor deposition or sputtering.

In the structural examples in FIGS. 61, 63, and 65, the structure of each first mirror 30 has been described on the assumption that the plurality of waveguide elements 10 share the second mirror 40. Of course, the above discussion is applicable to the second mirror 40. Specifically, when the width of at least one of the first and second mirrors 30 and 40 in the Y direction is larger than the width of the optical waveguide layers 20, leakage of evanescent light from the optical waveguide layers 20 can be prevented. A reduction in the amount of light used for optical scanning can thereby be prevented.

APPLICATION EXAMPLES

Figure 67:
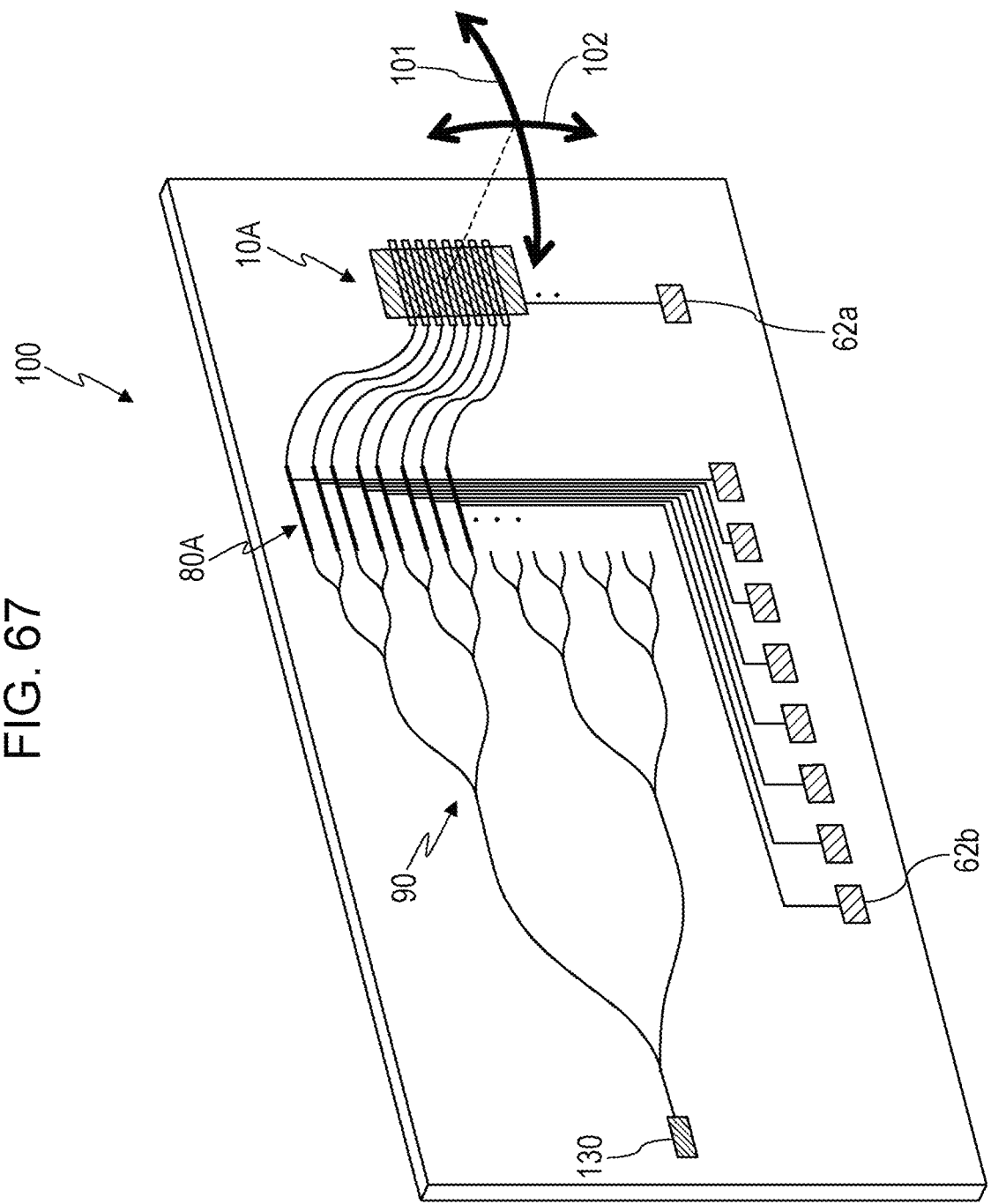
FIG. 67 is an illustration showing a structural example of an optical scanning device including elements such as an optical divider, a waveguide array, a phase shifter array, and a light source integrated on a circuit substrate (i.e., a chip)

FIG. 67 is an illustration showing a structural example of an optical scanning device 100 including elements such as an optical divider 90, a waveguide array 10A, a phase shifter array 80A, and a light source 130 integrated on a circuit substrate (i.e., a chip). The light source 130 may be a light-emitting element such as a semiconductor laser. The light source 130 in this example emits single-wavelength light with a wavelength of λ in free space. The optical divider 90 divides the light from the light source 130 and introduces the resulting light beams into a plurality of waveguides of a plurality of phase shifters. In the structural example in FIG. 67, an electrode 62a and a plurality of electrodes 62b are provided on the chip. A control signal is supplied to the waveguide array 10A from the electrode 62a. Control signals are sent from the plurality of electrodes 62b to the plurality of phase shifters 80 in the phase shifter array 80A. The electrodes 62a and 62b may be connected to an unillustrated control circuit that generates the above-described control signals. The control circuit may be disposed on the chip shown in FIG. 67 or on another chip in the optical scanning device 100.

By integrating all the components on the chip as shown in FIG. 67, optical scanning over a wide area can be implemented using the small device. For example, all the components shown in FIG. 67 can be integrated on a chip of about 2 mm×about 1 mm.

Figure 68:
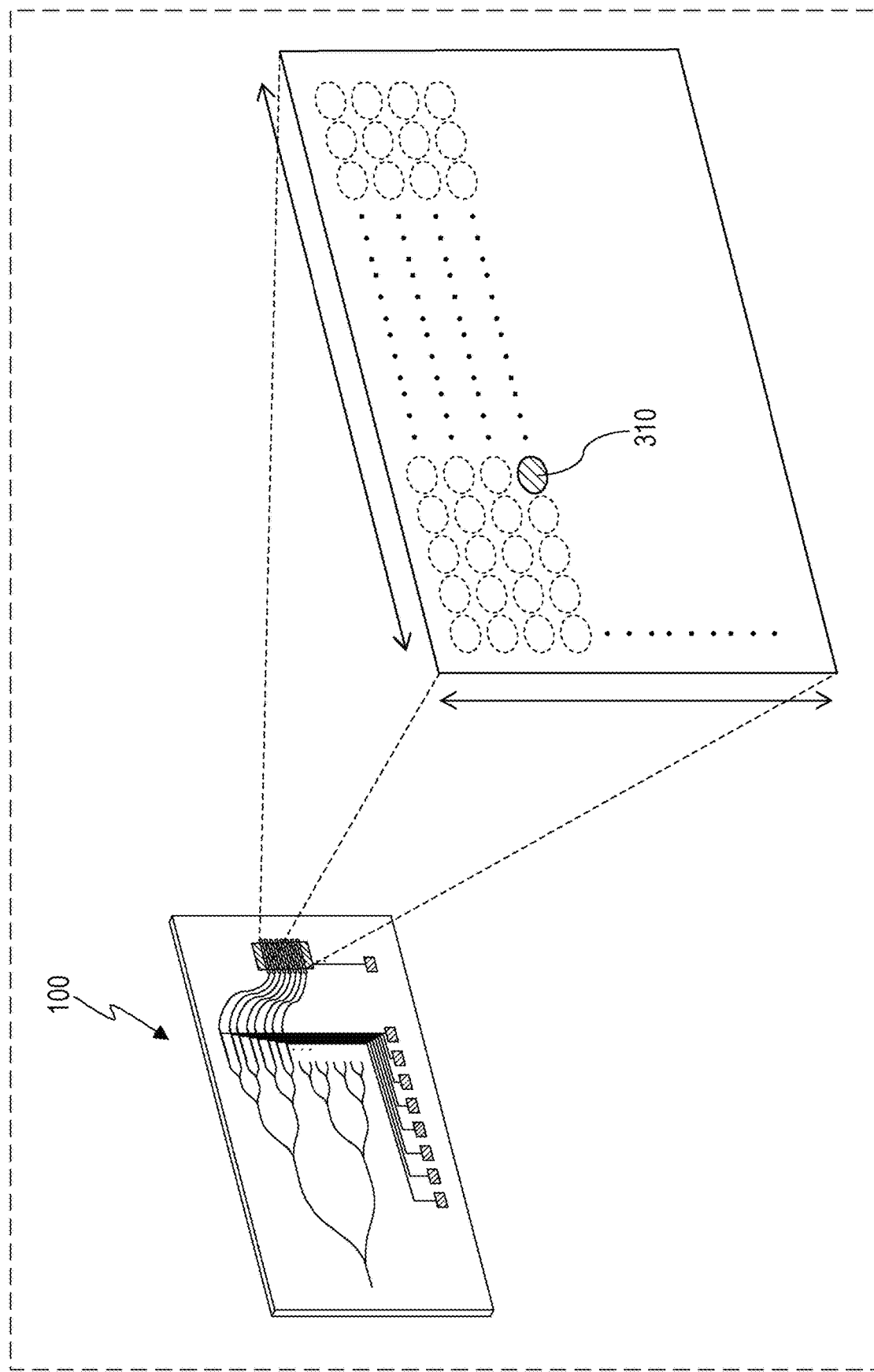
FIG. 68 is a schematic diagram showing how two-dimensional scanning is performed by irradiating a distant object with a light beam such as a laser beam from the optical scanning device.

FIG. 68 is a schematic diagram showing how two-dimensional scanning is performed by irradiating a distant object with a light beam such as a laser beam from the optical scanning device 100. The two-dimensional scanning is performed by moving a beam spot 310 in horizontal and vertical directions. By combining the two-dimensional scanning with a well-known TOF (time of flight) method, a two-dimensional range image can be obtained. In the TOF method, a target object is irradiated with a laser beam, and the reflected light is observed. The time of flight of the light is computed, and the distance is thereby determined.

Figure 69:
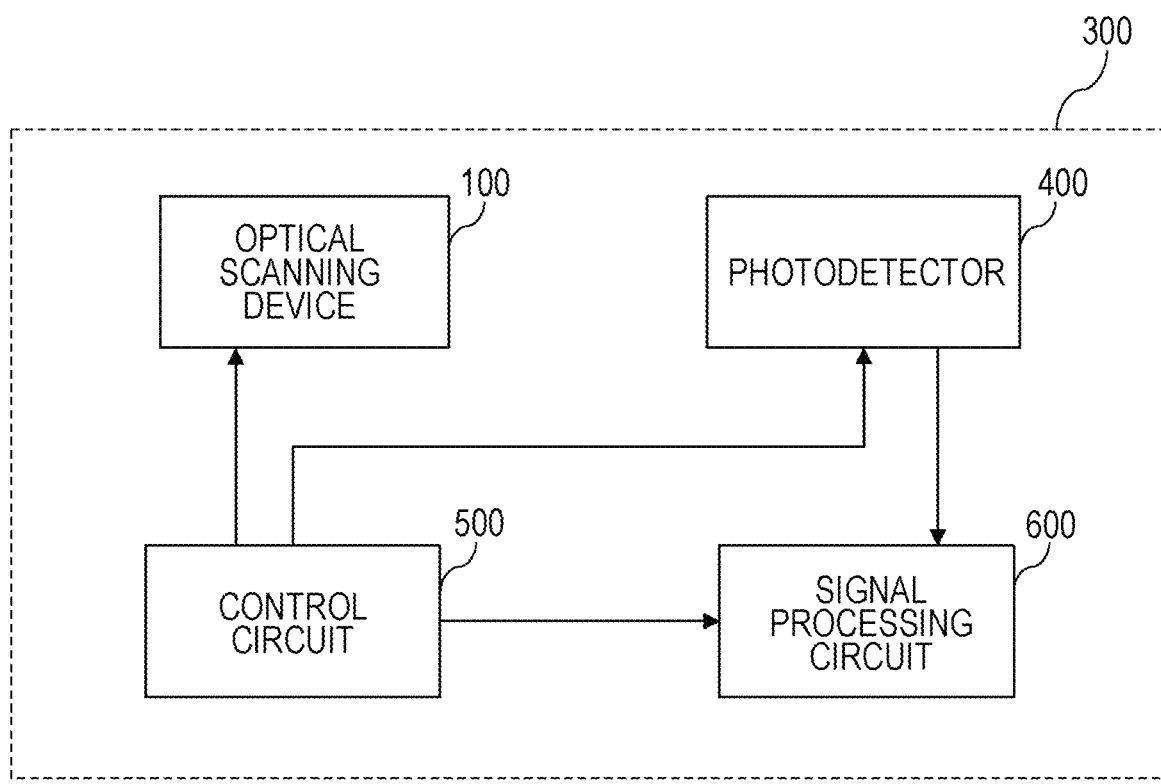
FIG. 69 is a block diagram showing a structural example of a LiDAR system that can generate a range image.

FIG. 69 is a block diagram showing a structural example of a LiDAR system 300 that is an example of a photodetection system capable of generating a range image. The LiDAR system 300 includes the optical scanning device 100, a photodetector 400, a signal processing circuit 600, and a control circuit 500. The photodetector 400 detects light emitted from the optical scanning device 100 and reflected from the target object. For example, the photodetector 400 may be an image sensor sensitive to the wavelength λ of the light emitted from the optical scanning device 100 or a photodetector including light-receiving elements such as photodiodes. The photodetector 400 outputs an electric signal corresponding to the amount of the light received. The signal processing circuit 600 computes the distance to the target object based on the electric signal outputted from the photodetector 400 and generates distance distribution data. The distance distribution data is data indicating a two-dimensional distance distribution (i.e., a range image). The control circuit 500 is a processor that controls the optical scanning device 100, the photodetector 400, and the signal processing circuit 600. The control circuit 500 controls the timing of irradiation with the light beam from the optical scanning device 100, the timing of exposure of the photodetector 400, and the timing of signal reading and instructs the signal processing circuit 600 to generate a range image.

In the two-dimensional scanning, a frame rate for acquisition of range images can be selected from 60 fps, 50 fps, 30 fps, 25 fps, 24 fps, etc. often used for general video images. In consideration of application to vehicle-mounted systems, the higher the frame rate, the higher the frequency of range image acquisition, and the higher the accuracy of obstacle detection. For example, when the frame rate is 60 fps and a vehicle is driving at 60 km/h, an image can be acquired every time the vehicle moves about 28 cm. When the frame rate is 120 fps, an image can be acquired every time the vehicle moves about 14 cm. When the frame rate is 180 fps, an image can be acquired every time the vehicle moves about 9.3 cm.

The time required to acquire one range image depends on a beam scanning speed. For example, to acquire an image with 100×100 resolvable points at 60 fps, each point must be scanned with the beam in 1.67 μs or less. In this case, the control circuit 500 controls the emission of the light beam from the optical scanning device 100 and signal accumulation and reading by the photodetector 400 at an operating speed of 600 kHz.

<Examples of Application to Photoreceiver Device>

The optical scanning device of the present disclosure can also be used as a photoreceiver device having approximately the same structure as the optical scanning device. The photoreceiver device includes the same waveguide array 10A as that in the optical scanning device and a first adjusting element 60 that adjusts a light-receivable direction. Each of the first mirrors 30 of the waveguide array 10A allows light incident in the third direction on a side opposite to a first reflecting surface to pass through. Each of the optical waveguide layers 20 of the waveguide array 10A propagates the light transmitted through a corresponding first mirror 30 in the second direction. The first adjusting element 60 changes at least one of the refractive index and thickness of the optical waveguide layer 20 of each of the waveguide elements 10, and the light-receivable direction can thereby be changed. The photoreceiver device may further include: the same phase shifters as the plurality of phase shifters 80 or 80a and 80b in the optical scanning device; and a second adjusting element that changes the phase differences between light beams outputted from the plurality of waveguide elements 10 through the plurality of phase shifters 80 or 80a and 80b. In this case, the light-receivable direction can be changed two dimensionally.

For example, by replacing the light source 130 in the optical scanning device 100 shown in FIG. 67 with a receiving circuit, a photoreceiver device can be configured. When light with a wavelength λ enters the waveguide array 10A, the light is transmitted to the optical divider 90 through the phase shifter array 80A, combined into one beam, and sent to the receiving circuit. The intensity of the one combined beam represents the sensitivity of the photoreceiver device. The sensitivity of the photoreceiver device can be adjusted by an adjusting element installed in the waveguide array and another adjusting element installed in the phase shifter array 80A. In the photoreceiver device, the direction of the wave vector shown in, for example, FIG. 26 (the thick arrow) is reversed. The incident light has a light component in the extending direction of the waveguide elements 10 (the X direction) and a light component in the arrangement direction of the waveguide elements 10 (the Y direction). The sensitivity to the light component in the X direction can be adjusted by the adjusting element installed in the waveguide array 10A. The sensitivity to the light component in the arrangement direction of the waveguide elements 10 can be adjusted by the adjusting element installed in the phase shifter array 80A. θ and α$_0$ (formulas (16) and (17)) can be determined from the phase difference Δφ between the light beams when the sensitivity of the photoreceiver device is maximized and the refractive index n$_w$ and thickness d of the optical waveguide layers 20. This allows the incident direction of the light to be identified.

The above-described embodiments and modifications can be appropriately combined. For example, the first mirrors 30 shown in FIG. 61 may be used instead of the first mirrors 30 in a different embodiment or a modification. The waveguide elements 10 shown in FIG. 65 may be used instead of the waveguide elements 10 in a different embodiment or a modification.

The optical scanning device and the photoreceiver device in the embodiments of the present disclosure can be used for applications such as LiDAR systems installed in vehicles such as automobiles, UAVs, and AGVs.

What is claimed is:

1. An optical scanning device comprising a waveguide array including a plurality of waveguides arranged in a first direction,
    wherein each of the plurality of waveguides includes:
        an optical waveguide layer that propagates light supplied to the waveguide, in a second direction intersecting the first direction;
        a first mirror extending in the second direction and having a first reflecting surface that intersects a third direction; and
        a second mirror extending in the second direction and having a second reflecting surface that faces the first reflecting surface of the first mirror,
    wherein the third direction intersects a virtual plane parallel to the first and second directions,
    wherein, in each of the plurality of waveguides, the optical waveguide layer is located between the first mirror and the second mirror and has a variable thickness and/or a variable refractive index for the light,
    wherein the width of the first mirror in the first direction and the width of the second mirror in the first direction are each larger than the width of the optical waveguide layer in the first direction,
    wherein the first mirror has a higher light transmittance than the second mirror and allows part of the light propagating through the optical waveguide layer to pass through and be emitted in the third direction, and
    wherein the refractive index of the optical waveguide layer and/or the thickness of the optical waveguide layer is changed to change the third direction that is an emission direction of the part of the light.

2. The optical scanning device according to claim 1,
    wherein, in each of the plurality of waveguides, the first and second mirrors each have a protruding portion that protrudes in the first direction from an edge surface of the optical waveguide layer as viewed in a direction perpendicular to the virtual plane parallel to the first and second directions;
    evanescent light leaks from the edge surface of the optical waveguide layer; and
    $y_1$ and $y_d$ satisfy $y_1 \geq 7y_d$,
    where $y_1$ is the size of the protruding portion in the first direction, and
    $y_d$ is the distance in the first direction between the edge surface and a position at which the light intensity of the evanescent light is 1/e of the light intensity of the evanescent light at the edge surface,
    where e is the base of natural logarithm.

3. The optical scanning device according to claim 2,
    wherein $y_1$ and $y_d$ satisfy $y_1 \geq 11 y_d$.

4. The optical scanning device according to claim 1, further comprising
    an integrally formed third mirror,
    wherein the first mirror of each of the plurality of waveguides is part of the third mirror.

5. The optical scanning device according to claim 1, further comprising
    an integrally formed fourth mirror,
    wherein the second mirror of each of the plurality of waveguides is part of the fourth mirror.

6. The optical scanning device according to claim 1, further comprising
    a first adjusting element that changes the refractive index of each optical waveguide layer and/or the thickness of each optical waveguide layer to change the third direction that is the emission direction of the part of the light.

7. The optical scanning device according to claim 6,
    wherein each optical waveguide layer of the waveguides contains a first material whose refractive index for the light is changed when a voltage is applied, and
    the first adjusting element includes a pair of electrodes sandwiching one or more optical waveguide layers and changes the refractive index of each of the one or more optical waveguide layers by applying a voltage to the pair of electrodes.

8. The optical scanning device according to claim 7,
    wherein the first material contains an electrooptical material, and
    wherein the first adjusting element changes the refractive index of the electrooptical material by applying a voltage to the pair of electrodes.

9. The optical scanning device according to claim 7,
    wherein the first material contains a liquid crystal material, and
    wherein the first adjusting element changes the refractive index anisotropy of the liquid crystal material by applying a voltage to the pair of electrodes to change the refractive index of each of the one or more optical waveguide layers.

10. The optical scanning device according to claim 1, further comprising
    a second material that is disposed between the optical waveguide layers of each two adjacent waveguides of the plurality of waveguides and has a lower refractive index than the optical waveguide layers.

11. The optical scanning device according to claim 10,
    wherein the second material contains at least one selected from the group consisting of $SiO_2$, $TiO_2$, $Ta_2O_5$, SiN, and AlN.

12. The optical scanning device according to claim 10,
    wherein the second material contains $SiO_2$.

13. The optical scanning device according to claim 10,
    wherein the second material is in direct contact with the optical waveguide layers of the each two adjacent waveguides.

14. The optical scanning device according to claim 1,
    wherein, when a second direction component of the wave vector of the light emitted in the third direction is denoted as an X component and a first direction component of the wave vector is denoted as a Y component, the X component of the wave vector is changed by changing the refractive index of the optical waveguide layer of each of the waveguides and/or the thickness of the optical waveguide layer of each of the waveguides, and the Y component of the wave vector is changed when the difference in phase between light beams to be supplied to each two adjacent waveguides of the plurality of waveguides is changed.

15. The optical scanning device according to claim 1, wherein the first direction is orthogonal to the second direction.

16. The optical scanning device according to claim 1, wherein the plurality of waveguides are arranged in the first direction at regular intervals.

17. The optical scanning device according to claim 1, wherein, in each of the plurality of waveguides, at least one of the first and second mirrors includes a dielectric multilayer film.

18. The optical scanning device according to claim 1, further comprising
a plurality of phase shifters,
wherein each of the plurality of phase shifters includes a waveguide connected to a corresponding one of the plurality of waveguides directly or indirectly through another waveguide and supplies a light beam to the corresponding one of the plurality of waveguides, and
wherein the phases of the light beams to be supplied from the waveguides of the phase shifters to the respective optical waveguide layers are changed such that the difference in phase between light beams to be supplied to the optical waveguide layers of each two adjacent waveguides of the plurality of waveguides is changed to change the third direction.

19. The optical scanning device according to claim 18, further comprising
a second adjusting element that changes the phases of the light beams to be supplied from the waveguides of the phase shifters to the respective optical waveguide layers to change the difference in phase between light beams to be supplied to each two adjacent waveguides of the plurality of waveguides, so that the third direction is changed.

20. The optical scanning device according to claim 19, wherein the waveguide of each of the phase shifters contains a third material whose refractive index is changed when a voltage is applied or temperature is changed, and
wherein the second adjusting element changes the refractive index of the waveguide of each of the phase shifters by applying a voltage to the waveguide of the each of the phase shifters or by changing the temperature of the waveguide of the each of the phase shifters to change the phases of the light beams to be supplied to the optical waveguide layers.

21. A photodetection system comprising:
the optical scanning device according to claim 1;
a photodetector that detects light emitted from the optical scanning device and reflected from a target; and
a signal processing circuit that generates distance distribution data based on an output from the photodetector.

22. A photoreceiver device comprising a waveguide array including a plurality of waveguides arranged in a first direction,
wherein each of the plurality of waveguides includes:
a first mirror extending in a second direction intersecting the first direction and having a first reflecting surface that intersects a third direction;
a second mirror extending in the second direction and having a second reflecting surface that faces the first reflecting surface of the first mirror; and
an optical waveguide layer disposed between the first mirror and the second mirror,
wherein the third direction intersects a virtual plane parallel to the first and second directions,
wherein, in each of the plurality of waveguides, the width of the first mirror in the first direction and the width of the second mirror in the first direction is larger than the width of the optical waveguide layer in the first direction,
wherein the first mirror has a higher light transmittance than the second mirror and allows part of light incident on a surface of the first mirror opposite to the first reflecting surface in the third direction to be introduced into the optical waveguide layer,
wherein the optical waveguide layer has a variable thickness and/or a variable refractive index for the light and allows the part of the light introduced into the optical waveguide layer to propagate in the second direction, and
wherein the refractive index of the optical waveguide layer and/or the thickness of the optical waveguide layer is changed to change the third direction in which the part of the light is receivable.

23. The photoreceiver device according to claim 22, further comprising
a first adjusting element that changes the refractive index of each optical waveguide layer and/or the thickness of each optical waveguide layer to change the third direction in which the part of the light is receivable.

24. The photoreceiver device according to claim 22, further comprising a plurality of phase shifters,
wherein each of the plurality of phase shifters includes a waveguide connected to a corresponding one of the plurality of waveguides directly or indirectly through another waveguide and allowing the part of the light from the corresponding one of the plurality of waveguides to pass through and be outputted, and
wherein the phase of the part of the light outputted from the waveguide of each of the phase shifters is changed such that the third direction in which the part of the light is receivable is changed.

25. The photoreceiver device according to claim 24, further comprising
a second adjusting element that changes the phase of the part of the light outputted from the waveguide of each of the phase shifters to change the third direction in which the part of the light is receivable.

* * * * *